US011869517B2

(12) United States Patent
Li et al.

(10) Patent No.: US 11,869,517 B2
(45) Date of Patent: Jan. 9, 2024

(54) DOWNMIXED SIGNAL CALCULATION METHOD AND APPARATUS

(71) Applicant: HUAWEI TECHNOLOGIES CO., LTD., Guangdong (CN)

(72) Inventors: Haiting Li, Beijing (CN); Zexin Liu, Beijing (CN); Bin Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/102,190

(22) Filed: Nov. 23, 2020

(65) Prior Publication Data

US 2021/0082441 A1 Mar. 18, 2021

Related U.S. Application Data

(63) Continuation of application No. PCT/CN2019/070116, filed on Jan. 2, 2019.

(30) Foreign Application Priority Data

May 31, 2018 (CN) ......................... 201810549905.2

(51) Int. Cl.
*G10L 19/008* (2013.01)
*G10L 25/18* (2013.01)
(Continued)

(52) U.S. Cl.
CPC ............ *G10L 19/008* (2013.01); *G10L 25/18* (2013.01); *G10L 25/21* (2013.01); *H04S 1/007* (2013.01); *H04S 2420/03* (2013.01)

(58) Field of Classification Search
CPC ..... G10L 19/008; G10L 19/005; G10L 19/02; G10L 19/04; G10L 19/0208;
(Continued)

(56) References Cited

U.S. PATENT DOCUMENTS

2006/0233379 A1 10/2006 Villemoes et al.
2009/0210236 A1 8/2009 Moon et al.
(Continued)

FOREIGN PATENT DOCUMENTS

CN 101197134 A 6/2008
CN 102157149 A 8/2011
(Continued)

OTHER PUBLICATIONS

International Standard (ISO3), "Information technology—MPEG audio technologies—Part 3: Unified Speech and Audio Coding", ISO/IEC FDIS 23003-3, pp. 286, (Year: 2011).*
(Continued)

*Primary Examiner* — Leshui Zhang
(74) *Attorney, Agent, or Firm* — Fish & Richardson P.C.

(57) ABSTRACT

This application discloses a downmixed signal calculation method and apparatus. The method includes: when a current frame or a previous frame of the current frame of a stereo signal is not a switching frame and a residual signal in the current frame or the previous frame does not need to be encoded, obtaining a second downmixed signal in the current frame and a downmix compensation factor of the current frame, correcting the second downmixed signal in the current frame based on the downmix compensation factor of the current frame, to obtain the first downmixed signal in the current frame and determining the first downmixed signal in the current frame as a downmixed signal in the current frame in a preset frequency band.

12 Claims, 19 Drawing Sheets

(51) Int. Cl.
*G10L 25/21* (2013.01)
*H04S 1/00* (2006.01)

(58) Field of Classification Search
CPC ... G10L 19/022; G10L 19/002; G10L 21/038; G10L 25/18; G10L 25/21; H04S 1/007; H04S 1/00; H04S 2420/03; H04S 2420/01
USPC ................................ 704/500–504; 381/1–23
See application file for complete search history.

(56) References Cited

U.S. PATENT DOCUMENTS

2010/0322429 A1* 12/2010 Norvell ................. G10L 19/008 381/23
2011/0015768 A1 1/2011 Lim et al.
2011/0022402 A1 1/2011 Engdegard et al.
2014/0226822 A1 8/2014 Engdegard et al.
2018/0286415 A1* 10/2018 Vaillancourt ......... G10L 19/032

FOREIGN PATENT DOCUMENTS

| | | | |
|---|---|---|---|
| CN | 102446507 | A | 5/2012 |
| CN | 103119647 | A | 5/2013 |
| EP | 2054875 | B1 | 3/2011 |
| JP | 2009500658 | A | 1/2009 |
| JP | 2014535183 | A | 12/2014 |
| WO | 2018058379 | A1 | 4/2018 |

OTHER PUBLICATIONS

Office Action issued in Chinese Application No. 201810549905.2 dated Jul. 16, 2021, 10 pages (with English translation).
PCT International Search Report and Written Opinion in International Application No. PCT/CN2019/070116, dated Mar. 29, 2019, 18 pages.
Extended European Search Report issued in European Application No. 19811813.5 dated May 25, 2021, 11 pages.
ITU-T, Telecommunication Standardization Sector of ITU, G.711.1, “Series G: Transmission Systems and Media, Digital Systems and Networks; Digital terminal equipments—Coding of voice and audio signals,” Wideband embedded extension for ITU-T G.711 pulse code modulation, XP055407180, Sep. 2012, 218 pages.
Anonymous, “Wideband embedded extension for ITU-T G.711 pulse code modulation,” Recommendation ITU-T G.711.1, Sep. 2012, pp. 139-178.
Office Action issued in Japanese Application No. 2020-564202 dated Feb. 8, 2022, 12 pages (with English translation).
Elfitri et al., “Experimental Study on Improved Parametric Stereo for Bit Rate Scalable Audio Coding,” 2014 6th International Conference on Information Technology and Electrical Engineering (ICITEE), Oct. 7-8, 2014, Yogyakarta, Indonesia, 5 pages.
EP Communication Pursuant to Article 94(3) EPC in European Appln No. 19811813.5, dated Mar. 20, 2023, 7 pages.
“Information Technology—MPEG Audio Technologies—Part 3: Unified Speech and Audio Coding,” ISO/IEC JTC 1/SC29/WG11, Sep. 20, 2011, 291 pages.
Office Action in Korean Appln. No. 2020-7035596, dated Jan. 3, 2023, 10 pages (with English translation).

* cited by examiner

TO FIG. 6B

DOWNMIXED SIGNAL CALCULATION METHOD AND APPARATUS

CROSS-REFERENCE TO RELATED APPLICATIONS

This application is a continuation of International Application No. PCT/CN2019/070116, filed on Jan. 2, 2019, which claims priority to Chinese Patent Application No. 201810549905.2, filed on May 31, 2018. The disclosures of the aforementioned applications are hereby incorporated by reference in their entireties.

TECHNICAL FIELD

Embodiments of this application relate to the audio signal processing field, and in particular, to a downmixed signal calculation method and apparatus.

BACKGROUND

With the improvement of quality of life, people have an increasing demand on high-quality audio. Stereo audio provides senses of orientation and distribution of various sound sources, so that information clarity, intelligibility, and an immersive sense can be improved. Therefore, the stereo audio is highly favored.

A parametric stereo encoding and decoding technology is usually used to encode and decode a stereo signal. In the parametric stereo encoding and decoding technology, the stereo signal is transformed into a spatial perception parameter and one channel of signal (or two channels of signals), to implement compression processing on the stereo signal. Parametric stereo encoding and decoding may be performed in time domain, may be performed in frequency domain, or may be performed in time-frequency domain.

During parametric stereo encoding performed in frequency domain or time-frequency domain, after analyzing an input stereo signal, an encoder side may obtain a stereo parameter, a downmixed signal (which may also be referred to as a mid channel signal or a primary channel signal), and a residual signal (which may also be referred to as a side channel signal or a secondary channel signal). In the prior art, when a coding rate is relatively low (for example, for bandwidth is wideband, the coding rate is 26 kbps or lower, or for bandwidth is super wideband the coding rate is 34 kbps or lower), the encoder side calculates a downmixed signal by using a preset method. Consequently, there is a discontinuous spatial sense and poor sound image stability of a decoded stereo signal, thereby affecting aural quality.

SUMMARY

Embodiments of this application provide a downmixed signal calculation method and apparatus, to resolve a problem that there is a discontinuous spatial sense and poor sound image stability of a decoded stereo signal.

To achieve the foregoing objective, the following technical solutions are used in this application.

According to a first aspect, a downmixed signal calculation method is provided, and includes: when a previous frame of a current frame of a stereo signal is not a switching frame and a residual signal in the previous frame does not need to be encoded, or when a current frame is not a switching frame and a residual signal in the current frame does not need to be encoded, calculating, by a downmixed signal calculation apparatus (which is referred to as a calculation apparatus for short in the following), a first downmixed signal in the current frame, and determining the first downmixed signal in the current frame as a downmixed signal in a preset frequency band of the current frame. A method for the calculating, by a calculation apparatus, a first downmixed signal in the current frame specifically includes: obtaining, by the calculation apparatus, a second downmixed signal in the current frame and a downmix compensation factor of the current frame; and correcting the second downmixed signal in the current frame based on the downmix compensation factor of the current frame, to obtain the first downmixed signal in the current frame.

In this embodiment of this application, when the current frame of the stereo signal is not a switching frame and the residual signal in the current frame does not need to be encoded, or when the previous frame of the current frame of the stereo signal is not a switching frame and the residual signal in the previous frame does not need to be encoded, the calculation apparatus calculates the first downmixed signal in the current frame, and determines the first downmixed signal as the downmixed signal in the preset frequency band of the current frame. This resolves a problem that there is a discontinuous spatial sense and poor sound image stability of a decoded stereo signal due to switching back and forth in the preset frequency band between encoding a residual signal and skipping encoding the residual signal, thereby effectively improving aural quality.

Optionally, in a possible implementation of this application, a method for the correcting, by the calculation apparatus, the second downmixed signal in the current frame based on the downmix compensation factor of the current frame, to obtain the first downmixed signal in the current frame includes: calculating, by the calculation apparatus, a compensated downmixed signal in the current frame based on a first frequency-domain signal in the current frame and the downmix compensation factor of the current frame, and calculating the first downmixed signal in the current frame based on the second downmixed signal in the current frame and the compensated downmixed signal in the current frame, where the first frequency-domain signal is a left channel frequency-domain signal in the current frame or a right channel frequency-domain signal in the current frame; or calculating, by the calculation apparatus, a compensated downmixed signal in a subframe i of the current frame based on a second frequency-domain signal in the subframe i of the current frame and a downmix compensation factor of the subframe i of the current frame, and calculating a first downmixed signal in the subframe i of the current frame based on a second downmixed signal in the subframe i of the current frame and the compensated downmixed signal in the subframe i of the current frame, where the second frequency-domain signal is a left channel frequency-domain signal in the subframe i of the current frame or a right channel frequency-domain signal in the subframe i of the current frame, the current frame includes P subframes, and the first downmixed signal in the current frame includes the first downmixed signal in the subframe i of the current frame, where both P and i are integers, $P \geq 2$, and $i \in [0, P-1]$.

It can be learned that the calculation apparatus may calculate the first downmixed signal in the current frame from a perspective of each frame, or may calculate the first downmixed signal in the current frame from a perspective of each subframe of the current frame.

Optionally, in another possible implementation of this application, a method for the calculating, by the calculation apparatus, a compensated downmixed signal in the current frame based on a first frequency-domain signal in the current frame and the downmix compensation factor of the current frame includes: determining, by the calculation apparatus, a product of the first frequency-domain signal in the current frame and the downmix compensation factor of the current frame as the compensated downmixed signal in the current frame.

A method for the calculating, by the calculation apparatus, the first downmixed signal in the current frame based on the second downmixed signal in the current frame and the compensated downmixed signal in the current frame includes: determining, by the calculation apparatus, a sum of the second downmixed signal in the current frame and the compensated downmixed signal in the current frame as the first downmixed signal in the current frame. A method for the calculating, by the calculation apparatus, a compensated downmixed signal in a subframe i of the current frame based on a second frequency-domain signal in the subframe i of the current frame and a downmix compensation factor of the subframe i of the current frame includes: determining, by the calculation apparatus, a product of the second frequency-domain signal in the subframe i of the current frame and the downmix compensation factor of the subframe i of the current frame as the compensated downmixed signal in the subframe i of the current frame. A method for the calculating, by the calculation apparatus, a first downmixed signal in the subframe i of the current frame based on a second downmixed signal in the subframe i of the current frame and the compensated downmixed signal in the subframe i of the current frame includes: determining, by the calculation apparatus, a sum of the second downmixed signal in the subframe i of the current frame and the compensated downmixed signal in the subframe i of the current frame as the first downmixed signal in the subframe i of the current frame.

Optionally, in another possible implementation of this application, a method for the obtaining, by the calculation apparatus, a downmix compensation factor of the current frame includes: calculating, by the calculation apparatus, the downmix compensation factor of the current frame based on at least one of the left channel frequency-domain signal in the current frame, the right channel frequency-domain signal in the current frame, the second downmixed signal in the current frame, the residual signal in the current frame, or a first flag, where the first flag is used to indicate whether a stereo parameter other than an inter-channel time difference parameter needs to be encoded in the current frame; or calculating, by the calculation apparatus, the downmix compensation factor of the subframe i of the current frame based on at least one of the left channel frequency-domain signal in the subframe i of the current frame, the right channel frequency-domain signal in the subframe i of the current frame, the second downmixed signal in the subframe i of the current frame, a residual signal in the subframe i of the current frame, or a second flag, where the second flag is used to indicate whether a stereo parameter other than an inter-channel time difference parameter needs to be encoded in the subframe i of the current frame, the current frame includes P subframes, and the downmix compensation factor of the current frame includes the downmix compensation factor of the subframe i of the current frame, where both P and i are integers, $P \geq 2$, and $i \in [0, P-1]$; or calculating, by the calculation apparatus, the downmix compensation factor in the subframe i of the current frame based on at least one of the left channel frequency-domain signal in the subframe i of the current frame, the right channel frequency-domain signal in the subframe i of the current frame, the second downmixed signal in the subframe i of the current frame, a residual signal in the subframe i of the current frame, or a first flag, where the first flag is used to indicate whether a stereo parameter other than an inter-channel time difference parameter needs to be encoded in the current frame, the current frame includes P subframes, and the downmix compensation factor of the current frame includes the downmix compensation factor of the subframe i of the current frame, where both P and i are integers, $P \geq 2$, and $i \in [0, P-1]$.

Optionally, in another possible implementation of this application, when the second frequency-domain signal in the subframe i of the current frame is the left channel frequency-domain signal in the subframe i of the current frame, a method for the calculating, by the calculation apparatus, the downmix compensation factor of the subframe i of the current frame based on at least one of the left channel frequency-domain signal in the subframe i of the current frame, the right channel frequency-domain signal in the subframe i of the current frame, the second downmixed signal in the subframe i of the current frame, a residual signal in the subframe i of the current frame, or a second flag includes: calculating, by the calculation apparatus, the downmix compensation factor of the subframe i of the current frame based on the left channel frequency-domain signal in the subframe i of the current frame and the right channel frequency-domain signal in the subframe i of the current frame. A downmix compensation factor $\alpha_i(b)$ in a subband b in the subframe i of the current frame is calculated according to the following formula:

$$\alpha_i(b) = \frac{\sqrt{E\_L_i(b)} + \sqrt{E\_R_i(b)} - \sqrt{E\_LR_i(b)}}{2\sqrt{E\_L_i(b)}}$$

In the formula, $E\_L_i(b)=\sum_{k=band\_limits(b)}^{k=band\_limits(b+1)-1} L_{ib}''(k)^2$, $E\_R_i(b)=\sum_{k=band\_limits(b)}^{k=band\_limits(b+1)-1} R_{ib}''(k)^2$, and $E\_LR_i(b)=\sum_{k=band\_limits(b)}^{k=band\_limits(b+1)-1}[L_{ib}''(k)^2+R_{ib}''(k)]^2$; or $E\_L_i(b)=\sum_{k=band\_limits(b)}^{k=band\_limits(b+1)-1} L_{ib}''(k)^2$, $E\_R_i(b)=\sum_{k=band\_limits(b)}^{k=band\_limits(b+1)-1} R_{ib}''(k)^2$, and $E\_LR_i(b)=\sum_{k=band\_limits(b)}^{k=band\_limits(b+1)-1} [L_{ib}''(k)+R_{ib}'(k)]^2$.

$E\_L_i(b)$ represents an energy sum of a left channel frequency-domain signal in the subband b in the subframe i of the current frame; $E\_R_i(b)$ represents an energy sum of a right channel frequency-domain signal in the subband b in the subframe i of the current frame; $E\_LR_i(b)$ represents an energy sum of the energy of the left channel frequency-domain signal and the energy of the right channel frequency-domain signal in the subband b in the subframe i of the current frame; band_limits(b) represents a minimum frequency bin index value of the subband b in the subframe i of the current frame; band_limits(b+1) represents a minimum frequency bin index value of a subband b+1 in the subframe i of the current frame; $L_{ib}''(k)$ represents a left channel frequency-domain signal that is in the subband b in the subframe i of the current frame and that is obtained after adjustment based on a stereo parameter; $R_{ib}''(k)$ represents a right channel frequency-domain signal that is in the subband b in the subframe i of the current frame and that is obtained after adjustment based on the stereo parameter; $L_{ib}'(k)$ represents a left channel frequency-domain signal that is in the subband b in the subframe i of the current frame and that is obtained after time-shift adjustment; $R_{ib}'(k)$ represents a right channel frequency-domain signal that is in the subband b in the subframe i of the current frame and that is obtained after time-shift adjustment; and k represents a frequency bin index value, where each subframe of the current frame includes M subbands, the downmix compensation factor of the subframe i of the current frame includes the downmix compensation factor of the subband b in the subframe i of the current frame, b is an integer, b∈[0, M−1], and M≥2.

Correspondingly, a method for the calculating, by the calculation apparatus, a compensated downmixed signal in a subframe i of the current frame based on a second frequency-domain signal in the subframe i of the current frame and a downmix compensation factor of the subframe i of the current frame includes: calculating, by the calculation apparatus, a compensated downmixed signal in the subband b in the subframe i of the current frame according to a formula $DMX\_comp_{ib}(k)=\alpha_i(b)*L_{ib}''(k)$, where $DMX\_comp_{ib}(k)$ represents the compensated downmixed signal in the subband b in the subframe i of the current frame, k represents a frequency bin index value, and k∈[band_limits(b), band_limits(b+1)−1].

Optionally, in another possible implementation of this application, when the second frequency-domain signal in the subframe i of the current frame is the left channel frequency-domain signal in the subframe i of the current frame, a method for the calculating, by the calculation apparatus, the downmix compensation factor of the subframe i of the current frame based on at least one of the left channel frequency-domain signal in the subframe i of the current frame, the right channel frequency-domain signal in the subframe i of the current frame, the second downmixed signal in the subframe i of the current frame, a residual signal in the subframe i of the current frame, or a second flag includes: calculating, by the calculation apparatus, the downmix compensation factor of the subframe i of the current frame based on the left channel frequency-domain signal in the subframe i of the current frame and the residual signal in the subframe i of the current frame. A downmix compensation factor $\alpha_i(b)$ in a subband b in the subframe i of the current frame is calculated according to the following formula:

$$\alpha_i(b)=\sqrt{\frac{E\_S_i(b)}{E\_L_i(b)}}$$

In the formula, $E\_S_i(b)=\sum_{k=band\_limits(b)}^{k=band\_limits(b+1)-1} RES_{ib}'(k)^2$, and $E\_L_i(b)=\sum_{k=band\_limits(b)}^{k=band\_limits(b+1)-1} L_{ib}''(k)^2$.

$E\_L_i(b)$ represents an energy sum of a left channel frequency-domain signal in the subband b in the subframe i of the current frame; $E\_S_i(b)$ represents an energy sum of a residual signal in the subband b in the subframe i of the current frame; band_limits(b) represents a minimum frequency bin index value of the subband b in the subframe i of the current frame; band_limits(b+1) represents a minimum frequency bin index value of a subband b+1 in the subframe i of the current frame; $L_{ib}''(k)$ represents a left channel frequency-domain signal that is in the subband b in the subframe i of the current frame and that is obtained after adjustment based on a stereo parameter; $RES_{ib}'(k)$ represents the residual signal in the subband b in the subframe i of the current frame; and k represents a frequency bin index value, where each subframe of the current frame includes M subbands, the downmix compensation factor of the subframe i of the current frame includes the downmix compensation factor of the subband b in the subframe i of the current frame, b is an integer, b∈[0, M−1], and M≥2.

Correspondingly, a method for the calculating, by the calculation apparatus, a compensated downmixed signal in a subframe i of the current frame based on a second frequency-domain signal in the subframe i of the current frame and a downmix compensation factor of the subframe i of the current frame includes: calculating, by the calculation apparatus, a compensated downmixed signal in the subband b in the subframe i of the current frame according to a formula $DMX\_comp_{ib}(k)=\alpha_i(b)*L_{ib}''(k)$, where $DMX\_comp_{ib}(k)$ represents the compensated downmixed signal in the subband b in the subframe i of the current frame, k represents a frequency bin index value, and k∈[band_limits(b), band_limits(b+1)−1].

Optionally, in another possible implementation of this application, when the second frequency-domain signal in the subframe i of the current frame is the left channel frequency-domain signal in the subframe i of the current frame, a method for the calculating, by the calculation apparatus, the downmix compensation factor of the subframe i of the current frame based on at least one of the left channel frequency-domain signal in the subframe i of the current frame, the right channel frequency-domain signal in the subframe i of the current frame, the second downmixed signal in the subframe i of the current frame, a residual signal in the subframe i of the current frame, or a second flag includes: calculating, by the calculation apparatus, the downmix compensation factor of the subframe i of the current frame based on the left channel frequency-domain signal in the subframe i of the current frame, the right channel frequency-domain signal in the subframe i of the current frame, and the second flag. A downmix compensation factor $\alpha_i$ (b) in a subband b in the subframe i of the current frame is calculated according to the following formula:

$$\alpha_i(b)=\begin{cases}\dfrac{\sqrt{E\_L_i(b)}+\sqrt{E\_R_i(b)}-\sqrt{E\_LR_i(b)}}{2\sqrt{E\_L_i(b)}}, & \text{nipd\_flag}=1\\ 0, & \text{nipd\_flag}=0\end{cases}$$

In the formula, $E\_L_i(b)=\sum_{k=band\_limits(b)}^{k=band\_limits(b+1)-1} L_{ib}'(k)^2$, $E\_R_i(b)=\sum_{k=band\_limits(b)}^{k=band\_limits(b+1)-1} R_{ib}'(k)^2$, and $E\_LR_i(b)=\sum_{k=band\_limits(b)}^{k=band\_limits(b+1)-1} [L_{ib}'(k)+R_{ib}'(k)]^2$.

$E\_L_i(b)$ represents an energy sum of a left channel frequency-domain signal in the subband b in the subframe i of the current frame; $E\_R_i(b)$ represents an energy sum of a right channel frequency-domain signal in the subband b in the subframe i of the current frame; $E\_R_i(b)$ represents an energy sum of the energy of the left channel frequency-domain signal and the energy of the right channel frequency-domain signal in the subband b in the subframe i of the current frame; band_limits(b) represents a minimum frequency bin index value of the subband b in the subframe i of the current frame; band_limits(b+1) represents a minimum frequency bin index value of a subband b+1 in the subframe i of the current frame; $L_{ib}'(k)$ represents a left channel frequency-domain signal that is in the subband b in the subframe i of the current frame and that is obtained after time-shift adjustment; $R_{ib}'(k)$ represents a right channel frequency-domain signal that is in the subband b in the subframe i of the current frame and that is obtained after time-shift adjustment; nipd_flag represents the second flag; nipd_flag=1 indicates that a stereo parameter other than an inter-channel time difference parameter does not need to be encoded in the subframe i of the current frame; nipd_flag=0 indicates that a stereo parameter other than an inter-channel time difference parameter needs to be encoded in the subframe i of the current frame; and k represents a frequency bin index value, where each subframe of the current frame includes M subbands, the downmix compensation factor of the subframe i of the current frame includes the downmix compensation factor of the subband b in the subframe i of the current frame, b is an integer, b∈[0, M−1], and M≥2.

Correspondingly, a method for the calculating, by the calculation apparatus, a compensated downmixed signal in a subframe i of the current frame based on a second frequency-domain signal in the subframe i of the current frame and a downmix compensation factor of the subframe i of the current frame includes: calculating, by the calculation apparatus, a compensated downmixed signal in the subband b in the subframe i of the current frame according to a formula $DMX\_comp_{ib}(k)=\alpha_i(b)*L_{ib}''(k)$, where $DMX\_comp_{ib}(k)$ represents the compensated downmixed signal in the subband b in the subframe i of the current frame, $L_{ib}''(k)$ represents a left channel frequency-domain signal that is in the subband b in the subframe i of the current frame and that is obtained after adjustment based on a stereo parameter, k represents a frequency bin index value, and k∈[band_limits(b), band_limits(b+1)−1].

Optionally, in another possible implementation of this application, when the second frequency-domain signal in the subframe i of the current frame is the left channel frequency-domain signal in the subframe i of the current frame, a method for the calculating, by the calculation apparatus, the downmix compensation factor of the subframe i of the current frame based on at least one of the left channel frequency-domain signal in the subframe i of the current frame, the right channel frequency-domain signal in the subframe i of the current frame, the second downmixed signal in the subframe i of the current frame, a residual signal in the subframe i of the current frame, or a second flag includes: calculating, by the calculation apparatus, the downmix compensation factor of the subframe i of the current frame based on the left channel frequency-domain signal in the subframe i of the current frame and the right channel frequency-domain signal in the subframe i of the current frame. The downmix compensation factor $\alpha_i$ of the subframe i of the current frame is calculated according to the following formula:

$$\alpha_i=\frac{\sqrt{E\_L_i}+\sqrt{E\_R_i}-\sqrt{E\_LR_i}}{2\sqrt{E\_L_i}}$$

In the formula, $E\_L_i=\sum_{k=band\_limits\_1}^{k=band\_limits\_2-1}L_i''(k)^2$, $E\_R_i=\sum_{k=band\_limits\_1}^{k=band\_limits\_2-1}R_i''(k)^2$, and $E\_LR_i=\sum_{k=band\_limits\_1}^{k=band\_limits\_2-1}[L_i''(k)+R_i''(k)]^2$; or $E\_L_i=\sum_{k=band\_limits\_1}^{k=band\_limits\_2-1}L_i'(k)^2$, $E\_R_i=\sum_{k=band\_limits\_1}^{k=band\_limits\_2-1}R_i'(k)^2$, and $E\_LR_i=\sum_{k=band\_limits\_1}^{k=band\_limits\_2-1}[L_i'(k)+R_i'(k)]^2$.

$E\_L_i$ represents an energy sum of left channel frequency-domain signals in all subbands of the preset frequency band in the subframe i of the current frame; $E\_R_i$ represents an energy sum of right channel frequency-domain signals in all the subbands of the preset frequency band in the subframe i of the current frame; $E\_LR_i$ represents an energy sum of the energy of the left channel frequency-domain signals and the energy of the right channel frequency-domain signals in all the subbands of the preset frequency band in the subframe i of the current frame; band_limits_1 represents a minimum frequency bin index value of all the subbands of the preset frequency band; band_limits_2 represents a maximum frequency bin index value of all the subbands of the preset frequency band; $L_i''(k)$ represents a left channel frequency-domain signal that is in the subframe i of the current frame and that is obtained after adjustment based on a stereo parameter; $R_i''(k)$ represents a right channel frequency-domain signal that is in the subframe i of the current frame and that is obtained after adjustment based on the stereo parameter; $L_i'(k)$ represents a left channel frequency-domain signal that is in the subframe i of the current frame and that is obtained after time-shift adjustment; $R_i'(k)$ represents a right channel frequency-domain signal that is in the subframe i of the current frame and that is obtained after time-shift adjustment; and k represents a frequency bin index value.

Correspondingly, a method for the calculating, by the calculation apparatus, a compensated downmixed signal in a subframe i of the current frame based on a second frequency-domain signal in the subframe i of the current frame and a downmix compensation factor of the subframe i of the current frame includes: calculating, by the calculation apparatus, a compensated downmixed signal in each subband of the preset frequency band in the subframe i of the current frame according to a formula $DMX\_comp_i(k)=\alpha_i*L_i''(k)$, where $DMX\_comp_i(k)$ represents the compensated downmixed signal in each subband of the preset frequency band in the subframe i of the current frame, k represents a frequency bin index value, and k∈[band_limits_1, band_limits_2].

Optionally, in another possible implementation of this application, when the second frequency-domain signal in the subframe i of the current frame is the left channel frequency-domain signal in the subframe i of the current frame, a method for the calculating, by the calculation apparatus, the downmix compensation factor of the subframe i of the current frame based on at least one of the left channel frequency-domain signal in the subframe i of the current frame, the right channel frequency-domain signal in the subframe i of the current frame, the second downmixed signal in the subframe i of the current frame, a residual signal in the subframe i of the current frame, or a second flag includes: calculating, by the calculation apparatus, the downmix compensation factor of the subframe i of the current frame based on the left channel frequency-domain signal in the subframe i of the current frame and the residual signal in the subframe i of the current frame. The downmix compensation factor $\alpha_i$ of the subframe i of the current frame is calculated according to the following formula:

$$\alpha_i=\sqrt{\frac{E\_S_i}{E\_L_i}}$$

In the formula, $E\_L_i=\sum_{k=band\_limits\_1}^{k=band\_limits\_2-1}L_i''(k)^2$, $E\_S_i=\sum_{k=band\_limits\_1}^{k=band\_limits\_2-1}RES_i'(k)^2$.

$E\_S_i$ represents an energy sum of residual signals in all subbands of the preset frequency band in the subframe i of the current frame; $E\_L_i$ represents an energy sum of left channel frequency-domain signals in all the subbands of the preset frequency band in the subframe i of the current frame; $L_i''(k)$ represents a left channel frequency-domain signal that is in the subframe i of the current frame and that is obtained after adjustment based on a stereo parameter; band_limits_1 represents a minimum frequency bin index value of all the subbands of the preset frequency band; band_limits_2 represents a maximum frequency bin index value of all the subbands of the preset frequency band; $RES_i'(k)$ represents the residual signals in all the subbands of the preset frequency band in the subframe i of the current frame; and k represents a frequency bin index value.

Correspondingly, a method for the calculating, by the calculation apparatus, a compensated downmixed signal in a subframe i of the current frame based on a second frequency-domain signal in the subframe i of the current frame and a downmix compensation factor of the subframe i of the current frame includes: calculating, by the calculation apparatus, a compensated downmixed signal in each subband of the preset frequency band in the subframe i of the current frame according to a formula $DMX\_comp_i(k)=\alpha_i*L_i''(k)$, where $DMX\_comp_i(k)$ represents the compensated downmixed signal in each subband of the preset frequency band in the subframe i of the current frame, k represents a frequency bin index value, and $k\in$[band_limits_1, band_limits_2].

Optionally, in another possible implementation of this application, when the second frequency-domain signal in the subframe i of the current frame is the left channel frequency-domain signal in the subframe i of the current frame, a method for the calculating, by the calculation apparatus, the downmix compensation factor of the subframe i of the current frame based on at least one of the left channel frequency-domain signal in the subframe i of the current frame, the right channel frequency-domain signal in the subframe i of the current frame, the second downmixed signal in the subframe i of the current frame, a residual signal in the subframe i of the current frame, or a second flag includes: calculating, by the calculation apparatus, the downmix compensation factor of the subframe i of the current frame based on the left channel frequency-domain signal in the subframe i of the current frame, the right channel frequency-domain signal in the subframe i of the current frame, and the second flag. The downmix compensation factor $\alpha_i$ of the subframe i of the current frame is calculated according to the following formula:

$$\alpha_i = \begin{cases} \dfrac{\sqrt{E\_L_i} + \sqrt{E\_R_i} - \sqrt{E\_LR_i}}{2\sqrt{E\_L_i}}, & \text{nipd\_flag} = 1 \\ 0, & \text{nipd\_flag} = 0 \end{cases}$$

In the formula, $E\_L_i=\sum_{k=band\_limits\_1}^{k=band\_limits\_2-1} L_i'(k)^2$, $E\_R_i=\sum_{k=band\_limits\_1}^{k=band\_limits\_2-1} R_i'(k)^2$, and $E\_LR_i=\sum_{k=band\_limits\_1}^{k=band\_limits\_2-1} [L_i'(k)+R_i']^2$.

$E\_L_i$ represents an energy sum of left channel frequency-domain signals in all subbands of the preset frequency band in the subframe i of the current frame; $E\_R_i$ represents an energy sum of right channel frequency-domain signals in all the subbands of the preset frequency band in the subframe i of the current frame; $E\_LR_i$ represents an energy sum of the energy of the left channel frequency-domain signals and the energy of the right channel frequency-domain signals in all the subbands of the preset frequency band in the subframe i of the current frame; band_limits_1 represents a minimum frequency bin index value of all the subbands of the preset frequency band; band_limits_2 represents a maximum frequency bin index value of all the subbands of the preset frequency band; $L_i'(k)$ represents a left channel frequency-domain signal that is in the subframe i of the current frame and that is obtained after time-shift adjustment; $R_i'(k)$ represents a right channel frequency-domain signal that is in the subframe i of the current frame and that is obtained after time-shift adjustment; k represents a frequency bin index value; nipd_flag represents the second flag; nipd_flag=1 indicates that a stereo parameter other than an inter-channel time difference parameter does not need to be encoded in the subframe i of the current frame; and nipd_flag=0 indicates that a stereo parameter other than an inter-channel time difference parameter needs to be encoded in the subframe i of the current frame.

Correspondingly, a method for the calculating, by the calculation apparatus, a compensated downmixed signal in a subframe i of the current frame based on a second frequency-domain signal in the subframe i of the current frame and a downmix compensation factor of the subframe i of the current frame includes: calculating, by the calculation apparatus, a compensated downmixed signal in each subband of the preset frequency band in the subframe i of the current frame according to a formula $DMX\_comp_i(k)=\alpha_i*L_i''(k)$, where $DMX\_comp_i(k)$ represents the compensated downmixed signal in each subband of the preset frequency band in the subframe i of the current frame, $L_i''(k)$ represents a left channel frequency-domain signal that is in the subframe i of the current frame and that is obtained after adjustment based on a stereo parameter, k represents a frequency bin index value, and $k\in$[band_limits_1, band_limits_2].

Optionally, in another possible implementation of this application, when the second frequency-domain signal in the subframe i of the current frame is the right channel frequency-domain signal in the subframe i of the current frame, a method for the calculating, by the calculation apparatus, the downmix compensation factor of the subframe i of the current frame based on at least one of the left channel frequency-domain signal in the subframe i of the current frame, the right channel frequency-domain signal in the subframe i of the current frame, the second downmixed signal in the subframe i of the current frame, a residual signal in the subframe i of the current frame, or a second flag includes: calculating, by the calculation apparatus, the downmix compensation factor of the subframe i of the current frame based on the left channel frequency-domain signal in the subframe i of the current frame and the residual signal in the subframe i of the current frame. A downmix compensation factor $\alpha_i(b)$ in a subband b in the subframe i of the current frame is calculated according to the following formula:

$$\alpha_i(b) = \frac{\sqrt{E\_L_i(b)} + \sqrt{E\_R_i(b)} - \sqrt{E\_LR_i(b)}}{2\sqrt{E\_R_i(b)}}$$

In the formula, $E\_L_i(b)=\sum_{k=band\_limits(b)}^{k=band\_limits(b+1)-1} L_{ib}''(k)^2$, $E\_R_i(b)=\sum_{k=band\_limits(b)}^{k=band\_limits(b+1)-1} R_{ib}''(k)^2$, and $E\_LR_i(b)=\sum_{k=band\_limits(b)}^{k=band\_limits(b+1)-1}[L_{ib}''(k)^2+R_{ib}''(k)]^2$; or $E\_L_i(b)=\sum_{k=band\_limits(b)}^{k=band\_limits(b+1)-1} L_{ib}'(k)^2$, $E\_R_i(b)=\sum_{k=band\_limits(b)}^{k=band\_limits(b+1)-1} R_{ib}'(k)^2$, and $E\_LR_i(b)=\sum_{k=band\_limits(b)}^{k=band\_limits(b+1)-1} [L_{ib}'(k)+R_{ib}'(k)]^2$.

$E\_L_i(b)$ represents an energy sum of a left channel frequency-domain signal in the subband b in the subframe i of the current frame; $E\_R_i(b)$ represents an energy sum of a right channel frequency-domain signal in the subband b in the subframe i of the current frame; $E\_LR_i(b)$ represents an energy sum of the energy of the left channel frequency-domain signal and the energy of the right channel frequency-domain signal in the subband b in the subframe i of the current frame; band_limits(b) represents a minimum frequency bin index value of the subband b in the subframe i of the current frame; band_limits(b+1) represents a minimum frequency bin index value of a subband b+1 in the subframe i of the current frame; $L_{ib}''(k)$ represents a left channel frequency-domain signal that is in the subband b in the subframe i of the current frame and that is obtained after adjustment based on a stereo parameter; $R_{ib}''(k)$ represents a right channel frequency-domain signal that is in the subband b in the subframe i of the current frame and that is obtained after adjustment based on the stereo parameter; $L_{ib}'(k)$ represents a left channel frequency-domain signal that is in the subband b in the subframe i and that is obtained after time-shift adjustment; $R_{ib}'(k)$ represents a right channel frequency-domain signal that is in the subband bin the subframe i of the current frame and that is obtained after time-shift adjustment; and k represents a frequency bin index value, where each subframe of the current frame includes M subbands, the downmix compensation factor of the subframe i of the current frame includes the downmix compensation factor of the subband b in the subframe i of the current frame, b is an integer, b∈[0, M−1], and M≥2.

Correspondingly, a method for the calculating, by the calculation apparatus, a compensated downmixed signal in a subframe i of the current frame based on a second frequency-domain signal in the subframe i of the current frame and a downmix compensation factor of the subframe i of the current frame includes: calculating, by the calculation apparatus, a compensated downmixed signal in the subband b in the subframe i of the current frame according to a formula $DMX\_comp_{ib}(k)=\alpha_i(b)*R_{ib}''(k)$, where $DMX\_comp_{ib}(k)$ represents the compensated downmixed signal in the subband b in the subframe i of the current frame, k represents a frequency bin index value, and k∈[band_limits(b), band_limits(b+1)−1].

Optionally, in another possible implementation of this application, when the second frequency-domain signal in the subframe i of the current frame is the right channel frequency-domain signal in the subframe i of the current frame, a method for the calculating, by the calculation apparatus, the downmix compensation factor of the subframe i of the current frame based on at least one of the left channel frequency-domain signal in the subframe i of the current frame, the right channel frequency-domain signal in the subframe i of the current frame, the second downmixed signal in the subframe i of the current frame, a residual signal in the subframe i of the current frame, or a second flag includes: calculating, by the calculation apparatus, the downmix compensation factor of the subframe i of the current frame based on the left channel frequency-domain signal in the subframe i of the current frame and the residual signal in the subframe i of the current frame. A downmix compensation factor $\alpha_i(b)$ in a subband b in the subframe i of the current frame is calculated according to the following formula:

$$\alpha_i(b)=\sqrt{\frac{E\_S_i(b)}{E\_R_i(b)}}$$

In the formula, $E\_S_i(b)=\sum_{k=band\_limits(b)}^{k=band\_limits(b+1)-1} RES_{ib}'(k)^2$, and $E\_L_i(b)=\sum_{k=band\_limits(b)}^{k=band\_limits(b+1)-1} L_{ib}''(k)^2$.

$E\_R_i(b)$ represents an energy sum of a right channel frequency-domain signal in the subband b in the subframe i of the current frame; $E\_S_i(b)$ represents an energy sum of a residual signal in the subband b in the subframe i of the current frame; band_limits(b) represents a minimum frequency bin index value of the subband b in the subframe i of the current frame; band_limits(b+1) represents a minimum frequency bin index value of a subband b+1 in the subframe i of the current frame; $R_{ib}''(k)$ represents a right channel frequency-domain signal that is in the subband b in the subframe i of the current frame and that is obtained after adjustment based on the stereo parameter; $RES_{ib}'(k)$ represents the residual signal in the subband b in the subframe i of the current frame; and k represents a frequency bin index value, where each subframe of the current frame includes M subbands, the downmix compensation factor of the subframe i of the current frame includes the downmix compensation factor of the subband b in the subframe i of the current frame, b is an integer, b∈[0, M−1], and M≥2.

Correspondingly, a method for the calculating, by the calculation apparatus, a compensated downmixed signal in a subframe i of the current frame based on a second frequency-domain signal in the subframe i of the current frame and a downmix compensation factor of the subframe i of the current frame includes: calculating, by the calculation apparatus, a compensated downmixed signal in the subband b in the subframe i of the current frame according to a formula $DMX\_comp_{ib}(k)=\alpha_i(b)*R_{ib}''(k)$, where $DMX\_comp_{ib}(k)$ represents the compensated downmixed signal in the subband b in the subframe i of the current frame, k represents a frequency bin index value, and k∈[band_limits(b), band_limits(b+1)−1].

Optionally, in another possible implementation of this application, when the second frequency-domain signal in the subframe i of the current frame is the right channel frequency-domain signal in the subframe i of the current frame, a method for the calculating, by the calculation apparatus, the downmix compensation factor of the subframe i of the current frame based on at least one of the left channel frequency-domain signal in the subframe i of the current frame, the right channel frequency-domain signal in the subframe i of the current frame, the second downmixed signal in the subframe i of the current frame, a residual signal in the subframe i of the current frame, or a second flag includes: calculating, by the calculation apparatus, the downmix compensation factor of the subframe i of the current frame based on the left channel frequency-domain signal in the subframe i of the current frame, the right channel frequency-domain signal in the subframe i of the current frame, and the second flag. A downmix compensation factor $\alpha_i$ (b) in a subband b in the subframe i of the current frame is calculated according to the following formula:

$$\alpha_i(b)=\begin{cases}\dfrac{\sqrt{E\_L_i(b)}+\sqrt{E\_R_i(b)}-\sqrt{E\_LR_i(b)}}{2\sqrt{E\_R_i(b)}}, & \text{nipd\_flag}=1\\ 0, & \text{nipd\_flag}=0\end{cases}$$

In the formula, $E\_L_i(b)=\sum_{k=band\_limits(b)}^{k=band\_limits(b+1)-1} L_{ib}'(k)^2$, $E\_R_i(b)=\sum_{k=band\_limits(b)}^{k=band\_limits(b+1)-1} R_{ib}'(k)^2$, and $E\_LR_i(b)=\sum_{k=band\_limits(b)}^{k=band\_limits(b+1)-1} [L_{ib}'(k)+R_{ib}'(k)]^2$.

$E\_L_i(b)$ represents an energy sum of a left channel frequency-domain signal in the subband b in the subframe i of the current frame; $E\_R_i(b)$ represents an energy sum of a right channel frequency-domain signal in the subband b in the subframe i of the current frame; $E\_LR_i(b)$ represents an energy sum of the energy of the left channel frequency-domain signal and the energy of the right channel frequency-domain signal in the subband b in the subframe i of the current frame; band_limits(b) represents a minimum frequency bin index value of the subband b in the subframe i of the current frame; band_limits(b+1) represents a minimum frequency bin index value of a subband b+1 in the subframe i of the current frame; $L_{ib}'(k)$ represents a left channel frequency-domain signal that is in the subband b in the subframe i of the current frame and that is obtained after time-shift adjustment; $R_{ib}'(k)$ represents a right channel frequency-domain signal that is in the subband b in the subframe i of the current frame and that is obtained after time-shift adjustment; nipd_flag represents the second flag; nipd_flag=1 indicates that a stereo parameter other than an inter-channel time difference parameter does not need to be encoded in the subframe i of the current frame; nipd_flag=0 indicates that a stereo parameter other than an inter-channel time difference parameter needs to be encoded in the subframe i of the current frame; and k represents a frequency bin index value, where each subframe of the current frame includes M subbands, the downmix compensation factor of the subframe i of the current frame includes the downmix compensation factor of the subband b in the subframe i of the current frame, b is an integer, $b \in [0, M-1]$, and $M \geq 2$.

Correspondingly, a method for the calculating, by the calculation apparatus, a compensated downmixed signal in a subframe i of the current frame based on a second frequency-domain signal in the subframe i of the current frame and a downmix compensation factor of the subframe i of the current frame includes: calculating, by the calculation apparatus, a compensated downmixed signal in the subband b in the subframe i of the current frame according to a formula $DMX\_comp_{ib}(k)=\alpha_i(b)*R_{ib}''(k)$, where $DMX\_comp_{ib}(k)$ represents the compensated downmixed signal in the subband b in the subframe i of the current frame, $R_{ib}''(k)$ represents a right channel frequency-domain signal that is in the subband b in the subframe i of the current frame and that is obtained after adjustment based on the stereo parameter, k represents a frequency bin index value, and $k \in [band\_limits(b), band\_limits(b+1)-1]$.

Optionally, in another possible implementation of this application, when the second frequency-domain signal in the subframe i of the current frame is the right channel frequency-domain signal in the subframe i of the current frame, a method for the calculating, by the calculation apparatus, the downmix compensation factor of the subframe i of the current frame based on at least one of the left channel frequency-domain signal in the subframe i of the current frame, the right channel frequency-domain signal in the subframe i of the current frame, the second downmixed signal in the subframe i of the current frame, a residual signal in the subframe i of the current frame, or a second flag includes: calculating, by the calculation apparatus, the downmix compensation factor of the subframe i of the current frame based on the left channel frequency-domain signal in the subframe i of the current frame and the right channel frequency-domain signal in the subframe i of the current frame. The downmix compensation factor $\alpha_i$ of the subframe i of the current frame is calculated according to the following formula:

$$\alpha_i = \frac{\sqrt{E\_L_i} + \sqrt{E\_R_i} - \sqrt{E\_LR_i}}{2\sqrt{E\_R_i}}$$

In the formula, $E\_L_i=\sum_{k=band\_limits\_1}^{k=band\_limits\_2-1} L_i''(k)^2$, $E\_R_i=\sum_{k=band\_limits\_1}^{k=band\_limits\_2-1} R_i'(k)^2$, and $E\_LR_i=\sum_{k=band\_limits\_1}^{k=band\_limits\_2-1} [L_i'(k)+R_i']^2$; or $E\_L_i=\sum_{k=band\_limits\_1}^{k=band\_limits\_2-1} L_i'(k)^2$, $E\_R_i=\sum_{k=band\_limits\_1}^{k=band\_limits\_2-1} R_i'(k)^2$, and $E\_LR_i=\sum_{k=band\_limits\_1}^{k=band\_limits\_2-1} [L_i'(k)+R_i']^2$.

$E\_L_i$ represents an energy sum of left channel frequency-domain signals in all subbands of the preset frequency band in the subframe i of the current frame; $E\_R_i$ represents an energy sum of right channel frequency-domain signals in all the subbands of the preset frequency band in the subframe i of the current frame; $E\_LR_i$ represents an energy sum of the energy of the left channel frequency-domain signals and the energy of the right channel frequency-domain signals in all the subbands of the preset frequency band in the subframe i of the current frame; band_limits_1 represents a minimum frequency bin index value of all the subbands of the preset frequency band; band_limits_2 represents a maximum frequency bin index value of all the subbands of the preset frequency band; $L_i''(k)$ represents a left channel frequency-domain signal that is in the subframe i of the current frame and that is obtained after adjustment based on a stereo parameter; $R_i''(k)$ represents a right channel frequency-domain signal that is in the subframe i of the current frame and that is obtained after adjustment based on the stereo parameter; $L_i'(k)$ represents a left channel frequency-domain signal that is in the subframe i of the current frame and that is obtained after time-shift adjustment; $R_i'(k)$ represents a right channel frequency-domain signal that is in the subframe i of the current frame and that is obtained after time-shift adjustment; and k represents a frequency bin index value.

Correspondingly, a method for the calculating, by the calculation apparatus, a compensated downmixed signal in a subframe i of the current frame based on a second frequency-domain signal in the subframe i of the current frame and a downmix compensation factor of the subframe i of the current frame includes: calculating, by the calculation apparatus, a compensated downmixed signal in each subband of the preset frequency band in the subframe i of the current frame according to a formula $DMX\_comp_i(k)=\alpha_i*R_i''(k)$, where $DMX\_comp_i(k)$ represents the compensated downmixed signal in each subband of the preset frequency band in the subframe i of the current frame, k represents a frequency bin index value, and $k \in [band\_limits\_1, band\_limits\_2]$.

Optionally, in another possible implementation of this application, when the second frequency-domain signal in the subframe i of the current frame is the right channel frequency-domain signal in the subframe i of the current frame, a method for the calculating, by the calculation apparatus, the downmix compensation factor of the subframe i of the current frame based on at least one of the left channel frequency-domain signal in the subframe i of the current frame, the right channel frequency-domain signal in the subframe i of the current frame, the second downmixed signal in the subframe i of the current frame, a residual signal in the subframe i of the current frame, or a second flag includes: calculating, by the calculation apparatus, the downmix compensation factor of the subframe i of the current frame based on the right channel frequency-domain signal in the subframe i of the current frame and the residual signal in the subframe i of the current frame. The downmix compensation factor $\alpha_i$ of the subframe i of the current frame is calculated according to the following formula:

$$\alpha_i = \sqrt{\frac{E\_S_i}{E\_R_i}}$$

In the formula, $E\_R_i=\sum_{k=band\_limits\_1}^{k=band\_limits\_2-1} R_i''(k)^2$ and $E\_S_i=\sum_{k=band\_limits\_1}^{k=band\_limits\_2-1} RES_i'(k)^2$.

$E\_S_i$ represents an energy sum of residual signals in all subbands of the preset frequency band in the subframe i of the current frame; $E\_R_i$ represents an energy sum of right channel frequency-domain signals in all the subbands of the preset frequency band in the subframe i of the current frame; $R_i''(k)$ represents a right channel frequency-domain signal that is in the subframe i of the current frame and that is obtained after adjustment based on a stereo parameter; band_limits_1 represents a minimum frequency bin index value of all the subbands of the preset frequency band; band_limits_2 represents a maximum frequency bin index value of all the subbands of the preset frequency band; $RES_i'(k)$ represents the residual signals in all the subbands of the preset frequency band in the subframe i of the current frame; and k represents a frequency bin index value.

Correspondingly, a method for the calculating, by the calculation apparatus, a compensated downmixed signal in a subframe i of the current frame based on a second frequency-domain signal in the subframe i of the current frame and a downmix compensation factor of the subframe i of the current frame includes: calculating, by the calculation apparatus, a compensated downmixed signal in each subband of the preset frequency band in the subframe i of the current frame according to a formula $DMX\_comp_i(k)=\alpha_i*R_i''(k)$, where $DMX\_comp_i(k)$ represents the compensated downmixed signal in each subband of the preset frequency band in the subframe i of the current frame, k represents a frequency bin index value, and k∈[band_limits_1, band_limits_2].

Optionally, in another possible implementation of this application, when the second frequency-domain signal in the subframe i of the current frame is the right channel frequency-domain signal in the subframe i of the current frame, a method for the calculating, by the calculation apparatus, the downmix compensation factor of the subframe i of the current frame based on at least one of the left channel frequency-domain signal in the subframe i of the current frame, the right channel frequency-domain signal in the subframe i of the current frame, the second downmixed signal in the subframe i of the current frame, a residual signal in the subframe i of the current frame, or a second flag includes: calculating, by the calculation apparatus, the downmix compensation factor of the subframe i of the current frame based on the left channel frequency-domain signal in the subframe i of the current frame, the right channel frequency-domain signal in the subframe i of the current frame, and the second flag. The downmix compensation factor $\alpha_i$ of the subframe i of the current frame is calculated according to the following formula:

$$\alpha_i = \begin{cases} \dfrac{\sqrt{E\_L_i} + \sqrt{E\_R_i} - \sqrt{E\_LR_i}}{2\sqrt{E\_R_i}}, & \text{nipd\_flag} = 1 \\ 0, & \text{nipd\_flag} = 0 \end{cases}$$

In the formula, $E\_L_i=\sum_{k=band\_limits\_1}^{k=band\_limits\_2-1} L_i'(k)^2$, $E\_R_i=\sum_{k=band\_limits\_1}^{k=band\_limits\_2-1} R_i'(k)^2$, and $E\_LR_i(b)=\sum_{k=band\_limits(b)}^{k=band\_limits(b+1)-1}[L_{ib}'(k)^2+R_{ib}'(k)]^2$.

$E\_L_i$ represents an energy sum of left channel frequency-domain signals in all subbands of the preset frequency band in the subframe i of the current frame; $E\_R_i$ represents an energy sum of right channel frequency-domain signals in all the subbands of the preset frequency band in the subframe i of the current frame; $E\_LR_i$ represents an energy sum of the energy of the left channel frequency-domain signals and the energy of the right channel frequency-domain signals in all the subbands of the preset frequency band in the subframe i of the current frame; band_limits_1 represents a minimum frequency bin index value of all the subbands of the preset frequency band; band_limits_2 represents a maximum frequency bin index value of all the subbands of the preset frequency band; $L_i'(k)$ represents a left channel frequency-domain signal that is in the subframe i of the current frame and that is obtained after time-shift adjustment; $R_i'(k)$ represents a right channel frequency-domain signal that is in the subframe i of the current frame and that is obtained after time-shift adjustment; k represents a frequency bin index value; nipd_flag represents the second flag; nipd_flag=1 indicates that a stereo parameter other than an inter-channel time difference parameter does not need to be encoded in the subframe i of the current frame; and nipd_flag=0 indicates that a stereo parameter other than an inter-channel time difference parameter needs to be encoded in the subframe i of the current frame.

Correspondingly, a method for the calculating, by the calculation apparatus, a compensated downmixed signal in a subframe i of the current frame based on a second frequency-domain signal in the subframe i of the current frame and a downmix compensation factor of the subframe i of the current frame includes: calculating, by the calculation apparatus, a compensated downmixed signal in each subband of the preset frequency band in the subframe i of the current frame according to a formula $DMX\_comp_i(k)=\alpha_i*R_i''(k)$, where $DMX\_comp_i(k)$ represents the compensated downmixed signal in each subband of the preset frequency band in the subframe i of the current frame, $R_i''(k)$ represents a right channel frequency-domain signal that is in the subframe i of the current frame and that is obtained after adjustment based on a stereo parameter, k represents a frequency bin index value, and k∈[band_limits_1, band_limits_2].

Optionally, in another possible implementation of this application, $Th1 \le b \le Th2$, $Th1 < b \le Th2$, $Th1 \le b < Th2$, or $Th1 < b < Th2$, where $0 \le Th1 \le Th2 \le M-1$, Th1 represents a minimum subband index value of the preset frequency band, and Th2 represents a maximum subband index value of the preset frequency band.

According to a second aspect, a downmixed signal calculation apparatus is provided. Specifically, the calculation apparatus includes a determining unit and a calculation unit.

Functions implemented by the units and modules provided in this application are specifically as follows.

The determining unit is configured to determine whether a previous frame of a current frame of a stereo signal is a switching frame and whether a residual signal in the previous frame needs to be encoded, or is configured to determine whether a current frame is a switching frame and whether a residual signal in the current frame needs to be encoded. The calculation unit is configured to calculate a first downmixed signal in the current frame when the determining unit determines that the previous frame of the current frame is not a switching frame and the residual signal in the previous frame does not need to be encoded, or when the current frame is not a switching frame and the residual signal in the current frame does not need to be encoded. The determining unit is further configured to determine, as a downmixed signal in a preset frequency band of the current frame, the first downmixed signal in the current frame that is calculated by the calculation unit. The calculation unit is specifically configured to: obtain a second downmixed signal in the current frame and a downmix compensation factor of the current frame; and correct the second downmixed signal in the current frame based on the downmix compensation factor of the current frame, to obtain the first downmixed signal in the current frame.

Optionally, in a possible implementation of this application, the calculation unit is specifically configured to: calculate a compensated downmixed signal in the current frame based on a first frequency-domain signal in the current frame and the downmix compensation factor of the current frame, and calculate the first downmixed signal in the current frame based on the second downmixed signal in the current frame and the compensated downmixed signal in the current frame, where the first frequency-domain signal is a left channel frequency-domain signal in the current frame or a right channel frequency-domain signal in the current frame; or calculate a compensated downmixed signal in a subframe i of the current frame based on a second frequency-domain signal in the subframe i of the current frame and a downmix compensation factor of the subframe i of the current frame, and calculate a first downmixed signal in the subframe i of the current frame based on a second downmixed signal in the subframe i of the current frame and the compensated downmixed signal in the subframe i of the current frame, where the second frequency-domain signal is a left channel frequency-domain signal in the subframe i of the current frame or a right channel frequency-domain signal in the subframe i of the current frame, the current frame includes P subframes, and the first downmixed signal in the current frame includes the first downmixed signal in the subframe i of the current frame, where both P and i are integers, P≥2, and i∈[0, P−1].

Optionally, in another possible implementation of this application, the calculation unit is specifically configured to: determine a product of the first frequency-domain signal in the current frame and the downmix compensation factor of the current frame as the compensated downmixed signal in the current frame, and determine a sum of the second downmixed signal in the current frame and the compensated downmixed signal in the current frame as the first downmixed signal in the current frame; or determine a product of the second frequency-domain signal in the subframe i of the current frame and the downmix compensation factor of the subframe i of the current frame as the compensated downmixed signal in the subframe i of the current frame, and determine a sum of the second downmixed signal in the subframe i of the current frame and the compensated downmixed signal in the subframe i of the current frame as the first downmixed signal in the subframe i of the current frame.

Optionally, in another possible implementation of this application, the calculation unit is specifically configured to: calculate the downmix compensation factor of the current frame based on at least one of the left channel frequency-domain signal in the current frame, the right channel frequency-domain signal in the current frame, the second downmixed signal in the current frame, the residual signal in the current frame, or a first flag, where the first flag is used to indicate whether a stereo parameter other than an inter-channel time difference parameter needs to be encoded in the current frame; or calculate the downmix compensation factor of the subframe i of the current frame based on at least one of the left channel frequency-domain signal in the subframe i of the current frame, the right channel frequency-domain signal in the subframe i of the current frame, the second downmixed signal in the subframe i of the current frame, a residual signal in the subframe i of the current frame, or a second flag, where the second flag is used to indicate whether a stereo parameter other than an inter-channel time difference parameter needs to be encoded in the subframe i of the current frame, the current frame includes P subframes, and the downmix compensation factor of the current frame includes the downmix compensation factor of the subframe i of the current frame, where both P and i are integers, P≥2, and i∈[0, P−1]; or calculate the downmix compensation factor of the subframe i of the current frame based on at least one of the left channel frequency-domain signal in the subframe i of the current frame, the right channel frequency-domain signal in the subframe i of the current frame, the second downmixed signal in the subframe i of the current frame, a residual signal in the subframe i of the current frame, or a first flag, where the first flag is used to indicate whether a stereo parameter other than an inter-channel time difference parameter needs to be encoded in the current frame, the current frame includes P subframes, and the downmix compensation factor of the current frame includes the downmix compensation factor of the subframe i of the current frame, where both P and i are integers, P≥2, and i∈[0, P−1].

Optionally, in another possible implementation of this application, when the second frequency-domain signal in the subframe i of the current frame is the left channel frequency-domain signal in the subframe i of the current frame, the calculation unit is specifically configured to calculate the downmix compensation factor of the subframe i of the current frame based on the left channel frequency-domain signal in the subframe i of the current frame and the right channel frequency-domain signal in the subframe i of the current frame. Herein, a downmix compensation factor $\alpha_i(b)$ in a subband b in the subframe i of the current frame is calculated according to the following formula:

$$\alpha_i(b)=\frac{\sqrt{E\_L_i(b)}+\sqrt{E\_R_i(b)}-\sqrt{E\_LR_i(b)}}{2\sqrt{E\_R_i(b)}}$$

$$E\_L_i(b)=\sum_{k=band\_limits(b)}^{k=band\_limits(b+1)-1} L''_{ib}(k)^2,$$

$$E\_R_i(b)=\sum_{kk=band\_limits(b)}^{k=band\_limits(b+1)-1} R''_{ib}(k)^2,\text{ and}$$

$$E\_LR_i(b)=\sum_{k=band\_limits(b)}^{k=band\_limits(b+1)-1} [L''_{ib}(k)+R''_{ib}(k)]^2;\text{ or}$$

$$E\_L_i(b)=\sum_{k=band\_limits(b)}^{k=band\_limits(b+1)-1} L'_{ib}(k)^2,$$

$$E\_R_i(b)=\sum_{k=band\_limits(b)}^{k=band\_limits(b+1)-1} R'_{ib}(k)^2,\text{ and}$$

$$E\_LR_i(b)=\sum_{k=band\_limits(b)}^{k=band\_limits(b+1)-1} [L'_{ib}(k)+R'_{ib}(k)]^2.$$

$E\_L_i(b)$ represents an energy sum of a left channel frequency-domain signal in the subband b in the subframe i of the current frame; $E\_R_i(b)$ represents an energy sum of a right channel frequency-domain signal in the subband b in the subframe i of the current frame; $E\_LR_i(b)$ represents an energy sum of the energy of the left channel frequency-domain signal and the energy of the right channel frequency-domain signal in the subband b in the subframe i of the current frame; band_limits(b) represents a minimum frequency bin index value of the subband b in the subframe i of the current frame; band_limits(b+1) represents a minimum frequency bin index value of a subband b+1 in the subframe i of the current frame; $L_{ib}''(k)$ represents a left channel frequency-domain signal that is in the subband b in the subframe i of the current frame and that is obtained after adjustment based on a stereo parameter; $R_{ib}''(k)$ represents a right channel frequency-domain signal that is in the subband b in the subframe i of the current frame and that is obtained after adjustment based on the stereo parameter; $L_{ib}'(k)$ represents a left channel frequency-domain signal that is in the subband b in the subframe i of the current frame and that is obtained after time-shift adjustment; $R_{ib}'(k)$ represents a right channel frequency-domain signal that is in the subband b in the subframe i of the current frame and that is obtained after time-shift adjustment; and k represents a frequency bin index value, where each subframe of the current frame includes M subbands, the downmix compensation factor of the subframe i of the current frame includes the downmix compensation factor of the subband b in the subframe i of the current frame, b is an integer, b∈[0, M−1], and M≥2.

The calculation unit is further specifically configured to calculate a compensated downmixed signal in the subband b in the subframe i of the current frame according to a formula $DMX\_comp_{ib}(k)=\alpha_i(b)*L_{ib}''(k)$, where $DMX\_comp_{ib}(k)$ represents the compensated downmixed signal in the subband b in the subframe i of the current frame, k represents a frequency bin index value, and k∈[band_limits(b), band_limits(b+1)−1].

Optionally, in another possible implementation of this application, when the second frequency-domain signal in the subframe i of the current frame is the left channel frequency-domain signal in the subframe i of the current frame, the calculation unit is specifically configured to calculate the downmix compensation factor of the subframe i of the current frame based on the left channel frequency-domain signal in the subframe i of the current frame and the residual signal in the subframe i of the current frame. Herein, a downmix compensation factor $\alpha_i(b)$ in a subband b in the subframe i of the current frame is calculated according to the following formula:

$$\alpha_i(b)=\sqrt{\frac{E\_S_i(b)}{E\_L_i(b)}}$$

$$E\_S_i(b)=\sum_{k=band\_limits(b)}^{k=band\_limits(b+1)-1} RES'_{ib}(k)^2 \text{ and}$$

$$E\_L_i(b)=\sum_{k=band\_limits(b)}^{k=band\_limits(b+1)-1} L''_{ib}(k)^2.$$

$E\_L_i(b)$ represents an energy sum of a left channel frequency-domain signal in the subband b in the subframe i of the current frame; $E\_S_i(b)$ represents an energy sum of a residual signal in the subband b in the subframe i of the current frame; band_limits(b) represents a minimum frequency bin index value of the subband b in the subframe i of the current frame; band_limits(b+1) represents a minimum frequency bin index value of a subband b+1 in the subframe i of the current frame; $L_{ib}''(k)$ represents a left channel frequency-domain signal that is in the subband b in the subframe i of the current frame and that is obtained after adjustment based on a stereo parameter; $RES_{ib}'(k)$ represents the residual signal in the subband b in the subframe i of the current frame; and k represents a frequency bin index value, where each subframe of the current frame includes M subbands, the downmix compensation factor of the subframe i of the current frame includes the downmix compensation factor of the subband b in the subframe i of the current frame, b is an integer, b∈[0, M−1], and M≥2.

The calculation unit is further specifically configured to calculate a compensated downmixed signal in the subband b in the subframe i of the current frame according to a formula $DMX\_comp_{ib}(k)=\alpha_i(b)*L_{ib}''(k)$, where $DMX\_comp_{ib}(k)$ represents the compensated downmixed signal in the subband b in the subframe i of the current frame, k represents a frequency bin index value, and k∈[band_limits(b), band_limits(b+1)−1].

Optionally, in another possible implementation of this application, when the second frequency-domain signal in the subframe i of the current frame is the left channel frequency-domain signal in the subframe i of the current frame, the calculation unit is specifically configured to calculate the downmix compensation factor of the subframe i of the current frame based on the left channel frequency-domain signal in the subframe i of the current frame, the right channel frequency-domain signal in the subframe i of the current frame, and the second flag. Herein, a downmix compensation factor $\alpha_i$ (b) in a subband b in the subframe i of the current frame is calculated according to the following formula:

$$\alpha_i(b)=\begin{cases}\dfrac{\sqrt{E\_L_i(b)}+\sqrt{E\_R_i(b)}-\sqrt{E\_LR_i(b)}}{2\sqrt{E\_R_i(b)}}, & nipd\_flag=1\\ 0, & nipd\_flag=0\end{cases}$$

$$E\_L_i(b)=\sum_{k=band\_limits(b)}^{k=band\_limits(b+1)-1} L'_{ib}(k)^2,$$

$$E\_R_i(b)=\sum_{k=band\_limits(b)}^{k=band\_limits(b+1)-1} R'_{ib}(k)^2, \text{ and}$$

$$E\_LR_i(b)=\sum_{k=band\_limits(b)}^{k=band\_limits(b+1)-1} [L'_{ib}(k)+R'_{ib}(k)]^2.$$

$E\_L_i(b)$ represents an energy sum of a left channel frequency-domain signal in the subband b in the subframe i of the current frame; $E\_R_i(b)$ represents an energy sum of a right channel frequency-domain signal in the subband b in the subframe i of the current frame; $E\_LR_i(b)$ represents an energy sum of the energy of the left channel frequency-domain signal and the energy of the right channel frequency-domain signal in the subband b in the subframe i of the current frame; band_limits(b) represents a minimum frequency bin index value of the subband b in the subframe i of the current frame; band_limits(b+1) represents a minimum frequency bin index value of a subband b+1 in the subframe i of the current frame; $L_{ib}'(k)$ represents a left channel frequency-domain signal that is in the subband b in the subframe i of the current frame and that is obtained after time-shift adjustment; $R_{ib}'(k)$ represents a right channel frequency-domain signal that is in the subband b in the subframe i of the current frame and that is obtained after time-shift adjustment; nipd_flag represents the second flag; nipd_flag=1 indicates that a stereo parameter other than an inter-channel time difference parameter does not need to be encoded in the subframe i of the current frame; nipd_flag=0 indicates that a stereo parameter other than an inter-channel time difference parameter needs to be encoded in the subframe i of the current frame; k represents a frequency bin index value, where each subframe of the current frame includes M subbands, the downmix compensation factor of the subframe i of the current frame includes the downmix compensation factor of the subband b in the subframe i of the current frame, b is an integer, b∈[0, M−1], and M≥2.

The calculation unit is further specifically configured to calculate a compensated downmixed signal in the subband b in the subframe i of the current frame according to a formula $DMX\_comp_{ib}(k)=\alpha_i(b)*L_{ib}''(k)$, where $DMX\_comp_{ib}(k)$ represents the compensated downmixed signal in the subband b in the subframe i of the current frame, $L_{ib}''(k)$ represents a left channel frequency-domain signal that is in the subband b in the subframe i of the current frame and that is obtained after adjustment based on a stereo parameter, k represents a frequency bin index value, and k∈[band_limits(b), band_limits(b+1)−1].

Optionally, in another possible implementation of this application, when the second frequency-domain signal in the subframe i of the current frame is the left channel frequency-domain signal in the subframe i of the current frame, the calculation unit is specifically configured to calculate the downmix compensation factor of the subframe i of the current frame based on the left channel frequency-domain signal in the subframe i of the current frame and the right channel frequency-domain signal in the subframe i of the current frame. Herein, the downmix compensation factor $\alpha_i$ of the subframe i of the current frame is calculated according to the following formula:

$$\alpha_i = \frac{\sqrt{E\_L_i} + \sqrt{E\_R_i} - \sqrt{E\_LR_i}}{2\sqrt{E\_L_i}}$$

$$E\_L_i = \sum_{k=band\_limits\_1}^{k=band\_limits\_2-1} L_i''(k)^2,$$

$$E\_R_i = \sum_{k=band\_limits\_1}^{k=band\_limits\_2-1} R_i''(k)^2, \text{ and}$$

$$E\_LR_i = \sum_{k=band\_limits\_1}^{k=band\_limits\_2-1} [L_i''(k) + R_i''(k)]^2; \text{ or}$$

$$E\_L_i = \sum_{k=band\_limits\_1}^{k=band\_limits\_2-1} L_i'(k)^2,$$

$$E\_R_i = \sum_{k=band\_limits\_1}^{k=band\_limits\_2-1} R_i'(k)^2, \text{ and}$$

$$E\_LR_i = \sum_{k=band\_limits\_1}^{k=band\_limits\_2-1} [L_i'(k) + R_i'(k)]^2.$$

$E\_L_i$ represents an energy sum of left channel frequency-domain signals in all subbands of the preset frequency band in the subframe i of the current frame; $E\_R_i$ represents an energy sum of right channel frequency-domain signals in all the subbands of the preset frequency band in the subframe i of the current frame; $E\_LR_i$ represents an energy sum of the energy of the left channel frequency-domain signals and the energy of the right channel frequency-domain signals in all the subbands of the preset frequency band in the subframe i of the current frame; band_limits_1 represents a minimum frequency bin index value of all the subbands of the preset frequency band; band_limits_2 represents a maximum frequency bin index value of all the subbands of the preset frequency band; $L_i''(k)$ represents a left channel frequency-domain signal that is in the subframe i of the current frame and that is obtained after adjustment based on a stereo parameter; $R_i''(k)$ represents a right channel frequency-domain signal that is in the subframe i of the current frame and that is obtained after adjustment based on the stereo parameter; $L_i'(k)$ represents a left channel frequency-domain signal that is in the subframe i of the current frame and that is obtained after time-shift adjustment; $R_i'(k)$ represents a right channel frequency-domain signal that is in the subframe i of the current frame and that is obtained after time-shift adjustment; and k represents a frequency bin index value.

The calculation unit is further specifically configured to calculate a compensated downmixed signal in each subband of the preset frequency band in the subframe i of the current frame according to a formula $DMX\_comp_i(k)=\alpha_i*L_i''(k)$, where $DMX\_comp_i(k)$ represents the compensated downmixed signal in each subband of the preset frequency band in the subframe i of the current frame, k represents a frequency bin index value, and k∈[band_limits_1, band_limits_2].

Optionally, in another possible implementation of this application, when the second frequency-domain signal in the subframe i of the current frame is the left channel frequency-domain signal in the subframe i of the current frame, the calculation unit is specifically configured to calculate the downmix compensation factor of the subframe i of the current frame based on the left channel frequency-domain signal in the subframe i of the current frame and the residual signal in the subframe i of the current frame. Herein, the downmix compensation factor $\alpha_i$ of the subframe i of the current frame is calculated according to the following formula:

$$\alpha_i = \sqrt{\frac{E\_S_i}{E\_L_i}}$$

$$E\_L_i = \sum_{k=band\_limits\_1}^{k=band\_limits\_2-1} L_i''(k)^2 \text{ and}$$

$$E\_S_i = \sum_{k=band\_limits\_1}^{k=band\_limits\_2-1} RES_i'(k)^2.$$

$E\_S_i$ represents an energy sum of residual signals in all subbands of the preset frequency band in the subframe i of the current frame; $E\_L_i$ represents an energy sum of left channel frequency-domain signals in all the subbands of the preset frequency band in the subframe i of the current frame; $L_i''(k)$ represents a left channel frequency-domain signal that is in the subframe i of the current frame and that is obtained after adjustment based on a stereo parameter; band_limits_1 represents a minimum frequency bin index value of all the subbands of the preset frequency band; band_limits_2 represents a maximum frequency bin index value of all the subbands of the preset frequency band; $RES_i'(k)$ represents the residual signals in all the subbands of the preset frequency band in the subframe i of the current frame; and k represents a frequency bin index value.

The calculation unit is further specifically configured to calculate a compensated downmixed signal in each subband of the preset frequency band in the subframe i of the current frame according to a formula $DMX\_comp_i(k)=\alpha_i*L_i''(k)$, where $DMX\_comp_i(k)$ represents the compensated downmixed signal in each subband of the preset frequency band in the subframe i of the current frame, k represents a frequency bin index value, and k∈[band_limits_1, band_limits_2].

Optionally, in another possible implementation of this application, when the second frequency-domain signal in the subframe i of the current frame is the left channel frequency-domain signal in the subframe i of the current frame, the calculation unit is specifically configured to calculate the downmix compensation factor of the subframe i of the current frame based on the left channel frequency-domain signal in the subframe i of the current frame, the right channel frequency-domain signal in the subframe i of the current frame, and the second flag. Herein, the downmix compensation factor $\alpha_i$ of the subframe i of the current frame is calculated according to the following formula:

$$\alpha_i = \begin{cases} \frac{\sqrt{E\_L_i} + \sqrt{E\_R_i} - \sqrt{E\_LR_i}}{2\sqrt{E\_R_i}}, & nipd\_flag = 1 \\ 0, & nipd\_flag = 0 \end{cases}$$

$$E\_L_i = \sum_{k=band\_limits\_1}^{k=band\_limits\_2-1} L_i'(k)^2,$$

$$E\_R_i = \sum_{k=band\_limits\_1}^{k=band\_limits\_2-1} R_i'(k)^2, \text{ and}$$

$$E\_LR_i = \sum_{k=band\_limits\_1}^{k=band\_limits\_2-1} [L_i'(k) + R_i'(k)]^2.$$

$E\_L_i$ represents an energy sum of left channel frequency-domain signals in all subbands of the preset frequency band in the subframe i of the current frame; $E\_R_i$ represents an energy sum of right channel frequency-domain signals in all the subbands of the preset frequency band in the subframe i of the current frame; $E\_LR_i$ represents an energy sum of the energy of the left channel frequency-domain signals and the energy of the right channel frequency-domain signals in all the subbands of the preset frequency band in the subframe i of the current frame; band_limits_1 represents a minimum frequency bin index value of all the subbands of the preset frequency band; band_limits_2 represents a maximum frequency bin index value of all the subbands of the preset frequency band; $L_i'(k)$ represents a left channel frequency-domain signal that is in the subframe i of the current frame and that is obtained after time-shift adjustment; $R_i'(k)$ represents a right channel frequency-domain signal that is in the subframe i of the current frame and that is obtained after time-shift adjustment; k represents a frequency bin index value; nipd_flag represents the second flag; nipd_flag=1 indicates that a stereo parameter other than an inter-channel time difference parameter does not need to be encoded in the subframe i of the current frame; and nipd_flag=0 indicates that a stereo parameter other than an inter-channel time difference parameter needs to be encoded in the subframe i of the current frame.

The calculation unit is further specifically configured to calculate a compensated downmixed signal in each subband of the preset frequency band in the subframe i of the current frame according to a formula $DMX\_comp_i(k)=\alpha_i*L_i''(k)$, where $DMX\_comp_i(k)$ represents the compensated downmixed signal in each subband of the preset frequency band in the subframe i of the current frame, $L_i''(k)$ represents a left channel frequency-domain signal that is in the subframe i of the current frame and that is obtained after adjustment based on a stereo parameter, k represents a frequency bin index value, and k∈[band_limits_1, band_limits_2].

Optionally, in another possible implementation of this application, when the second frequency-domain signal in the subframe i of the current frame is the right channel frequency-domain signal in the subframe i of the current frame, the calculation unit is specifically configured to calculate the downmix compensation factor of the subframe i of the current frame based on the left channel frequency-domain signal in the subframe i of the current frame and the right channel frequency-domain signal in the subframe i of the current frame. Herein, a downmix compensation factor $\alpha_i(b)$ in a subband b in the subframe i of the current frame is calculated according to the following formula:

$$\alpha_i(b) = \frac{\sqrt{E\_L_i(b)} + \sqrt{E\_R_i(b)} - \sqrt{E\_LR_i(b)}}{2\sqrt{E\_R_i(b)}}$$

$$E\_L_i(b) = \sum_{k=band\_limits(b)}^{k=band\_limits(b+1)-1} L_{ib}''(k)^2,$$

$$E\_R_i(b) = \sum_{k=band\_limits(b)}^{k=band\_limits(b+1)-1} R_{ib}''(k)^2, \text{ and}$$

$$E\_R_i(b) = \sum_{k=band\_limits(b)}^{k=band\_limits(b+1)-1} R_{ib}''(k)^2; \text{ or}$$

$$E\_L_i(b) = \sum_{k=band\_limits(b)}^{k=band\_limits(b+1)-1} L_{ib}'(k)^2,$$

$$E\_R_i(b) = \sum_{k=band\_limits(b)}^{k=band\_limits(b+1)-1} R_{ib}'(k)^2, \text{ and}$$

$$E\_LR_i(b) = \sum_{k=band\_limits(b)}^{k=band\_limits(b+1)-1} [L_{ib}'(k) + R_{ib}'(k)]^2.$$

$E\_L_i(b)$ represents an energy sum of a left channel frequency-domain signal in the subband b in the subframe i of the current frame; $E\_R_i(b)$ represents an energy sum of a right channel frequency-domain signal in the subband b in the subframe i of the current frame; $E\_LR_i(b)$ represents an energy sum of the energy of the left channel frequency-domain signal and the energy of the right channel frequency-domain signal in the subband b in the subframe i of the current frame; band_limits(b) represents a minimum frequency bin index value of the subband b in the subframe i of the current frame; band_limits(b+1) represents a minimum frequency bin index value of a subband b+1 in the subframe i of the current frame; $L_{ib}''(k)$ represents a left channel frequency-domain signal that is in the subband b in the subframe i of the current frame and that is obtained after adjustment based on a stereo parameter; $R_{ib}''(k)$ represents a right channel frequency-domain signal that is in the subband b in the subframe i of the current frame and that is obtained after adjustment based on the stereo parameter; $L_{ib}'(k)$ represents a left channel frequency-domain signal that is in the subband b in the subframe i and that is obtained after time-shift adjustment; $R_{ib}'(k)$ represents a right channel frequency-domain signal that is in the subband bin the subframe i of the current frame and that is obtained after time-shift adjustment; and k represents a frequency bin index value, where each subframe of the current frame includes M subbands, the downmix compensation factor of the subframe i of the current frame includes the downmix compensation factor of the subband b in the subframe i of the current frame, b is an integer, b∈[0, M−1], and M≥2.

The calculation unit is further specifically configured to calculate a compensated downmixed signal in the subband b in the subframe i of the current frame according to a formula $DMX\_comp_{ib}(k)=\alpha_i(b)*R_{ib}''(k)$, where $DMX\_comp_{ib}(k)$ represents the compensated downmixed signal in the subband b in the subframe i of the current frame, k represents a frequency bin index value, and k∈[band_limits(b), band_limits(b+1)−1].

Optionally, in another possible implementation of this application, when the second frequency-domain signal in the subframe i of the current frame is the right channel frequency-domain signal in the subframe i of the current frame, the calculation unit is specifically configured to calculate the downmix compensation factor of the subframe i of the current frame based on the right channel frequency-domain signal in the subframe i of the current frame and the residual signal in the subframe i of the current frame. Herein, a downmix compensation factor $\alpha_i(b)$ in a subband b in the subframe i of the current frame is calculated according to the following formula:

$$\alpha_i(b)=\sqrt{\frac{\mathrm{E\_S}_i(b)}{\mathrm{E\_L}_i(b)}}$$

$$\mathrm{E\_S}_i(b)=\sum_{k=band\_limits(b)}^{k=band\_limits(b+1)-1} RES'_{ib}(k)^2 \text{ and}$$

$$\mathrm{E\_R}_i(b)=\sum_{k=band\_limits(b)}^{k=band\_limits(b+1)-1} R''_{ib}(k)^2.$$

$\mathrm{E\_R}_i(b)$ represents an energy sum of a right channel frequency-domain signal in the subband b in the subframe i of the current frame; $\mathrm{E\_S}_i(b)$ represents an energy sum of a residual signal in the subband b in the subframe i of the current frame; band_limits(b) represents a minimum frequency bin index value of the subband b in the subframe i of the current frame; band_limits(b+1) represents a minimum frequency bin index value of a subband b+1 in the subframe i of the current frame; $R_{ib}''(k)$ represents a right channel frequency-domain signal that is in the subband b in the subframe i of the current frame and that is obtained after adjustment based on the stereo parameter; $RES_{ib}'(k)$ represents the residual signal in the subband b in the subframe i of the current frame; and k represents a frequency bin index value, where each subframe of the current frame includes M subbands, the downmix compensation factor of the subframe i of the current frame includes the downmix compensation factor of the subband b in the subframe i of the current frame, b is an integer, b∈[0, M−1], and M≥2.

The calculation unit is further specifically configured to calculate a compensated downmixed signal in the subband b in the subframe i of the current frame according to a formula $DMX\_comp_{ib}(k)=\alpha_i(b)*R_{ib}''(k)$, where $DMX\_comp_{ib}(k)$ represents the compensated downmixed signal in the subband b in the subframe i of the current frame, k represents a frequency bin index value, and k∈[band_limits(b), band_limits(b+1)−1].

Optionally, in another possible implementation of this application, when the second frequency-domain signal in the subframe i of the current frame is the right channel frequency-domain signal in the subframe i of the current frame, the calculation unit is specifically configured to calculate the downmix compensation factor of the subframe i of the current frame based on the left channel frequency-domain signal in the subframe i of the current frame, the right channel frequency-domain signal in the subframe i of the current frame, and the second flag. Herein, a downmix compensation factor $\alpha_i$ (b) in a subband b in the subframe i of the current frame is calculated according to the following formula:

$$\alpha_i(b)=\begin{cases}\dfrac{\sqrt{\mathrm{E\_L}_i(b)}+\sqrt{\mathrm{E\_R}_i(b)}-\sqrt{\mathrm{E\_LR}_i(b)}}{2\sqrt{\mathrm{E\_R}_i(b)}}, & \text{nipd\_flag}=1\\ 0, & \text{nipd\_flag}=0\end{cases}$$

$$\mathrm{E\_L}_i(b)=\sum_{k=band\_limits(b)}^{k=band\_limits(b+1)-1} L'_{ib}(k)^2,$$

$$\mathrm{E\_R}_i(b)=\sum_{k=band\_limits(b)}^{k=band\_limits(b+1)-1} R'_{ib}(k)^2, \text{ and}$$

$$\mathrm{E\_LR}_i(b)=\sum_{k=band\_limits(b)}^{k=band\_limits(b+1)-1} [L'_{ib}(k)+R'_{ib}(k)]^2.$$

$\mathrm{E\_L}_i(b)$ represents an energy sum of a left channel frequency-domain signal in the subband b in the subframe i of the current frame; $\mathrm{E\_R}_i(b)$ represents an energy sum of a right channel frequency-domain signal in the subband b in the subframe i of the current frame; $\mathrm{E\_LR}_i(b)$ represents an energy sum of the energy of the left channel frequency-domain signal and the energy of the right channel frequency-domain signal in the subband b in the subframe i of the current frame; band_limits(b) represents a minimum frequency bin index value of the subband b in the subframe i of the current frame; band_limits(b+1) represents a minimum frequency bin index value of a subband b+1 in the subframe i of the current frame; $L_{ib}'(k)$ represents a left channel frequency-domain signal that is in the subband b in the subframe i of the current frame and that is obtained after time-shift adjustment; $R_{ib}'(k)$ represents a right channel frequency-domain signal that is in the subband b in the subframe i of the current frame and that is obtained after time-shift adjustment; nipd_flag represents the second flag; nipd_flag=1 indicates that a stereo parameter other than an inter-channel time difference parameter does not need to be encoded in the subframe i of the current frame; nipd_flag=0 indicates that a stereo parameter other than an inter-channel time difference parameter needs to be encoded in the subframe i of the current frame; and k represents a frequency bin index value, where each subframe of the current frame includes M subbands, the downmix compensation factor of the subframe i of the current frame includes the downmix compensation factor of the subband b in the subframe i of the current frame, b is an integer, b∈[0, M−1], and M≥2.

The calculation unit is further specifically configured to calculate a compensated downmixed signal in the subband b in the subframe i of the current frame according to a formula $DMX\_comp_{ib}(k)=\alpha_i(b)*R_{ib}''(k)$, where $DMX\_comp_{ib}(k)$ represents the compensated downmixed signal in the subband b in the subframe i of the current frame, $R_{ib}''(k)$ represents a right channel frequency-domain signal that is in the subband b in the subframe i of the current frame and that is obtained after adjustment based on the stereo parameter, k represents a frequency bin index value, and k∈[band_limits(b), band_limits(b+1)−1].

Optionally, in another possible implementation of this application, when the second frequency-domain signal in the subframe i of the current frame is the right channel frequency-domain signal in the subframe i of the current frame, the calculation unit is specifically configured to calculate the downmix compensation factor of the subframe i of the current frame based on the left channel frequency-domain signal in the subframe i of the current frame and the right channel frequency-domain signal in the subframe i of the current frame. Herein, the downmix compensation factor $\alpha_i$ of the subframe i of the current frame is calculated according to the following formula:

$$\alpha_i=\frac{\sqrt{\mathrm{E\_L}_i}+\sqrt{\mathrm{E\_R}_i}-\sqrt{\mathrm{E\_LR}_i}}{2\sqrt{\mathrm{E\_L}_i}}$$

$$\mathrm{E\_L}_i=\sum_{k=band\_limits\_1}^{k=band\_limits\_2-1} L''_i(k)^2,$$

$$\mathrm{E\_R}_i=\sum_{k=band\_limits\_1}^{k=band\_limits\_2-1} R''_i(k)^2, \text{ and}$$

$$\mathrm{E\_LR}_i=\sum_{k=band\_limits\_1}^{k=band\_limits\_2-1} [L''_i(k)+R''_i(k)]^2; \text{ or}$$

$$\mathrm{E\_L}_i=\sum_{k=band\_limits\_1}^{k=band\_limits\_2-1} L'_i(k)^2,$$

$$\mathrm{E\_R}_i=\sum_{k=band\_limits\_1}^{k=band\_limits\_2-1} R'_i(k)^2, \text{ and}$$

$$\mathrm{E\_LR}_i=\sum_{k=band\_limits\_1}^{k=band\_limits\_2-1} [L'_i(k)+R'_i(k)]^2.$$

$E\_L_i$ represents an energy sum of left channel frequency-domain signals in all subbands of the preset frequency band in the subframe i of the current frame; $E\_R_i$ represents an energy sum of right channel frequency-domain signals in all the subbands of the preset frequency band in the subframe i of the current frame; $E\_LR_i$ represents an energy sum of the energy of the left channel frequency-domain signals and the energy of the right channel frequency-domain signals in all the subbands of the preset frequency band in the subframe i of the current frame; band_limits_1 represents a minimum frequency bin index value of all the subbands of the preset frequency band; band_limits_2 represents a maximum frequency bin index value of all the subbands of the preset frequency band; $L_i''(k)$ represents a left channel frequency-domain signal that is in the subframe i of the current frame and that is obtained after adjustment based on a stereo parameter; $R_i''(k)$ represents a right channel frequency-domain signal that is in the subframe i of the current frame and that is obtained after adjustment based on the stereo parameter; $L_i'(k)$ represents a left channel frequency-domain signal that is in the subframe i of the current frame and that is obtained after time-shift adjustment; $R_i'(k)$ represents a right channel frequency-domain signal that is in the subframe i of the current frame and that is obtained after time-shift adjustment; and k represents a frequency bin index value.

The calculation unit is further specifically configured to calculate a compensated downmixed signal in each subband of the preset frequency band in the subframe i of the current frame according to a formula $DMX\_comp_i(k)=\alpha_i*R_i''(k)$, where $DMX\_comp_i(k)$ represents the compensated downmixed signal in each subband of the preset frequency band in the subframe i of the current frame, k represents a frequency bin index value, and k∈[band_limits_1, band_limits_2].

Optionally, in another possible implementation of this application, when the second frequency-domain signal in the subframe i of the current frame is the right channel frequency-domain signal in the subframe i of the current frame, the calculation unit is specifically configured to calculate the downmix compensation factor of the subframe i of the current frame based on the right channel frequency-domain signal in the subframe i of the current frame and the residual signal in the subframe i of the current frame. Herein, the downmix compensation factor $\alpha_i$ of the subframe i of the current frame is calculated according to the following formula:

$$\alpha_i = \sqrt{\frac{E\_S_i}{E\_L_i}}$$

$$E\_R_i = \sum_{k=band\_limits\_1}^{k=band\_limits\_2-1} R_i''(k)^2 \text{ and}$$

$$E\_S_i = \sum_{k=band\_limits\_1}^{k=band\_limits\_2-1} RES_i'(k)^2.$$

$E\_S_i$ represents an energy sum of residual signals in all subbands of the preset frequency band in the subframe i of the current frame; $E\_R_i$ represents an energy sum of right channel frequency-domain signals in all the subbands of the preset frequency band in the subframe i of the current frame; $R_i''(k)$ represents a right channel frequency-domain signal that is in the subframe i of the current frame and that is obtained after adjustment based on a stereo parameter; band_limits_1 represents a minimum frequency bin index value of all the subbands of the preset frequency band; band_limits_2 represents a maximum frequency bin index value of all the subbands of the preset frequency band; $RES_i'(k)$ represents the residual signals in all the subbands of the preset frequency band in the subframe i of the current frame; and k represents a frequency bin index value.

The calculation unit is further specifically configured to calculate a compensated downmixed signal in each subband of the preset frequency band in the subframe i of the current frame according to the following formula:

$$DMX\_comp_i(k)=\alpha_i*R_i''(k)$$

where $DMX\_comp_i(k)$ represents the compensated downmixed signal in each subband of the preset frequency band in the subframe i of the current frame, k represents a frequency bin index value, and k∈[band_limits_1, band_limits_2].

Optionally, in another possible implementation of this application, when the second frequency-domain signal in the subframe i of the current frame is the right channel frequency-domain signal in the subframe i of the current frame, the calculation unit is specifically configured to calculate the downmix compensation factor of the subframe i of the current frame based on the left channel frequency-domain signal in the subframe i of the current frame, the right channel frequency-domain signal in the subframe i of the current frame, and the second flag. Herein, the downmix compensation factor $\alpha_i$ of the subframe i of the current frame is calculated according to the following formula:

$$\alpha_i = \begin{cases} \frac{\sqrt{E\_L_i} + \sqrt{E\_R_i} - \sqrt{E\_LR_i}}{2\sqrt{E\_L_i}}, & \text{nipd\_flag} = 1 \\ 0, & \text{nipd\_flag} = 0 \end{cases}$$

$$E\_L_i = \sum_{k=band\_limits\_1}^{k=band\_limits\_2-1} L_i'(k)^2,$$

$$E\_R_i = \sum_{k=band\_limits\_1}^{k=band\_limits\_2-1} R_i'(k)^2, \text{ and}$$

$$E\_LR_i = \sum_{k=band\_limits\_1}^{k=band\_limits\_2-1} [L_i'(k) + R_i'(k)]^2.$$

$E\_L_i$ represents an energy sum of left channel frequency-domain signals in all subbands of the preset frequency band in the subframe i of the current frame; $E\_R_i$ represents an energy sum of right channel frequency-domain signals in all the subbands of the preset frequency band in the subframe i of the current frame; $E\_LR_i$ represents an energy sum of the energy of the left channel frequency-domain signals and the energy of the right channel frequency-domain signals in all the subbands of the preset frequency band in the subframe i of the current frame; band_limits_1 represents a minimum frequency bin index value of all the subbands of the preset frequency band; band_limits_2 represents a maximum frequency bin index value of all the subbands of the preset frequency band; $L_i'(k)$ represents a left channel frequency-domain signal that is in the subframe i of the current frame and that is obtained after time-shift adjustment; $R_i'(k)$ represents a right channel frequency-domain signal that is in the subframe i of the current frame and that is obtained after time-shift adjustment; k represents a frequency bin index value; nipd_flag represents the second flag; nipd_flag=1 indicates that a stereo parameter other than an inter-channel time difference parameter does not need to be encoded in the subframe i of the current frame; and nipd_flag=0 indicates that a stereo parameter other than an inter-channel time difference parameter needs to be encoded in the subframe i of the current frame.

The calculation unit is further specifically configured to calculate a compensated downmixed signal in each subband of the preset frequency band in the subframe i of the current frame according to a formula $DMX\_comp_i(k)=\alpha_i*R_i''(k)$, where $DMX\_comp_i(k)$ represents the compensated downmixed signal in each subband of the preset frequency band in the subframe i of the current frame, $R_i''(k)$ represents a right channel frequency-domain signal that is in the subframe i of the current frame and that is obtained after adjustment based on a stereo parameter, k represents a frequency bin index value, and $k\in[band\_limits\_1, band\_limits\_2]$.

Optionally, in another possible implementation of this application, $Th1\le b\le Th2$, $Th1<b\le Th2$, $Th1\le b<Th2$, or $Th1<b<Th2$, where $0\le Th1\le Th2\le M-1$, Th1 represents a minimum subband index value of the preset frequency band, and Th2 represents a maximum subband index value of the preset frequency band.

According to a third aspect, a terminal is provided. The terminal includes one or more processors, a memory, and a communications interface. The memory and the communications interface are coupled to the one or more processors; the terminal communicates with another device through the communications interface; the memory is configured to store computer program code, where the computer program code includes an instruction; and when the one or more processors execute the instruction, the terminal performs the downmixed signal calculation method described in any one of the first aspect or the possible implementations of the first aspect.

According to a fourth aspect, an audio encoder is provided, and includes a non-volatile storage medium and a central processing unit, where the non-volatile storage medium stores an executable program, the central processing unit is connected to the non-volatile storage medium, and executes the executable program to implement the downmixed signal calculation method described in any one of the first aspect or the possible implementations of the first aspect.

According to a fifth aspect, an encoder is provided, where the encoder includes the downmixed signal calculation apparatus in the second aspect and an encoding module, and the encoding module is configured to encode a first downmixed signal of a current frame, where the first downmixed signal of the current frame is obtained by the downmixed signal calculation apparatus.

According to a sixth aspect, a computer-readable storage medium is further provided, where the computer-readable storage medium stores an instruction; and when the instruction is run on the terminal described in the third aspect, the terminal is enabled to perform the downmixed signal calculation method described in any one of the first aspect or the possible implementations of the first aspect.

According to a seventh aspect, a computer program product including an instruction is further provided. When the computer program product is run on the terminal described in the third aspect, the terminal is enabled to perform the downmixed signal calculation method described in any one of the first aspect or the possible implementations of the first aspect.

For detailed descriptions of the second aspect, the third aspect, the fourth aspect, the fifth aspect, the sixth aspect, and the seventh aspect in this application and various implementations of the second aspect, the third aspect, the fourth aspect, the fifth aspect, the sixth aspect, and the seventh aspect, refer to the detailed descriptions of the first aspect and the various implementations of the first aspect. In addition, for beneficial effects of the second aspect, the third aspect, the fourth aspect, the fifth aspect, the sixth aspect, and the seventh aspect and the various implementations of the second aspect, the third aspect, the fourth aspect, the fifth aspect, the sixth aspect, and the seventh aspect, refer to beneficial effect analysis of the first aspect and the various implementations of the first aspect. Details are not described herein again.

According to an eighth aspect, a downmixed signal calculation method is provided, and includes: when a previous frame of a current frame of a stereo signal is not a switching frame and a residual signal in the previous frame does not need to be encoded, obtaining, by a calculation apparatus, a downmix compensation factor of the previous frame and a second downmixed signal in the current frame; correcting the second downmixed signal in the current frame based on the downmix compensation factor of the previous frame, to obtain a first downmixed signal in the current frame; and determining, by the calculation apparatus, the first downmixed signal in the current frame as a downmixed signal in a preset frequency band of the current frame.

In this embodiment of this application, when the previous frame of the current frame of the stereo signal is not a switching frame and the residual signal in the previous frame does not need to be encoded, the calculation apparatus calculates the first downmixed signal in the current frame, and determines the first downmixed signal as the downmixed signal in the preset frequency band of the current frame. This resolves a problem that there is a discontinuous spatial sense and poor sound image stability of a decoded stereo signal due to switching back and forth in the preset frequency band between encoding a residual signal and skipping encoding the residual signal, thereby effectively improving aural quality.

Optionally, in a possible implementation of this application, a method for the correcting, by the calculation apparatus, the second downmixed signal in the current frame based on the downmix compensation factor of the previous frame includes: calculating, by the calculation apparatus, a compensated downmixed signal in the current frame based on a first frequency-domain signal in the current frame and the downmix compensation factor of the previous frame, and calculating the first downmixed signal in the current frame based on the second downmixed signal in the current frame and the compensated downmixed signal in the current frame, where the first frequency-domain signal is a left channel frequency-domain signal in the current frame or a right channel frequency-domain signal in the current frame; or calculating, by the calculation apparatus, a compensated downmixed signal in a subframe i of the current frame based on a second frequency-domain signal in the subframe i of the current frame and a downmix compensation factor of a subframe i of the previous frame, and calculating a first downmixed signal in the subframe i of the current frame based on a second downmixed signal in the subframe i of the current frame and the compensated downmixed signal in the subframe i of the current frame, where the second frequency-domain signal is a left channel frequency-domain signal in the subframe i of the current frame or a right channel frequency-domain signal in the subframe i of the current frame, the current frame includes P subframes, and the first downmixed signal in the current frame includes the first downmixed signal in the subframe i of the current frame, where both P and i are integers, $P\ge 2$, and $i\in[0, P-1]$.

Optionally, in another possible implementation of this application, a method for the calculating, by the calculation apparatus, a compensated downmixed signal in the current frame based on a first frequency-domain signal in the current frame and the downmix compensation factor of the previous frame includes: determining, by the calculation apparatus, a product of the first frequency-domain signal in the current frame and the downmix compensation factor of the previous frame as the compensated downmixed signal in the current frame.

A method for the calculating, by the calculation apparatus, the first downmixed signal in the current frame based on the second downmixed signal in the current frame and a compensated downmixed signal in the current frame includes: determining, by the calculation apparatus, a sum of the second downmixed signal in the current frame and the compensated downmixed signal in the current frame as the first downmixed signal in the current frame. A method for the calculating, by the calculation apparatus, a compensated downmixed signal in a subframe i of the current frame based on a second frequency-domain signal in the subframe i of the current frame and a downmix compensation factor of a subframe i of the previous frame includes: determining, by the calculation apparatus, a product of the second frequency-domain signal in the subframe i and the downmix compensation factor of the subframe i as the compensated downmixed signal in the subframe i.

A method for the calculating, by the calculation apparatus, a first downmixed signal in the subframe i of the current frame based on a second downmixed signal in the subframe i of the current frame and the compensated downmixed signal in the subframe i of the current frame includes: determining, by the calculation apparatus, a sum of the second downmixed signal in the subframe i of the current frame and the compensated downmixed signal in the subframe i of the current frame as the first downmixed signal in the subframe i of the current frame.

According to a ninth aspect, a downmixed signal calculation apparatus is provided. Specifically, the calculation apparatus includes a determining unit, an obtaining unit, and a calculation unit.

Functions implemented by the units and modules provided in this application are specifically as follows.

The determining unit is configured to determine whether a previous frame of a current frame of a stereo signal is a switching frame and whether a residual signal in the previous frame needs to be encoded. The obtaining unit is configured to obtain a downmix compensation factor of the previous frame and a second downmixed signal in the current frame when the determining unit determines that the previous frame of the current frame is not a switching frame and the residual signal in the previous frame does not need to be encoded. The calculation unit is configured to correct the second downmixed signal in the current frame based on the downmix compensation factor of the previous frame obtained by the obtaining unit, to obtain a first downmixed signal in the current frame. The determining unit is further configured to determine, as a downmixed signal in a preset frequency band of the current frame, the first downmixed signal obtained by the calculation unit.

Optionally, in a possible implementation of this application, the calculation unit is specifically configured to: calculate a compensated downmixed signal in the current frame based on a first frequency-domain signal in the current frame and the downmix compensation factor of the previous frame, and calculate the first downmixed signal in the current frame based on the second downmixed signal in the current frame and the compensated downmixed signal in the current frame, where the first frequency-domain signal is a left channel frequency-domain signal in the current frame or a right channel frequency-domain signal in the current frame; or calculate a compensated downmixed signal in a subframe i of the current frame based on a second frequency-domain signal in the subframe i of the current frame and a downmix compensation factor of a subframe i of the previous frame, and calculate a first downmixed signal in the subframe i of the current frame based on a second downmixed signal in the subframe i of the current frame and the compensated downmixed signal in the subframe i of the current frame, where the second frequency-domain signal is a left channel frequency-domain signal in the subframe i of the current frame or a right channel frequency-domain signal in the subframe i of the current frame, the current frame includes P subframes, and the first downmixed signal in the current frame includes the first downmixed signal in the subframe i of the current frame, where both P and i are integers, $P \geq 2$, and $i \in [0, P-1]$.

Optionally, in another possible implementation of this application, the calculation unit is specifically configured to: determine a product of the first frequency-domain signal in the current frame and the downmix compensation factor of the previous frame as the compensated downmixed signal in the current frame, and determine a sum of the second downmixed signal in the current frame and the compensated downmixed signal in the current frame as the first downmixed signal in the current frame; or determine a product of the second frequency-domain signal in the subframe i and the downmix compensation factor of the subframe i as the compensated downmixed signal in the subframe i, and determine a sum of the second downmixed signal in the subframe i of the current frame and the compensated downmixed signal in the subframe i of the current frame as the first downmixed signal in the subframe i of the current frame.

According to a tenth aspect, a terminal is provided. The terminal includes one or more processors, a memory, and a communications interface. The memory and the communications interface are coupled to the one or more processors; the terminal communicates with another device through the communications interface; the memory is configured to store computer program code, where the computer program code includes an instruction; and when the one or more processors execute the instruction, the terminal performs the downmixed signal calculation method described in any one of the eighth aspect or the possible implementations of the eighth aspect.

According to an eleventh aspect, an audio encoder is provided, and includes a non-volatile storage medium and a central processing unit, where the non-volatile storage medium stores an executable program, the central processing unit is connected to the non-volatile storage medium, and executes the executable program to implement the downmixed signal calculation method described in any one of the eighth aspect or the possible implementations of the eighth aspect.

According to a twelfth aspect, an encoder is provided, where the encoder includes the downmixed signal calculation apparatus in the ninth aspect and an encoding module, and the encoding module is configured to encode a first downmixed signal of a current frame, where the first downmixed signal of the current frame is obtained by the downmixed signal calculation apparatus.

According to a thirteenth aspect, a computer-readable storage medium is further provided, where the computer-readable storage medium stores an instruction; and when the instruction is run on the terminal described in the tenth aspect, the terminal is enabled to perform the downmixed signal calculation method described in any one of the eighth aspect or the possible implementations of the eighth aspect.

According to a fourteenth aspect, a computer program product including an instruction is further provided. When the computer program product is run on the terminal described in the tenth aspect, the terminal is enabled to perform the downmixed signal calculation method described in any one of the eighth aspect or the possible implementations of the eighth aspect.

For detailed descriptions of the ninth aspect, the tenth aspect, the eleventh aspect, the twelfth aspect, the thirteenth aspect, and the fourteenth aspect in this application and various implementations of the ninth aspect, the tenth aspect, the eleventh aspect, the twelfth aspect, the thirteenth aspect, and the fourteenth aspect, refer to the detailed descriptions of the eighth aspect and the various implementations of the eighth aspect. In addition, for beneficial effects of the ninth aspect, the tenth aspect, the eleventh aspect, the twelfth aspect, the thirteenth aspect, and the fourteenth aspect and the various implementations of the ninth aspect, the tenth aspect, the eleventh aspect, the twelfth aspect, the thirteenth aspect, and the fourteenth aspect, refer to beneficial effect analysis of the eighth aspect and the various implementations of the eighth aspect. Details are not described herein again.

In this application, the name of the foregoing downmixed signal calculation apparatus does not constitute a limitation to devices or functional modules. In actual implementation, the devices or functional modules may have other names. All devices or functional modules with functions similar to those in this application fall within the scope defined by the claims and their equivalent technologies in this application.

These aspects or other aspects of this application are more concise and easy to understand in the following description.

DESCRIPTION OF EMBODIMENTS

Figure 1:
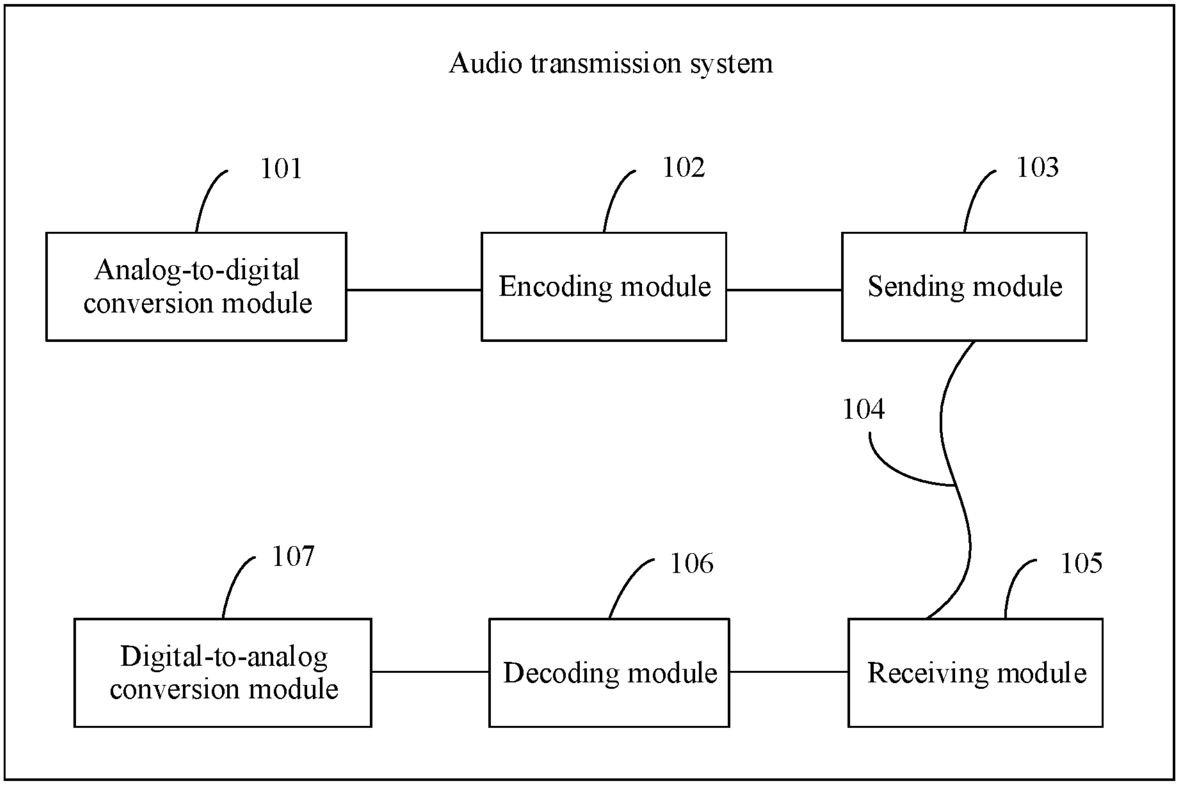
FIG. 1 is a schematic structural diagram of an audio transmission system according to an embodiment of this application.

In the embodiments of this application, the word "for example" is used to represent giving an example, an illustration, or a description. Any embodiment or design scheme described as "for example" in the embodiments of this application should not be explained as having more advantages than another embodiment or design scheme. Exactly, use of the word "for example" or the like is intended to present a relative concept in a specific manner.

The following terms "first" and "second" are merely intended for a purpose of description, but shall not be understood as an indication or implication of relative importance or implicit indication of a quantity of indicated technical features. Therefore, a feature limited by "first" or "second" may explicitly or implicitly include one or more features. In the description of the embodiment of this application, unless otherwise stated, "a plurality of" means two or more than two.

Unlike a mono signal, a stereo signal includes sound image information, and therefore has a stronger sound spatial sense. For some music signals and speech signals in a stereo signal, low frequency information can better reflect a spatial sense of the stereo signal, and accuracy of the low frequency information also plays a quite important role in stability of a stereo sound image.

Currently, a parametric stereo encoding and decoding technology is usually used to encode and decode a stereo signal. In the parametric stereo encoding and decoding technology, the stereo signal is transformed into a spatial perception parameter and one channel of signal (or two channels of signals), to implement compression processing on the stereo signal. Parametric stereo encoding and decoding may be performed in time domain, may be performed in frequency domain, or may be performed in time-frequency domain. During parametric stereo encoding performed in frequency domain or time-frequency domain, after analyzing an input stereo signal, an encoder side may obtain a stereo parameter, a downmixed signal, and a residual signal.

Stereo parameters in the parametric stereo encoding and decoding technology include an inter-channel coherence (IC), an inter-channel level difference (ILD), an inter-channel time difference (ITD), and an inter-channel phase difference (IPD), and the like.

The ITD and the IPD are spatial perception parameters that indicate a horizontal direction of a sound signal, and the ILD, the ITD, and the IPD are used to determine perception of a position of a sound signal by human ears, and play a significant role in stereo signal restoration.

In the prior art, in a coding mode of a stereo signal, a residual signal is not encoded when a coding rate is relatively low (for example, the coding rate is 26 kbps or lower); and some or all of residual signals are encoded when a coding rate is relatively high. However, if the residual signal is not encoded, a spatial sense of a decoded stereo signal is relatively poor, and sound image stability is greatly affected by accuracy of stereo parameter extraction.

In another coding mode of a stereo signal, a stereo parameter, a downmixed signal, and a residual signal in a subband corresponding to a preset low frequency band are encoded when a coding rate is relatively low, to improve a spatial sense and sound image stability of a decoded stereo signal. However, due to a limitation on a total quantity of bits for encoding, if the residual signal in the subband corresponding to the preset low frequency band is encoded, some high frequency information in the downmixed signal cannot be encoded because a quantity of allocated bits is insufficient. As a result, high frequency distortion of the decoded stereo signal is increased, thereby affecting overall encoding quality.

In another coding mode of a stereo signal, a stereo parameter and a downmixed signal are encoded when a coding rate is relatively low. In addition, an encoder side further predicts a residual signal in a current frame based on a downmixed signal in a previous frame, and encodes a prediction coefficient, to encode related information of the residual signal by using a quite small quantity of bits. However, when there is a quite low similarity between a spectrum structure of a downmixed signal and a spectrum structure of a residual signal, a difference between a residual signal estimated by using this method and a real residual signal is usually relatively large. As a result, a spatial sense of a decoded stereo signal is not obviously improved, and sound image stability cannot be improved.

In another coding mode of a stereo signal, an encoder side calculates a downmixed signal and a residual signal by using a fixed formula, and encodes the calculated downmixed signal and residual signal according to a corresponding encoding method. However, during encoding, if switching needs to be performed back and forth between encoding a residual signal and skipping encoding the residual signal, and a method for calculating a downmixed signal remains unchanged, there is a discontinuous spatial sense and poor sound image stability of a decoded stereo signal, thereby affecting aural quality.

In view of any one of the foregoing technical problems, this application provides an audio signal encoding method, to adaptively choose whether to encode a residual signal in a corresponding subband of a preset frequency band, to reduce high frequency distortion of a decoded stereo signal as much as possible while improving a spatial sense and sound image stability of the decoded stereo signal, thereby improving overall encoding quality.

If an encoder side adaptively chooses whether to encode a residual signal in a corresponding subband of a preset frequency band, the encoder side needs to perform switching back and forth in the preset frequency band between encoding a residual signal and skipping encoding the residual signal.

In view of this, an embodiment of this application provides a downmixed signal calculation method, including: when it is determined that a current frame of a stereo signal is not a switching frame and that a residual signal in the current frame does not need to be encoded, or when it is determined that a previous frame of a current frame of a stereo signal is not a switching frame and that a residual signal in the previous frame does not need to be encoded, calculating a first downmixed signal in the current frame by using a new method, and determining the calculated first downmixed signal in the current frame as a downmixed signal in a preset frequency band of the current frame. This resolves a problem that there is a discontinuous spatial sense and poor sound image stability of a decoded stereo signal due to switching back and forth in the preset frequency band between encoding a residual signal and skipping encoding the residual signal, thereby effectively improving aural quality.

In this embodiment of this application, when it is determined that the current frame of the stereo signal is not a switching frame and that the residual signal in the current frame does not need to be encoded, or when it is determined that the previous frame of the current frame of the stereo signal is not a switching frame and that the residual signal in the previous frame does not need to be encoded, a method for the calculating a first downmixed signal in the current frame includes: obtaining a second downmixed signal in the current frame and a downmix compensation factor of the current frame; and correcting the second downmixed signal in the current frame based on the downmix compensation factor of the current frame, to obtain the first downmixed signal in the current frame.

In addition, when the previous frame of the current frame of the stereo signal is not a switching frame and the residual signal in the previous frame does not need to be encoded, a method for the calculating a first downmixed signal in the current frame may alternatively include: obtaining a downmix compensation factor of the previous frame and a second downmixed signal in the current frame; and correcting the second downmixed signal in the current frame based on the downmix compensation factor of the previous frame, to obtain the first downmixed signal in the current frame.

The downmixed signal calculation method provided in this application may be performed by a downmixed signal calculation apparatus, an audio encoding and decoding apparatus, an audio codec, or another device having audio encoding and decoding functions. The downmixed signal calculation method is used in an encoding process.

The downmixed signal calculation method provided in this embodiment of this application is applicable to an audio transmission system. FIG. 1 is a schematic structural diagram of an audio transmission system according to an embodiment of this application. As shown in FIG. 1, the audio transmission system includes an analog-to-digital (A/D) conversion module 101, an encoding module 102, a sending module 103, a network 104, a receiving module 105, a decoding module 106, and a digital-to-analog (D/A) conversion module 107.

Specific functions of the modules in the audio transmission system are as follows.

The analog-to-digital conversion module 101 is configured to process a stereo signal before encoding, and convert a continuous stereo analog signal into a discrete stereo digital signal.

The encoding module 102 is configured to encode the stereo digital signal to obtain a bitstream.

The sending module 103 is configured to send the bitstream obtained through encoding.

The network 104 is configured to transmit, to the receiving module 105, the bitstream sent by the sending module 103.

The receiving module 105 is configured to receive the bitstream sent by the sending module 103.

The decoding module 106 is configured to decode the bitstream received by the receiving module 105, and reconstruct the stereo digital signal.

The digital-to-analog conversion module 107 is configured to perform digital-to-analog conversion on the stereo digital signal obtained by the decoding module 106, to obtain the stereo analog signal.

Specifically, the encoding module 102 in the audio transmission system shown in FIG. 1 may perform the downmixed signal calculation method in this embodiment of this application.

It can be learned from the foregoing description that, the downmixed signal calculation method provided in this embodiment of this application may be performed by an audio encoding and decoding apparatus. In this case, the downmixed signal calculation method provided in this embodiment of this application is also applicable to an encoding and decoding system including the audio encoding and decoding apparatus.

Figure 2:
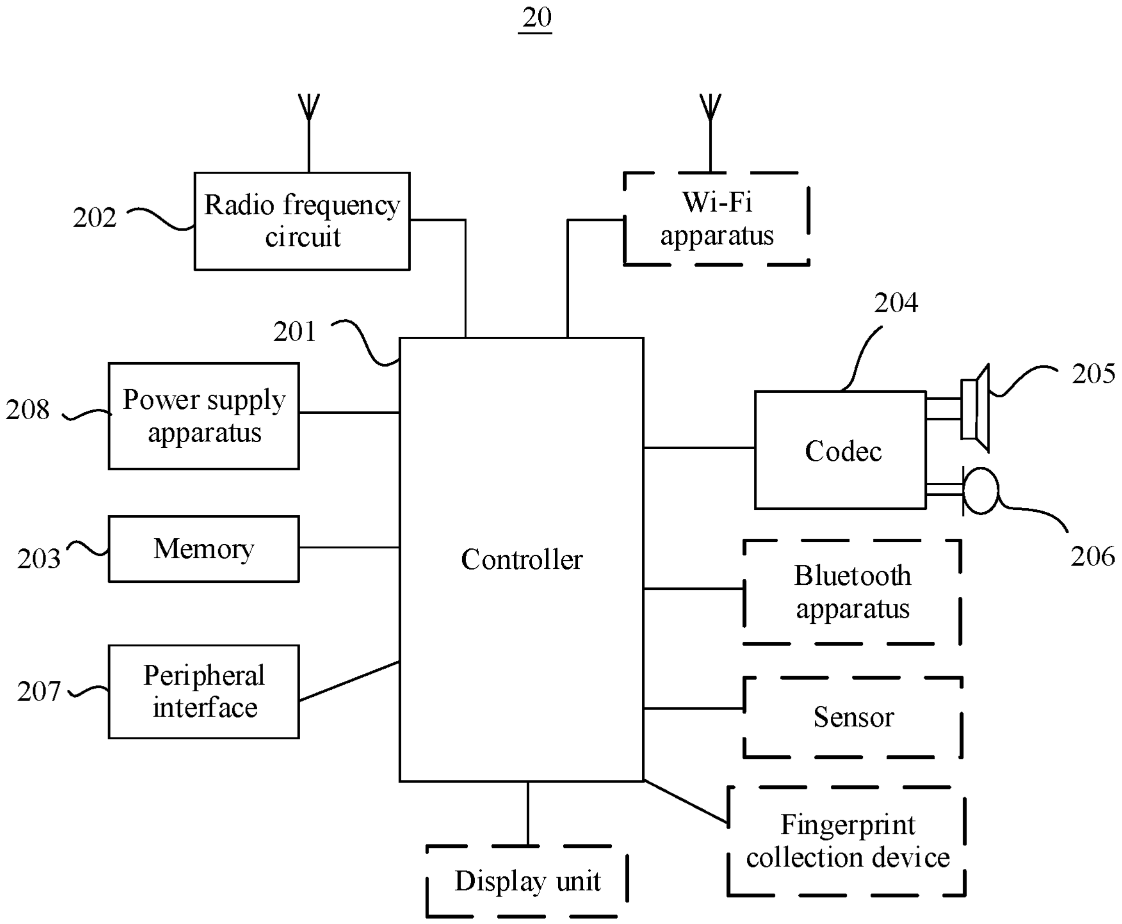
FIG. 2 is a schematic structural diagram of an audio encoding and decoding apparatus according to an embodiment of this application.
Figure 3:
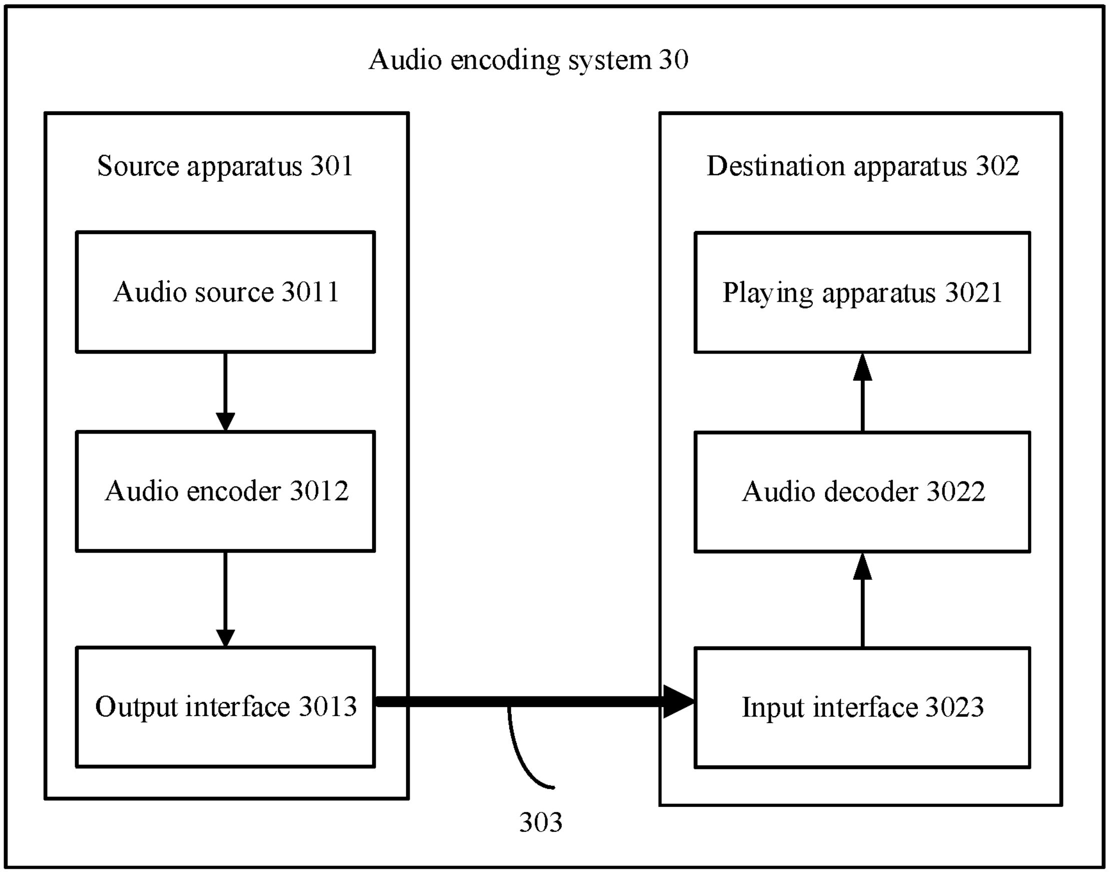
FIG. 3 is a schematic structural diagram of an audio encoding and decoding system according to an embodiment of this application.

With reference to FIG. 2 and FIG. 3, the following describes in detail an audio encoding and decoding apparatus and an audio encoding and decoding system including the audio encoding and decoding apparatus.

FIG. 2 is a schematic diagram of an audio encoding and decoding apparatus according to an embodiment of this application. As shown in FIG. 2, the audio encoding and decoding apparatus 20 may be an apparatus specially for encoding and/or decoding an audio signal, or may be an electronic device having audio encoding and decoding functions. Further, the audio encoding and decoding apparatus 20 may be a mobile terminal or user equipment in a wireless communications system.

The audio encoding and decoding apparatus 20 may include components such as a controller 201, a radio frequency (RF) circuit 202, a memory 203, a codec 204, a loudspeaker 205, a microphone 206, a peripheral interface 207, and a power supply apparatus 208. These components may perform communication with each other through one or more communications buses or signal cables (not shown in FIG. 2).

A person skilled in the art may understand that, a structure shown in FIG. 2 does not constitute a limitation to the audio encoding and decoding apparatus 20, and the audio encoding and decoding apparatus 20 may include more or fewer components than those shown in the figure, or a combination of some components, or components in different arrangements.

The following describes the components of the audio encoding and decoding apparatus 20 in detail with reference to FIG. 2.

The controller 201 is a control center of the audio encoding and decoding apparatus 20, is connected to various parts of the audio encoding and decoding apparatus 20 through various interfaces and lines, and performs various functions of the audio encoding and decoding apparatus 20 and data processing by running or executing an application program stored in the memory 203 and invoking data stored in the memory 203. In some embodiments, the controller 201 may include one or more processing units.

The RF circuit 202 may be configured to receive and send radio signals in a process of receiving and sending information. Usually, the RF circuit includes but is not limited to an antenna, at least one amplifier, a transceiver, a coupler, a low noise amplifier, a duplexer, and the like. In addition, the RF circuit 202 may further communicate with another device through wireless communication. The wireless communication may use any communications standard or protocol, including but not limited to a global system for mobile communications, a general packet radio service, code division multiple access, wideband code division multiple access, long term evolution, an email, a short messaging service, and the like.

The memory 203 is configured to store an application program and data, and the controller 201 performs various functions of the audio encoding and decoding apparatus 20 and data processing by running the application program and data that are stored in the memory 203.

The memory 203 mainly includes a program storage area and a data storage area. The program storage area may store an operating system, and an application program required for at least one function (for example, a sound playing function and an image processing function); and the data storage area may store data created during use of the audio encoding and decoding apparatus 20. In addition, the memory 203 may include a high speed random access memory (RAM), may alternatively include a nonvolatile memory, for example, a disk storage device, a flash storage device, or another nonvolatile solid state storage device. The memory 203 may store various operating systems, for example, an iOS operating system and an Android operating system. The memory 203 may be independent and connected to the controller 201 through the communications bus; or the memory 203 may alternatively be integrated with the controller 201.

The codec 204 is configured to encode or decode an audio signal.

The loudspeaker 205 and the microphone 206 may provide an audio interface between a user and the audio encoding and decoding apparatus 20. The codec 204 may transmit an encoded audio signal to the loudspeaker 205, and the loudspeaker 205 converts the encoded audio signal into a sound signal for output. The microphone 206 converts a collected sound signal into an electrical signal, and the codec 204 receives the electrical signal and converts the electrical signal into audio data, and then outputs the audio data to the RF circuit 202 to send the audio data to, for example, another audio encoding and decoding apparatus, or outputs the audio data to the memory 203 for further processing.

The peripheral interface 207 is configured to provide various interfaces for external input/output devices (for example, a keyboard, a mouse, an external display, and an external memory). For example, the peripheral interface 207 is connected to the mouse through a universal serial bus (USB) interface, and is connected, through a metal contact in a card slot of a subscriber identity module (SIM) card, to a subscriber identity module card provided by a telecommunications operator. The peripheral interface 207 may be configured to couple the foregoing external input/output peripheral device to the controller 201 and the memory 203.

In this embodiment of this application, the audio encoding and decoding apparatus 20 may communicate with another device in a device group through the peripheral interface 207. For example, the audio encoding and decoding apparatus 20 may receive, through the peripheral interface 207, display data sent by the another device for display. This is not limited in this embodiment of this application.

The audio encoding and decoding apparatus 20 may further include the power supply apparatus 208 (for example, a battery and a power management chip) that supplies power to each component. The battery may be logically connected to the controller 201 through the power management chip, so that functions such as charging management, discharging management, and power consumption management are implemented by using the power supply apparatus 208.

Optionally, the audio encoding and decoding apparatus 20 may further include at least one of a sensor, a fingerprint collection device, a smart card, a Bluetooth apparatus, a wireless fidelity (Wi-Fi) apparatus, or a display unit. Details are not described one by one herein.

In some embodiments of this application, before performing transmission and/or storage, the audio encoding and decoding apparatus 20 may receive a to-be-processed audio signal sent by another device. In some other embodiments of this application, the audio encoding and decoding apparatus 20 may receive an audio signal through a wireless or wired connection, and encode/decode the received audio signal.

FIG. 3 is a schematic block diagram of an audio encoding and decoding system 30 according to an embodiment of this application.

As shown in FIG. 3, the audio encoding and decoding system 30 includes a source apparatus 301 and a destination apparatus 302. The source apparatus 301 generates an encoded audio signal. The source apparatus 301 may also be referred to as an audio encoding apparatus or an audio encoding device. The destination apparatus 302 may decode the encoded audio data generated by the source apparatus 301. The destination apparatus 302 may also be referred to as an audio decoding apparatus or an audio decoding device.

A specific implementation form of the source apparatus 301 and the destination apparatus 302 may be any one of the following devices: a desktop computer, a mobile computing apparatus, a notebook (for example, laptop) computer, a tablet computer, a set top box, a smartphone, a handset, a television, a camera, a display apparatus, a digital media player, a video game console, and a vehicle-mounted computer, or another similar device.

The destination apparatus 302 may receive the encoded audio signal from the source apparatus 301 through a channel 303. The channel 303 may include one or more media and/or apparatuses that can move the encoded audio signal from the source apparatus 301 to the destination apparatus 302. In an example, the channel 303 may include one or more communications media that enable the source apparatus 301 to directly transmit the encoded audio signal to the destination apparatus 302 in real time. In this example, the source apparatus 301 may modulate the encoded audio signal according to a communications standard (for example, a wireless communications protocol), and may transmit a modulated audio signal to the destination apparatus 302. The foregoing one or more communications media may include a wireless and/or wired communications medium, for example, a radio frequency (RF) spectrum or one or more physical transmission lines. The foregoing one or more communications media may constitute a part of a packet-based network (for example, a local area network, a wide area network, or a global network (for example, the internet)). The foregoing one or more communications media may include a router, a switch, a base station, or another device that implements communication from the source apparatus 301 to the destination apparatus 302.

In another example, the channel 303 may include a storage medium that stores the encoded audio signal generated by the source apparatus 301. In this example, the destination apparatus 302 may access the storage medium through disk access or card access. The storage medium may include a plurality of types of local access-type data storage media, for example, a blu-ray disc, a high density digital video disc (DVD), a compact disc read-only memory (CD-ROM), a flash memory, or another suitable digital storage medium used to store encoded video data.

In another example, the channel 303 may include a file server or another intermediate storage apparatus that stores the encoded audio signal generated by the source apparatus 301. In this example, the destination apparatus 302 may access, through streaming transmission or downloading, the encoded audio signal stored in the file server or the another intermediate storage apparatus. The file server may be a type of server capable of storing the encoded audio signal and transmitting the encoded audio signal to the destination apparatus 302. For example, the file server may include a world wide web (Web) server (for example, used for a website), a file transfer protocol (FTP) server, a network attached storage (NAS) apparatus, and a local disk drive.

The destination apparatus 302 may access the encoded audio signal through a standard data connection (for example, an internet connection). An example type of the data connection includes a wireless channel or a wired connection (for example, a cable modem) suitable for accessing the encoded audio signal stored in the file server, or a combination thereof. The transmission of the encoded audio signal from the file server may be streaming transmission, download transmission, or a combination thereof.

The downmixed signal calculation method in this application is not limited to a wireless application scenario. For example, the downmixed signal calculation method in this application may be applied to audio encoding and decoding supporting various multimedia applications such as the following applications: over-the-air television broadcasting, cable television transmission, satellite television transmission, streaming video transmission (for example, through the internet), encoding of an audio signal stored in a data storage medium, decoding of an audio signal stored in a data storage medium, or another application.

In some examples, the audio encoding and decoding system 30 may be configured to support unidirectional or bidirectional video transmission to support applications such as streaming video transmission, video playing, video broadcasting, and/or videotelephony.

In FIG. 3, the source apparatus 301 includes an audio source 3011, an audio encoder 3012, and an output interface 3013. In some examples, the output interface 3013 may include a modulator/demodulator (modem) and/or a transmitter. The audio source 3011 may include an audio capturing apparatus (for example, a smartphone), an audio archive including a previously captured audio signal, an audio input interface configured to receive an audio signal from an audio content provider, and/or a computer graphics system configured to generate an audio signal, or a combination of the foregoing audio signal sources.

The audio encoder 3012 may encode an audio signal from the audio source 3011. In some examples, the source apparatus 301 directly transmits an encoded audio signal to the destination apparatus 302 through the output interface 3013. The encoded audio signal may alternatively be stored in a storage medium or on a file server for later access by the destination apparatus 302 for decoding and/or playing.

In the example in FIG. 3, the destination apparatus 302 includes an input interface 3023, an audio decoder 3022, and a playing apparatus 3021. In some examples, the input interface 3023 includes a receiver and/or a modem. The input interface 3023 may receive the encoded audio signal through the channel 303. The playing apparatus 3021 may be integrated with the destination apparatus 302 or may be located outside the destination apparatus 302. Generally, the playing apparatus 3021 plays a decoded audio signal.

The audio encoder 3012 and the audio decoder 3022 may perform operations according to an audio compression standard.

With reference to the audio transmission system shown in FIG. 1, the audio encoding and decoding apparatus shown in FIG. 2, and the audio encoding and decoding system including an audio encoding and decoding apparatus and shown in FIG. 3, the following describes in detail the downmixed signal calculation method provided in this application.

The downmixed signal calculation method provided in the embodiments of this application may be performed by a downmixed signal calculation apparatus, or may be performed by an audio encoding and decoding apparatus, or may be performed by an audio codec, or may be performed by another device having audio encoding and decoding functions. This is not specifically limited in the embodiments of this application.

Figure 4:
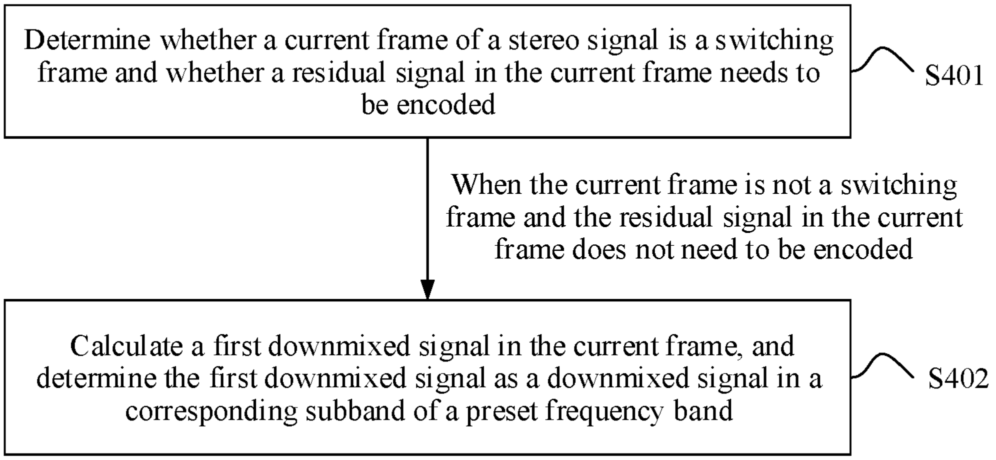
FIG. 4 is a schematic flowchart 1 of a downmixed signal calculation method according to an embodiment of this application.

Specifically, FIG. 4 is a schematic flowchart of a downmixed signal calculation method according to an embodiment of this application. For ease of description, an example in which an audio encoder is an execution body is used for description in FIG. 4.

As shown in FIG. 4, the downmixed signal calculation method includes the following steps.

S401. The audio encoder determines whether a current frame of a stereo signal is a switching frame and whether a residual signal in the current frame needs to be encoded.

The audio encoder determines, based on a value of a residual coding switching flag of the current frame, whether the current frame is a switching frame, and determines, based on a value of a residual coding flag of the current frame, whether the residual signal in the current frame needs to be encoded.

Optionally, if the value of the residual coding switching flag of the current frame is equal to 0, the current frame is not a switching frame. If the value of the residual coding switching flag of the current frame is greater than 0, the current frame is a switching frame. If the value of the residual coding flag of the current frame is equal to 0, the residual signal in the current frame does not need to be encoded. If the value of the residual coding flag of the current frame is greater than 0, the residual signal in the current frame needs to be encoded.

For detailed descriptions of the "residual coding switching flag", the "residual coding flag", and that "the audio encoder determines whether a current frame of a stereo signal is a switching frame and whether a residual signal in the current frame needs to be encoded", refer to the following content.

S402. When the current frame is not a switching frame and the residual signal in the current frame does not need to be encoded, the audio encoder calculates a first downmixed signal in the current frame, and determines the first downmixed signal as a downmixed signal in a preset frequency band of the current frame.

Figure 5A:
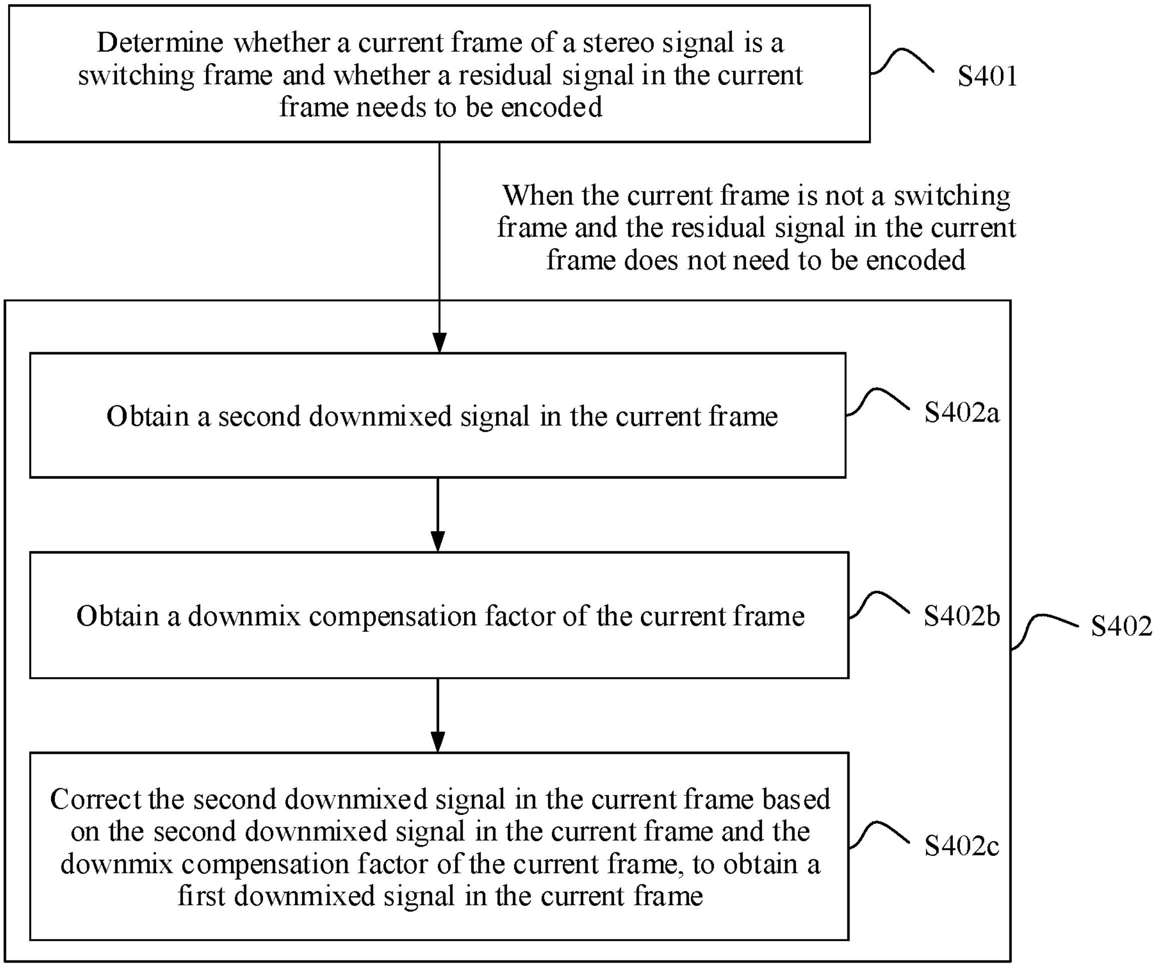
FIG. 5A is a schematic flowchart 2 of a downmixed signal calculation method according to an embodiment of this application.

Specifically, with reference to FIG. 4, as shown in FIG. 5A, when the current frame is not a switching frame and the residual signal in the current frame does not need to be encoded, the audio encoder performs S402*a* to S402*c*, to calculate the first downmixed signal in the current frame. To be specific, S402 may be replaced with S402*a* to S402*c*.

S402*a* to S402*c* are described herein.

S402*a*. The audio encoder obtains a second downmixed signal in the current frame.

The audio encoder may calculate the second downmixed signal in the current frame before determining that the current frame is not a switching frame and the residual signal in the current frame does not need to be encoded. In this way, the audio encoder directly obtains the calculated second downmixed signal in the current frame after determining that the current frame is not a switching frame and the residual signal in the current frame does not need to be encoded. The audio encoder may alternatively calculate the second downmixed signal in the current frame after determining that the current frame is not a switching frame and the residual signal in the current frame does not need to be encoded. A switching frame comprises a frame that is related to a switch of residual coding.

Optionally, the audio encoder may calculate the second downmixed signal in the current frame based on a left channel frequency-domain signal in the current frame and a right channel frequency-domain signal in the current frame; may calculate a second downmixed signal in each corresponding subband in the preset frequency band of the current frame based on a left channel frequency-domain signal in the corresponding subband in the preset frequency band of the current frame and a right channel frequency-domain signal in the corresponding subband in the preset frequency band of the current frame; may calculate a second downmixed signal in each subframe of the current frame based on a left channel frequency-domain signal in the subframe of the current frame and a right channel frequency-domain signal in the subframe of the current frame; or may calculate a second downmixed signal in each corresponding subband in the preset frequency band of each subframe of the current subframe based on a left channel frequency-domain signal in the corresponding subband in the preset frequency band of the subframe of the current subframe and a right channel frequency-domain signal in the corresponding subband in the preset frequency band of the subframe of the current subframe.

Each preset frequency band in this embodiment of this application is a preset low frequency band.

It should be noted that, if the audio encoder calculates a second downmixed signal at a granularity of a subframe of the current frame, the audio encoder needs to calculate a second downmixed signal in each subframe of the current frame. In this way, the audio encoder can obtain the second downmixed signal in the current frame, and the second downmixed signal in the current frame includes the second downmixed signal in each subframe of the current frame.

For each subframe of the current frame, if the audio encoder calculates a second downmixed signal at a granularity of each subband in the subframe, the audio encoder needs to calculate a second downmixed signal in each subband in the subframe. In this way, the audio encoder can obtain a second downmixed signal in the subframe, and the second downmixed signal in the subframe includes the second downmixed signal in each subband in the subframe.

In an example, if each frame of the stereo signal in this embodiment of this application includes P (P≥2, and P is an integer) subframes, and each subframe is includes M (M≥2) subbands, the audio encoder determines a second downmixed signal $DMX_{ib}(k)$ in a subband bin a subframe i of the current frame according to the following formula (1).

The second downmixed signal in the current frame includes a second downmixed signal in the subframe i of the current frame, and the second downmixed signal in the subframe i of the current frame includes the second downmixed signal in the subband b in the subframe i of the current frame. Both b and i are integers, $i \in [0, P-1]$, and $b \in [0, M-1]$.

$$DMX_{ib}(k) = \frac{L''_{ib}(k) + R''_{ib}(k)}{2} \quad (1)$$

In the foregoing formula (1), $L_{ib}''(k)=L_{ib}'(k)*e^{-j\beta}$, and $R_{ib}''(k)=R_{ib}'(k)*e^{-j(IPD(b)-\beta)}$, $\beta$=arctan(sin($IPD_i$(b)), cos($IPD_i$(b))+2*c), and c=(1+$g\_ILD_i$)/(1−$g\_ILD_i$), where $IPD_i$(b) represents an IPD parameter of the subband bin the subframe i of the current frame; $g\_ILD_i$ represents a subband side gain of the subframe i of the current frame; $L_{ib}'(k)$ represents a left channel frequency-domain signal that is in the subband b in the subframe i of the current frame and that is obtained after time-shift adjustment; $R_{ib}'(k)$ represents a right channel frequency-domain signal that is in the subband b in the subframe i of the current frame and that is obtained after time-shift adjustment; $L_{ib}''(k)$ represents a left channel frequency-domain signal that is in the subband b in the subframe i of the current frame and that is obtained after adjustment based on a stereo parameter (for example, an IC, an ILD, an ITD, or an IPD); $R_{ib}''(k)$ represents a right channel frequency-domain signal that is in the subband b in the subframe i of the current frame and that is obtained after adjustment based on the stereo parameter; k represents a frequency bin index value, where k∈[band_limits(b), band_limits(b+1)−1]; band_limits(b) represents a minimum frequency bin index value of the subband b in the subframe i of the current frame; and band_limits(b+1) represents a minimum frequency bin index value of a subband b+1 in the subframe i of the current frame.

In another example, the audio encoder determines a second downmixed signal $DMX_{ib}(k)$ in a subband b in a subframe i of the current frame according to the following formula (2).

Likewise, the second downmixed signal in the current frame includes a second downmixed signal in the subframe i of the current frame, and the second downmixed signal in the subframe i of the current frame includes the second downmixed signal in the subband b in the subframe i of the current frame. Both b and i are integers, i∈[0, P−1], and b∈[0, M−1].

$$DMX_{ib}(k) = [L''_{ib}(k) + R''_{ib}(k)] * c \quad (2)$$

$$c = \sqrt{\frac{1}{2} * \frac{L''_{ib}(k)^2 + R''_{ib}(k)^2}{[L''_{ib}(k) + R''_{ib}(k)]^2}}$$

For parameters in the formula (2), refer to the descriptions of the parameters in the foregoing formula (1). Details are not described herein again.

S402*b*. The audio encoder obtains a downmix compensation factor of the current frame.

Optionally, the audio encoder may calculate the downmix compensation factor of the current frame based on at least one of the left channel frequency-domain signal in the current frame, the right channel frequency-domain signal in the current frame, the second downmixed signal in the current frame, the residual signal in the current frame, or a first flag.

The first flag is used to indicate whether a stereo parameter other than an inter-channel time difference parameter needs to be encoded in the current frame. In this application, the first flag may be presented in a direct or indirect form.

For example, in an implementation, the first flag is a flag flag, where flag=1 indicates that a stereo parameter other than an inter-channel time difference parameter needs to be encoded in the current frame, and flag=0 indicates that a stereo parameter other than an inter-channel time difference parameter does not need to be encoded in the current frame. In another implementation, when a value of an inter-channel phase difference IPD is 1, it indicates that a stereo parameter other than an inter-channel time difference parameter needs to be encoded in the current frame; when a value of an inter-channel phase difference IPD is 0, it indicates that a stereo parameter other than an inter-channel time difference parameter does not need to be encoded in the current frame.

The audio encoder may alternatively calculate a downmix compensation factor of the subframe i of the current frame based on at least one of the left channel frequency-domain signal in the subframe i of the current frame (the current frame includes P subframes, P≥2, and i∈[0, P−1]), the right channel frequency-domain signal in the subframe i of the current frame, the second downmixed signal in the subframe i of the current frame, a residual signal in the subframe i of the current frame, or a second flag. The second flag is used to indicate whether a stereo parameter other than an inter-channel time difference parameter needs to be encoded in the subframe i of the current frame, and the downmix compensation factor of the current frame includes the downmix compensation factor of the subframe i of the current frame. It can be learned that, in this case, the audio encoder needs to calculate a downmix compensation factor of each subframe of the current frame.

The audio encoder may alternatively calculate a downmix compensation factor of the subframe i of the current frame based on at least one of the left channel frequency-domain signal in the subframe i of the current frame (the current frame includes P subframes, P≥2, and i∈[0, P−1]), the right channel frequency-domain signal in the subframe i of the current frame, the second downmixed signal in the subframe i of the current frame, a residual signal in the subframe i of the current frame, or a first flag. The first flag is used to indicate whether a stereo parameter other than an inter-channel time difference parameter needs to be encoded in the current frame, and the downmix compensation factor of the current frame includes the downmix compensation factor of the subframe i of the current frame. It can be learned that, in this case, the audio encoder needs to calculate a downmix compensation factor of each subframe of the current frame.

Likewise, if the audio encoder calculates a downmix compensation factor at a granularity of a subframe of the current frame, the audio encoder needs to calculate a downmix compensation factor of each subframe of the current frame. In this way, the audio encoder can obtain the downmix compensation factor of the current frame, and the downmix compensation factor of the current frame includes the downmix compensation factor of each subframe of the current frame.

For each subframe of the current frame, if the audio encoder calculates a downmix compensation factor at a granularity of each subband in the subframe, the audio encoder needs to calculate a downmix compensation factor of each subband in the subframe. In this way, the audio encoder can obtain a downmix compensation factor of the subframe, and the downmix compensation factor of the subframe includes the downmix compensation factor of each subband in the subframe.

For example, the audio encoder may calculate the downmix compensation factor of the current frame based on the left channel frequency-domain signal in the current frame and the right channel frequency-domain signal in the current frame; may calculate a downmix compensation factor of each subband in the current frame based on a left channel frequency-domain signal in the subband in the current frame and a right channel frequency-domain signal in the subband in the current frame; or may calculate a downmix compensation factor of each corresponding subband in the preset frequency band of the current frame based on a left channel frequency-domain signal in the corresponding subband in the preset frequency band of the current frame and a right channel frequency-domain signal in the corresponding subband in the preset frequency band of the current frame.

Further, if the audio encoder divides each frame of the stereo signal into a plurality of subframes for processing, the audio encoder may calculate a downmix compensation factor of each subframe of the current frame based on a left channel frequency-domain signal in the subframe of the current frame and a right channel frequency-domain signal in the subframe of the current frame; may calculate a downmix compensation factor of each subband in each subframe of the current frame based on a left channel frequency-domain signal in the subband in the subframe of the current frame and a right channel frequency-domain signal in the subband in the subframe of the current frame; or may calculate a downmix compensation factor of each corresponding subband in the preset frequency band of each subframe of the current frame based on a left channel frequency-domain signal in the corresponding subband in the preset frequency band of the subframe of the current frame and a right channel frequency-domain signal in the corresponding subband in the preset frequency band of the subframe of the current frame.

Herein, the left channel frequency-domain signal may be an original left channel frequency-domain signal, may be a left channel frequency-domain signal that is obtained after time-shift adjustment, or may be a left channel frequency-domain signal that is obtained after adjustment based on a stereo parameter. Likewise, the right channel frequency-domain signal may be an original right channel frequency-domain signal, may be a right channel frequency-domain signal that is obtained after time-shift adjustment, or may be a right channel frequency-domain signal that is obtained after adjustment based on the stereo parameter.

Optionally, the audio encoder calculates a downmix compensation factor $\alpha_i$ (b) in the subband b in the subframe i of the current frame based on at least one of the left channel frequency-domain signal in the subband b in the subframe i of the current frame, the right channel frequency-domain signal in the subband b in the subframe i of the current frame, the second downmixed signal in the subband b in the subframe i of the current frame, a residual signal in the subband b in the subframe i of the current frame, or a second flag.

In an example, the audio encoder calculates the downmix compensation factor $\alpha_i$(b) in the subband b in the subframe i of the current frame based on the left channel frequency-domain signal in the subband b in the subframe i of the current frame and the right channel frequency-domain signal in the subband b in the subframe i of the current frame according to the following formula (3).

$$\alpha_i(b) = \frac{\sqrt{\mathrm{E\_L}_i(b)} + \sqrt{\mathrm{E\_R}_i(b)} - \sqrt{\mathrm{E\_LR}_i(b)}}{2\sqrt{\mathrm{E\_L}_i(b)}} \quad (3)$$

$$\mathrm{E\_L}_i(b) = \sum_{k=band\_limits(b)}^{k=band\_limits(b+1)-1} L''_{ib}(k)^2,$$

-continued $$\mathrm{E\_R}_i(b) = \sum_{k=band\_limits(b)}^{k=band\_limits(b+1)-1} R''_{ib}(k)^2, \text{ and}$$

$$\mathrm{E\_LR}_i(b) = \sum_{k=band\_limits(b)}^{k=band\_limits(b+1)-1} [L''_{ib}(k) + R''_{ib}(k)]^2; \text{ or}$$

$$\mathrm{E\_L}_i(b) = \sum_{k=band\_limits(b)}^{k=band\_limits(b+1)-1} L'_{ib}(k)^2,$$

$$\mathrm{E\_R}_i(b) = \sum_{k=band\_limits(b)}^{k=band\_limits(b+1)-1} R'_{ib}(k)^2, \text{ and}$$

$$\mathrm{E\_LR}_i(b) = \sum_{k=band\_limits(b)}^{k=band\_limits(b+1)-1} [L'_{ib}(k) + R'_{ib}(k)]^2.$$

$E\_L_i$(b) represents an energy sum of the left channel frequency-domain signal in the subband b in the subframe i of the current frame; $E\_R_i$(b) represents an energy sum of the right channel frequency-domain signal in the subband b in the subframe i of the current frame; $E\_LR_i$(b) represents an energy sum of the energy of the left channel frequency-domain signal and the energy of the right channel frequency-domain signal in the subband b in the subframe i of the current frame; $L_{ib}$'(k) represents the left channel frequency-domain signal that is in the subband b in the subframe i of the current frame and that is obtained after time-shift adjustment; and $R_{ib}$'(k) represents the right channel frequency-domain signal that is in the subband b in the subframe i of the current frame and that is obtained after time-shift adjustment, where b is an integer, and b∈[0, M−1]. In addition, for band_limits(b), band_limits(b+1), $L_{ib}$"(k), and $R_{ib}$"(k), refer to the descriptions of the parameters in the foregoing formula (1), and details are not described herein again. The downmix compensation factor of the subframe i of the current frame includes the downmix compensation factor of the subband b in the subframe i of the current frame.

In another example, the audio encoder calculates the downmix compensation factor $\alpha_i$(b) in the subband b in the subframe i of the current frame based on the left channel frequency-domain signal in the subband b in the subframe i of the current frame and the residual signal in the subband b in the subframe i of the current frame according to the following formula (4).

$$\alpha_i(b) = \sqrt{\frac{\mathrm{E\_S}_i(b)}{\mathrm{E\_L}_i(b)}} \quad (4)$$

$$\mathrm{E\_S}_i(b) = \sum_{k=band\_limits(b)}^{k=band\_limits(b+1)-1} RES'_{ib}(k)^2.$$

$E\_S_i$(b) represents an energy sum of the residual signal in the subband b in the subframe i of the current frame; and $RES_{ib}$'(k) represents the residual signal in the subband b in the subframe i of the current frame, where the downmix compensation factor of the subframe i of the current frame includes the downmix compensation factor of the subband b in the subframe i of the current frame, b is an integer, and b∈[0, M−1]. For $E\_L_i$(b), refer to the description of the foregoing formula (3), and details are not described herein again. For band_limits(b) and band_limits(b+1), refer to the descriptions of the parameters in the foregoing formula (1), and details are not described herein again. The downmix compensation factor of the subframe i of the current frame includes the downmix compensation factor of the subband b in the subframe i of the current frame.

In another example, the audio encoder calculates the downmix compensation factor $\alpha_i$(b) in the subband b in the subframe i of the current frame based on the left channel frequency-domain signal in the subband b in the subframe i of the current frame, the right channel frequency-domain signal in the subband b in the subframe i of the current frame, and the second flag according to the following formula (5).

$$\alpha_i(b)=\begin{cases}\dfrac{\sqrt{E\_L_i(b)}+\sqrt{E\_R_i(b)}-\sqrt{E\_LR_i(b)}}{2\sqrt{E\_L_i(b)}}, & \text{nipd\_flag}=1\\ 0, & \text{nipd\_flag}=0\end{cases}\quad(5)$$

nipd_flag represents the second flag; nipd_flag=1 indicates that a stereo parameter other than an inter-channel time difference parameter does not need to be encoded in the subframe i of the current frame; and nipd_flag=0 indicates that a stereo parameter other than an inter-channel time difference parameter needs to be encoded in the subframe i of the current frame, where b is an integer, and b∈[0, M−1]. For $E\_L_i(b)$, $E\_R_i(b)$, and $E\_LR_i(b)$, refer to the descriptions of the parameters in the foregoing formula (3), and details are not described herein again. The downmix compensation factor of the subframe i of the current frame includes the downmix compensation factor of the subband b in the subframe i of the current frame.

In another example, the audio encoder calculates the downmix compensation factor $\alpha_i(b)$ in the subband b in the subframe i of the current frame based on the left channel frequency-domain signal in the subband b in the subframe i of the current frame and the right channel frequency-domain signal in the subband b in the subframe i of the current frame according to the following formula (6).

$$\alpha_i(b)=\frac{\sqrt{E\_L_i(b)}+\sqrt{E\_R_i(b)}-\sqrt{E\_LR_i(b)}}{2\sqrt{E\_L_i(b)}}\quad(6)$$

b is an integer, and b∈[0, M−1]. For $E\_L_i(b)$, $E\_R_i(b)$, and $E\_LR_i(b)$, refer to the descriptions of the parameters in the foregoing formula (3), and details are not described herein again. The downmix compensation factor of the subframe i of the current frame includes the downmix compensation factor of the subband b in the subframe i of the current frame.

In another example, the audio encoder calculates the downmix compensation factor $\alpha_i$ (b) in the subband b in the subframe i of the current frame based on the right channel frequency-domain signal in the subband b in the subframe i of the current frame and the residual signal in the subband b in the subframe i of the current frame according to the following formula (7).

$$\alpha_i(b)=\sqrt{\frac{E\_S_i(b)}{E\_R_i(b)}}\quad(7)$$

b is an integer, and b∈[0, M−1]. For $E\_S_i(b)$, refer to the description of the foregoing formula (4); for $E\_R_i(b)$, refer to the description of the foregoing formula (3); and details are not described herein again. The downmix compensation factor of the subframe i of the current frame includes the downmix compensation factor of the subband b in the subframe i of the current frame.

In another example, the audio encoder calculates the downmix compensation factor $\alpha_i(b)$ in the subband b in the subframe i of the current frame based on the left channel frequency-domain signal in the subband b in the subframe i of the current frame, the right channel frequency-domain signal in the subband b in the subframe i of the current frame, and the second flag according to the following formula (8).

$$\alpha_i(b)=\begin{cases}\dfrac{\sqrt{E\_L_i(b)}+\sqrt{E\_R_i(b)}-\sqrt{E\_LR_i(b)}}{2\sqrt{E\_L_i(b)}}, & \text{nipd\_flag}=1\\ 0, & \text{nipd\_flag}=0\end{cases}\quad(8)$$

b is an integer, and b∈[0, M−1]. For $E\_L_i(b)$, $E\_R_i(b)$, and $E\_LR_i(b)$, refer to the descriptions of the parameters in the foregoing formula (3); for nipd_flag, refer to the description of the foregoing formula (5); and details are not described herein again. The downmix compensation factor of the subframe i of the current frame includes the downmix compensation factor of the subband b in the subframe i of the current frame.

Optionally, the audio encoder calculates the downmix compensation factor $\alpha_i$ of the subframe i of the current frame based on at least one of a left channel frequency-domain signal in each subband in the preset frequency band of the subframe i of the current frame, a right channel frequency-domain signal in each subband in the preset frequency band of the subframe i of the current frame, a second downmixed signal in each subband in the preset frequency band of the subframe i of the current frame, a residual signal in each subband in the preset frequency band of the subframe i of the current frame, or a second flag.

In an example, the audio encoder calculates the downmix compensation factor $\alpha_i$ in the subframe i of the current frame based on the left channel frequency-domain signal in the subframe i of the current frame and the right channel frequency-domain signal in the subframe i of the current frame according to the following formula (9).

$$\alpha_i=\frac{\sqrt{E\_L_i}+\sqrt{E\_R_i}-\sqrt{E\_LR_i}}{2\sqrt{E\_L_i}}\quad(9)$$

$$E\_L_i=\sum_{k=band\_limits\_1}^{k=band\_limits\_2-1}L_i''(k)^2,$$

$$E\_R_i=\sum_{k=band\_limits\_1}^{k=band\_limits\_2-1}R_i'(k)^2,\text{ and}$$

$$E\_LR_i=\sum_{k=band\_limits\_1}^{k=band\_limits\_2-1}[L_i''(k)+R_i''(k)]^2;\text{ or}$$

$$E\_L_i=\sum_{k=band\_limits\_1}^{k=band\_limits\_2-1}L_i'(k)^2,$$

$$E\_R_i=\sum_{k=band\_limits\_1}^{k=band\_limits\_2-1}R_i'(k)^2,\text{ and}$$

$$E\_LR_i=\sum_{k=band\_limits\_1}^{k=band\_limits\_2-1}[L_i'(k)+R_i'(k)]^2.$$

$E\_L_i$ represents an energy sum of left channel frequency-domain signals in all subbands of the preset frequency band in the subframe i of the current frame; $E\_R_i$ represents an energy sum of right channel frequency-domain signals in all the subbands of the preset frequency band in the subframe i of the current frame; $E\_LR_i$ represents an energy sum of the energy of the left channel frequency-domain signals and the energy of the right channel frequency-domain signals in all the subbands of the preset frequency band in the subframe i of the current frame; band_limits_1 represents a minimum frequency bin index value of all the subbands of the preset frequency band; band_limits_2 represents a maximum frequency bin index value of all the subbands of the preset frequency band; $L_i''(k)$ represents a left channel frequency-domain signal that is in the subframe i of the current frame and that is obtained after adjustment based on a stereo parameter; $R_i''(k)$ represents a right channel frequency-domain signal that is in the subframe i of the current frame and that is obtained after adjustment based on the stereo parameter; $L_i'(k)$ represents a left channel frequency-domain signal that is in the subframe i and that is obtained after time-shift adjustment; $R_i'(k)$ represents a right channel frequency-domain signal that is in the subframe i and that is obtained after time-shift adjustment; and k represents a frequency bin index value, where the current frame includes P subframes, both P and i are integers, $i \in [0, P-1]$, and $P \geq 2$.

In another example, the audio encoder calculates the downmix compensation factor $\alpha_i$ in the subframe i of the current frame based on the left channel frequency-domain signal in the subframe i of the current frame and the residual signal in the subframe i of the current frame according to the following formula (10).

$$\alpha_i = \sqrt{\frac{E\_S_i(b)}{E\_L_i(b)}} \quad (10)$$

$$E\_S_i = \sum_{k=band\_limits\_1}^{k=band\_limits2-1} RES_i'(k)^2.$$

$E\_S_i$ represents an energy sum of residual signals in all subbands of the preset frequency band in the subframe i of the current frame; and $RES_i'(k)$ represents the residual signals in all the subbands of the preset frequency band in the subframe i of the current frame.

For $E\_L_i$, band_limits_1, and band_limits_2, refer to the descriptions of the parameters in the foregoing formula (9), and details are not described herein again.

In another example, the audio encoder calculates the downmix compensation factor $\alpha_i$ in the subframe i of the current frame based on the left channel frequency-domain signal in the subframe i of the current frame, the right channel frequency-domain signal in the subframe i of the current frame, and the second flag according to the following formula (11).

$$\alpha_i = \begin{cases} \frac{\sqrt{E\_L_i} + \sqrt{E\_R_i} - \sqrt{E\_LR_i}}{2\sqrt{E\_L_i}}, & nipd\_flag = 1 \\ 0, & nipd\_flag = 0 \end{cases} \quad (11)$$

For $E\_L_i$, $E\_R_i$, and $E\_LR_i$, refer to the descriptions of the parameters in the foregoing formula (9); for nipd_flag, refer to the description of the foregoing formula (5); and details are not described herein again.

In another example, the audio encoder calculates the downmix compensation factor $\alpha_i$ in the subframe i of the current frame based on the left channel frequency-domain signal in the subframe i of the current frame and the right channel frequency-domain signal in the subframe i of the current frame according to the following formula (12).

$$\alpha_i = \frac{\sqrt{E\_L_i} + \sqrt{E\_R_i} - \sqrt{E\_LR_i}}{2\sqrt{E\_L_i}} \quad (12)$$

For $E\_L_i$, $E\_R_i$, and $E\_LR_i$, refer to the descriptions of the parameters in the foregoing formula (9), and details are not described herein again.

In another example, the audio encoder calculates the downmix compensation factor $\alpha_i$ in the subframe i of the current frame based on the right channel frequency-domain signal in the subframe i of the current frame and the residual signal in the subframe i of the current frame according to the following formula (13).

$$\alpha_i = \sqrt{\frac{E\_S_i}{E\_L_i}} \quad (13)$$

$$E\_S_i = \sum_{k=band\_limits\_1}^{k=band\_limits2-1} RES_i'(k)^2.$$

For $E\_S_i$ and $RES_i'(k)$, refer to the descriptions of the parameters in the foregoing formula (10), and details are not described herein again. For $E\_R_i$, band_limits_1, and band_limits_2, refer to the foregoing formula (9), and details are not described herein again.

In another example, the audio encoder calculates the downmix compensation factor $\alpha_i$ in the subframe i of the current frame based on the left channel frequency-domain signal in the subframe i of the current frame, the right channel frequency-domain signal in the subframe i of the current frame, and the second flag according to the following formula (14).

$$\alpha_i = \begin{cases} \frac{\sqrt{E\_L_i} + \sqrt{E\_R_i} - \sqrt{E\_LR_i}}{2\sqrt{E\_L_i}}, & nipd\_flag = 1 \\ 0, & nipd\_flag = 0 \end{cases} \quad (14)$$

For $E\_L_i$, $E\_R_i$, and $E\_LR_i$, refer to the descriptions of the parameters in the foregoing formula (9); for nipd_flag, refer to the description of the foregoing formula (5); and details are not described herein again.

Optionally, in this embodiment of this application, a minimum subband index value of the preset frequency band may be denoted as res_cod_band_min (or may be denoted as Th1), and a maximum subband index value of the preset frequency band may be denoted as res_cod_band_max (or may be denoted as Th2). In this case, a value of a subband index b of the preset frequency band satisfies: res_cod_band_min<b<res_cod_band_max; may satisfy res_cod_band_min≤b≤res_cod_band_max; may satisfy res_cod_band_min≤b<res_cod_band_max; or may satisfy res_cod_band_min<b≤res_cod_band_max.

A range of the preset frequency band may be the same as a frequency band range used for determining whether the residual signal in the current frame needs to be encoded, or may be different from the frequency band range used for determining whether the residual signal in the current frame needs to be encoded.

For example, the preset frequency band may include all subbands whose subband index values are greater than or equal to 0 and less than 5, or may include all subbands whose subband index values are greater than 0 and less than 5, or may include all subbands whose subband index values are greater than 1 and less than 7.

The audio encoder may first perform S402a and then perform S402b, or may first perform S402b and then perform S402a, or may simultaneously perform S402a and S402b. This is not specifically limited in this embodiment of this application.

S402c. The audio encoder corrects the second downmixed signal in the current frame based on the downmix compensation factor of the current frame, to obtain the first downmixed signal in the current frame.

Optionally, the audio encoder calculates a compensated downmixed signal in the current frame based on the left channel frequency-domain signal in the current frame (or the right channel frequency-domain signal in the current frame) and the downmix compensation factor of the current frame. Then, the audio encoder corrects the second downmixed signal in the current frame based on the second downmixed signal in the current frame and the compensated downmixed signal in the current frame, to obtain the first downmixed signal in the current frame.

The audio encoder may determine a product of the left channel frequency-domain signal in the current frame (or the right channel frequency-domain signal in the current frame) and the downmix compensation factor of the current frame as the compensated downmixed signal in the current frame.

Optionally, the audio encoder calculates a compensated downmixed signal in the subframe i of the current frame based on the left channel frequency-domain signal in the subframe i of the current frame (or the right channel frequency-domain signal in the subframe i of the current frame) and the downmix compensation factor of the subframe i of the current frame. Then, the audio encoder calculates a first downmixed signal in the subframe i of the current frame based on the second downmixed signal in the subframe i of the current frame and the compensated downmixed signal in the subframe i of the current frame.

The current frame includes P (P≥2) subframes, and the first downmixed signal in the current frame includes the first downmixed signal in the subframe i of the current frame, where i∈[0, P−1], and both P and i are integers.

The audio encoder may determine a product of the left channel frequency-domain signal in the subframe i of the current frame (or the right channel frequency-domain signal in the subframe i of the current frame) and the downmix compensation factor of the subframe i of the current frame as the compensated downmixed signal in the subframe i of the current frame.

It can be learned from the description of S402b that, the audio encoder may calculate the downmix compensation factor of the current frame; may calculate the downmix compensation factor of each subband in the current frame; may calculate the downmix compensation factor of each corresponding subband in the preset frequency band of the current frame; may calculate the downmix compensation factor of each subframe of the current frame; may calculate the downmix compensation factor of each subband in each subframe of the current frame; or may calculate the downmix compensation factor of each corresponding subband in the preset frequency band of each subframe of the current frame. Likewise, the audio encoder also needs to calculate the compensated downmixed signal in the current frame and the first downmixed signal in the current frame in a manner similar to the manner of calculating the downmix compensation factor.

A method for calculating the compensated downmixed signal in the current frame by the audio encoder is described herein.

In an example, if the audio encoder calculates the downmix compensation factor $\alpha_i(b)$ in the subband b in the subframe i of the current frame according to the foregoing formula (3), formula (4), or formula (5), the audio encoder calculates a compensated downmixed signal $DMX\_comp_{ib}(k)$ in the subband b in the subframe i of the current frame according to the following formula (15).

$$DMX\_comp_{ib}(k)=\alpha_i(b)*L_{ib}''(k) \quad (15)$$

For $L_{ib}''(k)$, refer to the description of the foregoing formula (1), and details are not described herein again.

In another example, if the audio encoder calculates the downmix compensation factor $\alpha_i$ (b) in the subband b in the subframe i of the current frame according to the foregoing formula (6), formula (7), or formula (8), the audio encoder calculates a compensated downmixed signal $DMX\_comp_{ib}(k)$ in the subband b in the subframe i of the current frame according to the following formula (16).

$$DMX\_comp_{ib}(k)=\alpha_i(b)*R_{ib}''(k) \quad (16)$$

For $R_{ib}''(k)$, refer to the description of the foregoing formula (1), and details are not described herein again.

In another example, if the audio encoder calculates the downmix compensation factor $\alpha_i$ in the subframe i of the current frame according to the foregoing formula (9), formula (10), or formula (11), the audio encoder calculates a compensated downmixed signal $DMX\_comp_i(k)$ in each subband in the preset frequency band of the subframe i of the current frame according to the following formula (17).

$$DMX\_comp_i(k)=\alpha_i*L_i''(k) \quad (17)$$

For $L_i''(k)$, refer to the description of the foregoing formula (9), and details are not described herein again.

In another example, if the audio encoder calculates the downmix compensation factor $\alpha_i$ in the subframe i of the current frame according to the foregoing formula (12), formula (13), or formula (14), the audio encoder calculates a compensated downmixed signal $DMX\_comp_i(k)$ in each subband in the preset frequency band of the subframe i of the current frame according to the following formula (18).

$$DMX\_comp_i(k)=\alpha_i*R_i''(k) \quad (18)$$

For $R_i''(k)$, refer to the description of the foregoing formula (9), and details are not described herein again.

Optionally, after calculating the compensated downmixed signal in the current frame, the audio encoder may determine a sum of the second downmixed signal in the current frame and the compensated downmixed signal in the current frame as the first downmixed signal in the current frame. After calculating the compensated downmixed signal in the subframe i of the current frame, the audio encoder may determine a sum of the second downmixed signal in the subframe i of the current frame and the compensated downmixed signal in the subframe i of the current frame as the first downmixed signal in the current frame.

In an example, if the audio encoder calculates the compensated downmixed signal $DMX\_comp_{ib}(k)$ in the subband b in the subframe i of the current frame according to the foregoing formula (15) or (16), the audio encoder calculates a first downmixed signal $\widetilde{DMX}_{ib}(k)$ in the subband b in the subframe i of the current frame according to the following formula (19).

$$\widetilde{DMX}_{ib}(k)=DMX_{ib}(k)+DMX\_comp_{ib}(k) \quad (19)$$

$DMX_{ib}(k)$ represents the second downmixed signal in the subband b in the subframe i of the current frame. The audio encoder may calculate $DMX_{ib}(k)$ according to the foregoing formula (1) or formula (2).

In another example, if the audio encoder calculates the compensated downmixed signal $DMX\_comp_i(k)$ in each subband in the preset frequency band of the subframe i of the current frame according to the foregoing formula (17) or (18), the audio encoder calculates a first downmixed signal $\widetilde{DMX}$ (k) in each subband in the preset frequency band of the subframe i of the current frame according to the following formula (20).

$$\widetilde{DMX}(k)=DMX_i(k)+DMX\_comp_i(k) \quad (20)$$

$DMX_i(k)$ represents the second downmixed signal in each subband in the preset frequency band of the subframe i of the current frame. A method of calculating $DMX_i(k)$ is similar to the method of calculating $DMX_{ib}(k)$, and details are not described herein again.

With reference to the foregoing description, it can be learned that in this embodiment of this application, when it is determined that a previous frame of the current frame of the stereo signal is not a switching frame and that a residual signal in the previous frame does not need to be encoded, a new method is also used to calculate the first downmixed signal in the current frame.

In an implementation, when it is determined that the previous frame of the current frame of the stereo signal is not a switching frame and that the residual signal in the previous frame does not need to be encoded, a method for calculating the first downmixed signal in the current frame by the audio encoder includes: obtaining, by the audio encoder, a second downmixed signal in the current frame and a downmix compensation factor of the current frame; and corrects the second downmixed signal in the current frame based on the obtained downmix compensation factor of the current frame and the obtained second downmixed signal in the current frame, to obtain the first downmixed signal in the current frame.

Figure 5B:
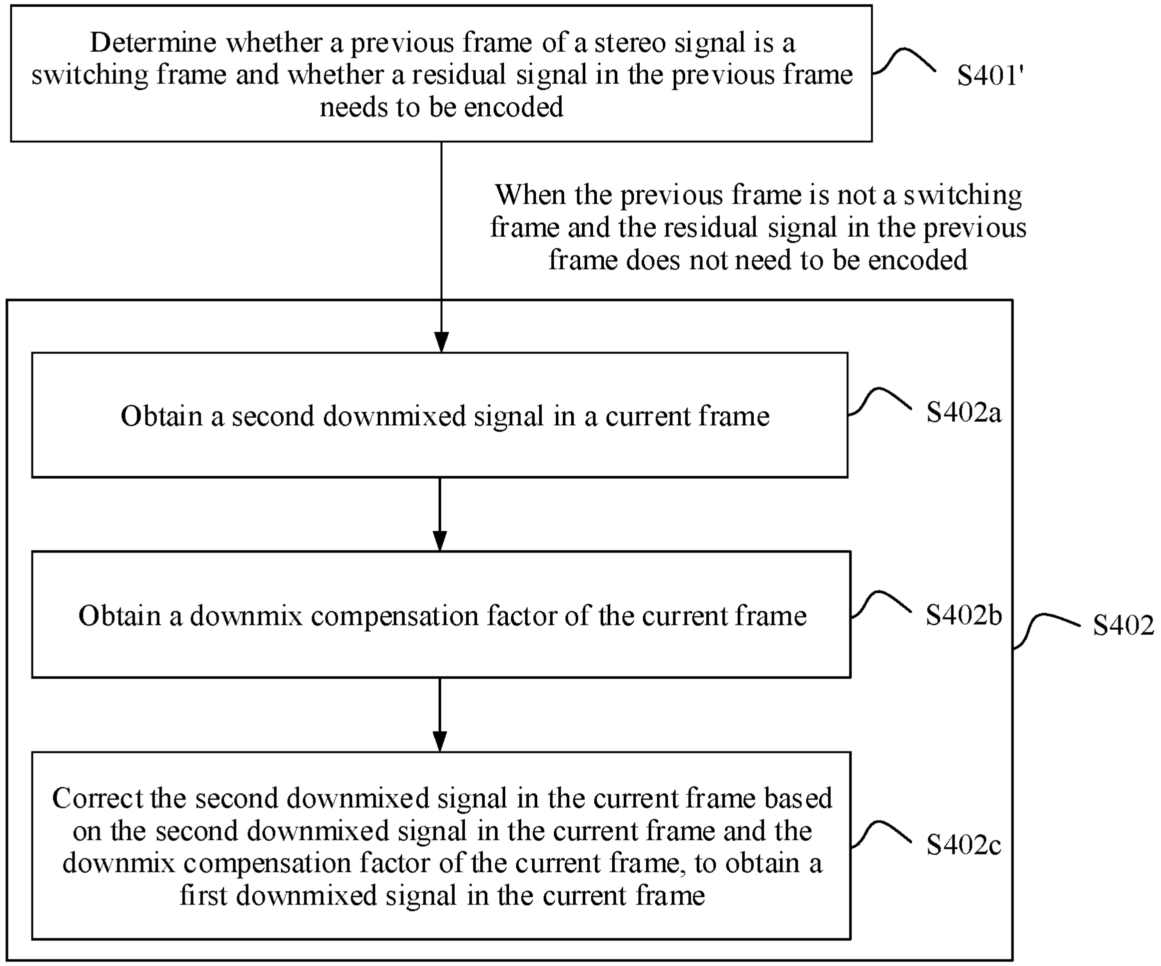
FIG. 5B is a schematic flowchart 3 of a downmixed signal calculation method according to an embodiment of this application.

Specifically, with reference to FIG. 5A, as shown in FIG. 5B, when it is determined that the previous frame of the current frame of the stereo signal is not a switching frame and that the residual signal in the previous frame does not need to be encoded, S401 is replaced with S401'.

S401'. The audio encoder determines whether the previous frame of the current frame of the stereo signal is a switching frame and whether the residual signal in the previous frame needs to be encoded.

In another implementation, when it is determined that the previous frame of the current frame of the stereo signal is not a switching frame and that the residual signal in the previous frame does not need to be encoded, a method for calculating the first downmixed signal in the current frame by the audio encoder includes: obtaining, by the audio encoder, a downmix compensation factor of the previous frame and a second downmixed signal in the current frame; and corrects the second downmixed signal in the current frame based on the obtained downmix compensation factor of the previous frame and the obtained second downmixed signal in the current frame, to obtain the first downmixed signal in the current frame.

Figure 5C:
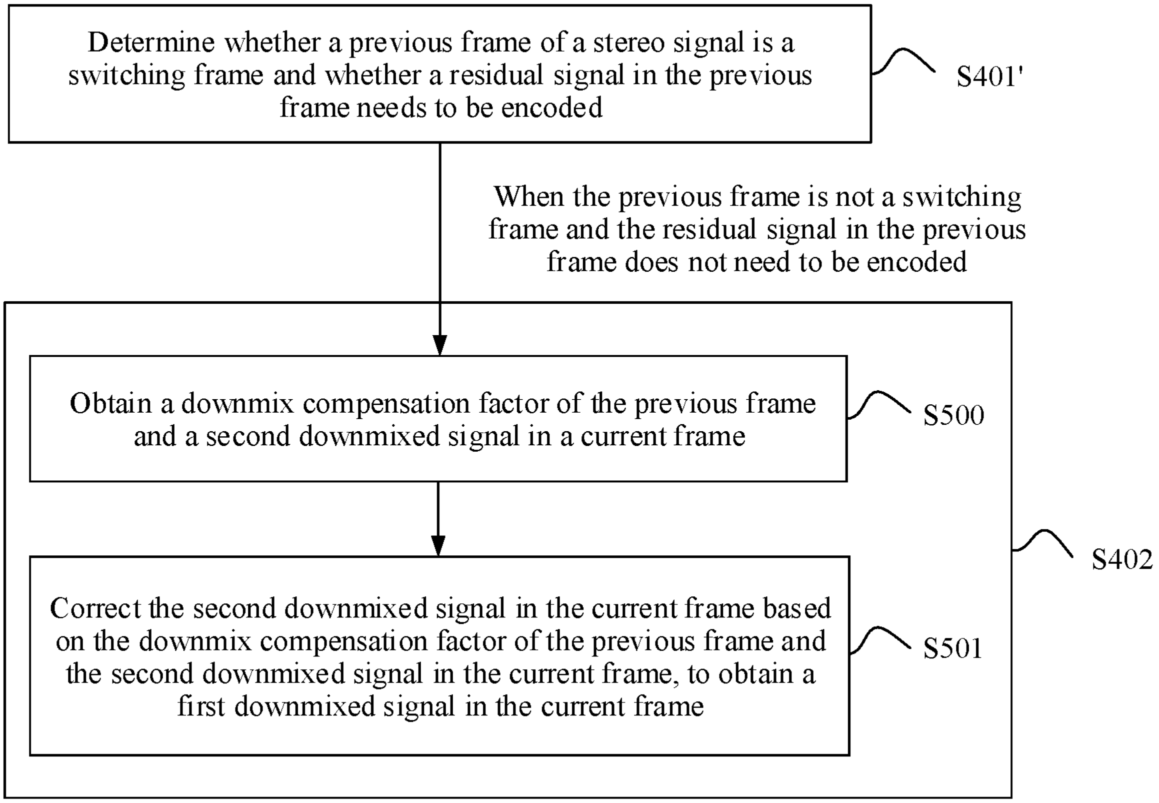
FIG. 5C is a schematic flowchart 4 of a downmixed signal calculation method according to an embodiment of this application.

Specifically, with reference to FIG. 5B, as shown in FIG. 5C, when it is determined that the previous frame of the current frame of the stereo signal is not a switching frame and that the residual signal in the previous frame does not need to be encoded, S402*a* to S402*c* in FIG. 5B are replaced with S500 and S501.

S500. The audio encoder obtains the downmix compensation factor of the previous frame and the second downmixed signal in the current frame.

A method for obtaining the downmix compensation factor of the previous frame by the audio encoder is similar to the method for obtaining the downmix compensation factor of the current frame by the audio encoder. For details, refer to the description of S402*b*. Details are not described herein again.

For a method for obtaining the second downmixed signal in the current frame by the audio encoder, refer to the description of S402*a*. Details are not described herein again.

S501. The audio encoder corrects the second downmixed signal in the current frame based on the downmix compensation factor of the previous frame and the second downmixed signal in the current frame, to obtain the first downmixed signal in the current frame.

Optionally, the audio encoder calculates a compensated downmixed signal in the current frame based on the left channel frequency-domain signal in the current frame (or the right channel frequency-domain signal in the current frame) and the downmix compensation factor of the previous frame. Then, the audio encoder calculates the first downmixed signal in the current frame based on the second downmixed signal in the current frame and the compensated downmixed signal in the current frame.

The audio encoder may determine a product of the first frequency-domain signal in the current frame and the downmix compensation factor of the previous frame as the compensated downmixed signal in the current frame, and determine a sum of the second downmixed signal in the current frame and the compensated downmixed signal in the current frame as the first downmixed signal in the current frame.

Optionally, the audio encoder calculates a compensated downmixed signal in the subframe i of the current frame based on the left channel frequency-domain signal in the subframe i of the current frame (or the right channel frequency-domain signal in the subframe i of the current frame) and a downmix compensation factor of a subframe i of the previous frame. Then, the audio encoder calculates a first downmixed signal in the subframe i of the current frame based on the second downmixed signal in the subframe i of the current frame and the compensated downmixed signal in the subframe i of the current frame.

The audio encoder may determine a product of the second frequency-domain signal in the subframe i and the downmix compensation factor of the subframe i as the compensated downmixed signal in the subframe i, and determine a sum of the second downmixed signal in the subframe i of the current frame and the compensated downmixed signal in the subframe i of the current frame as the first downmixed signal in the subframe i of the current frame.

It can be learned that a method for the "correcting, by the audio encoder, the second downmixed signal in the current frame based on the downmix compensation factor of the previous frame and the second downmixed signal in the current frame, to obtain the first downmixed signal in the current frame is similar to the foregoing method for correcting, by the audio encoder, the second downmixed signal in the current frame based on the second downmixed signal in the current frame and the downmix compensation factor of the current frame, to obtain the first downmixed signal in the current frame. For details, refer to the description of S402*c*, and details are not described herein again.

In an actual application, internal code of the audio encoder may have different settings. Based on an actual requirement and the internal code, the audio encoder may calculate the first downmixed signal in the current frame according to the procedure shown in FIG. 5A, may calculate the first downmixed signal in the current frame according to the procedure shown in FIG. 5B, or may calculate the first downmixed signal in the current frame according to the procedure shown in FIG. 5C.

When the current frame is a switching frame or the residual signal in the current frame needs to be encoded, the audio encoder calculates the first downmixed signal in the current frame by using a method different from the method that includes S401 and S402. In this way, in different cases, methods for calculating the first downmixed signal in the current frame are different, to resolve a problem that there is a discontinuous spatial sense and poor sound image stability of a decoded stereo signal due to switching back and forth in the preset frequency band between encoding a residual signal and skipping encoding the residual signal, thereby effectively improving aural quality.

To fully understand the downmixed signal calculation method provided in this embodiment of this application, a method for adaptively choosing whether to encode a residual signal in a corresponding subband of a preset frequency band is described herein, or in other words, an audio signal encoding method in this application is described.

Figure 6A:
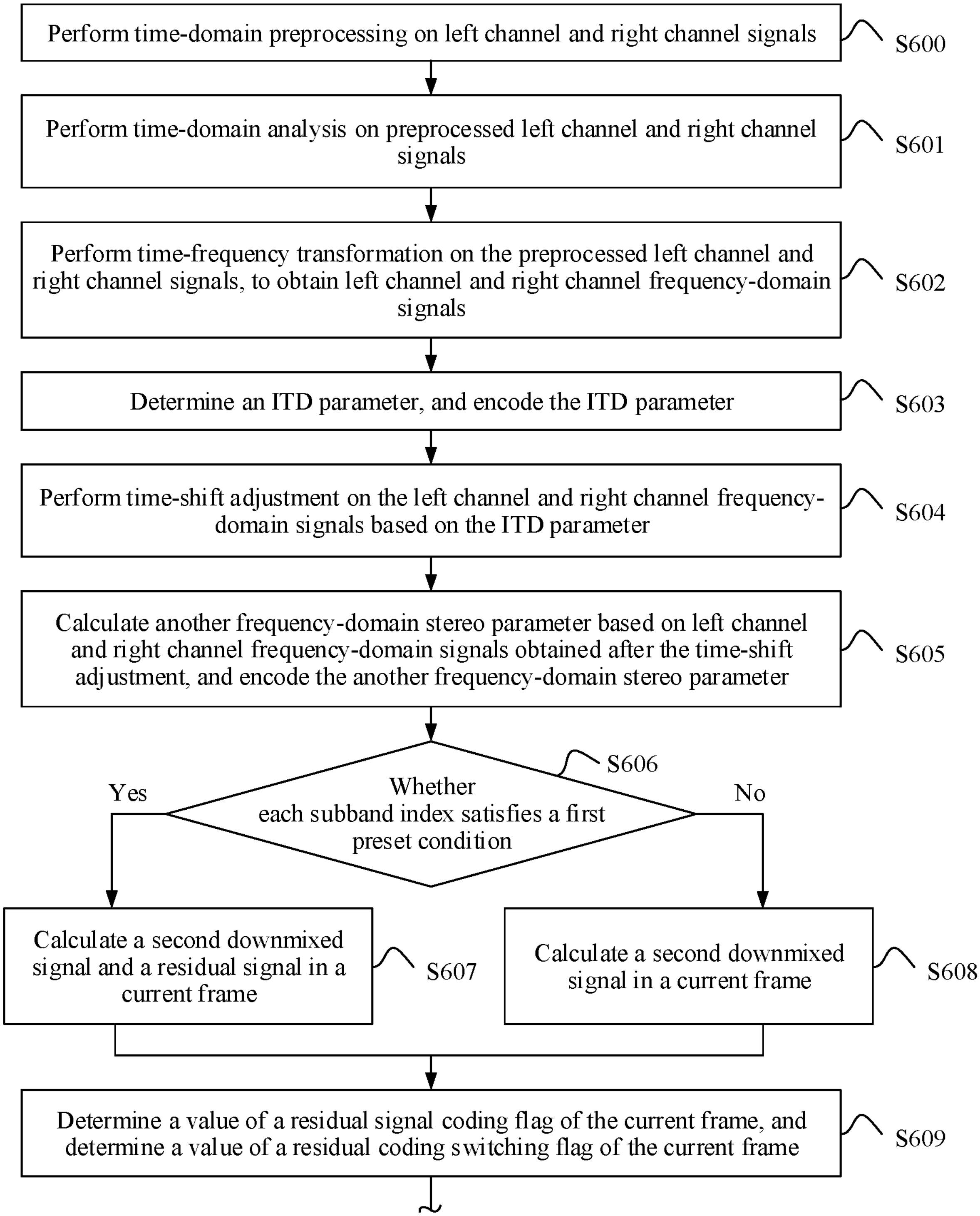
FIG. 6A and FIG. 6B are a schematic flowchart 1 of an audio signal encoding method according to an embodiment of this application.
Figure 6B:
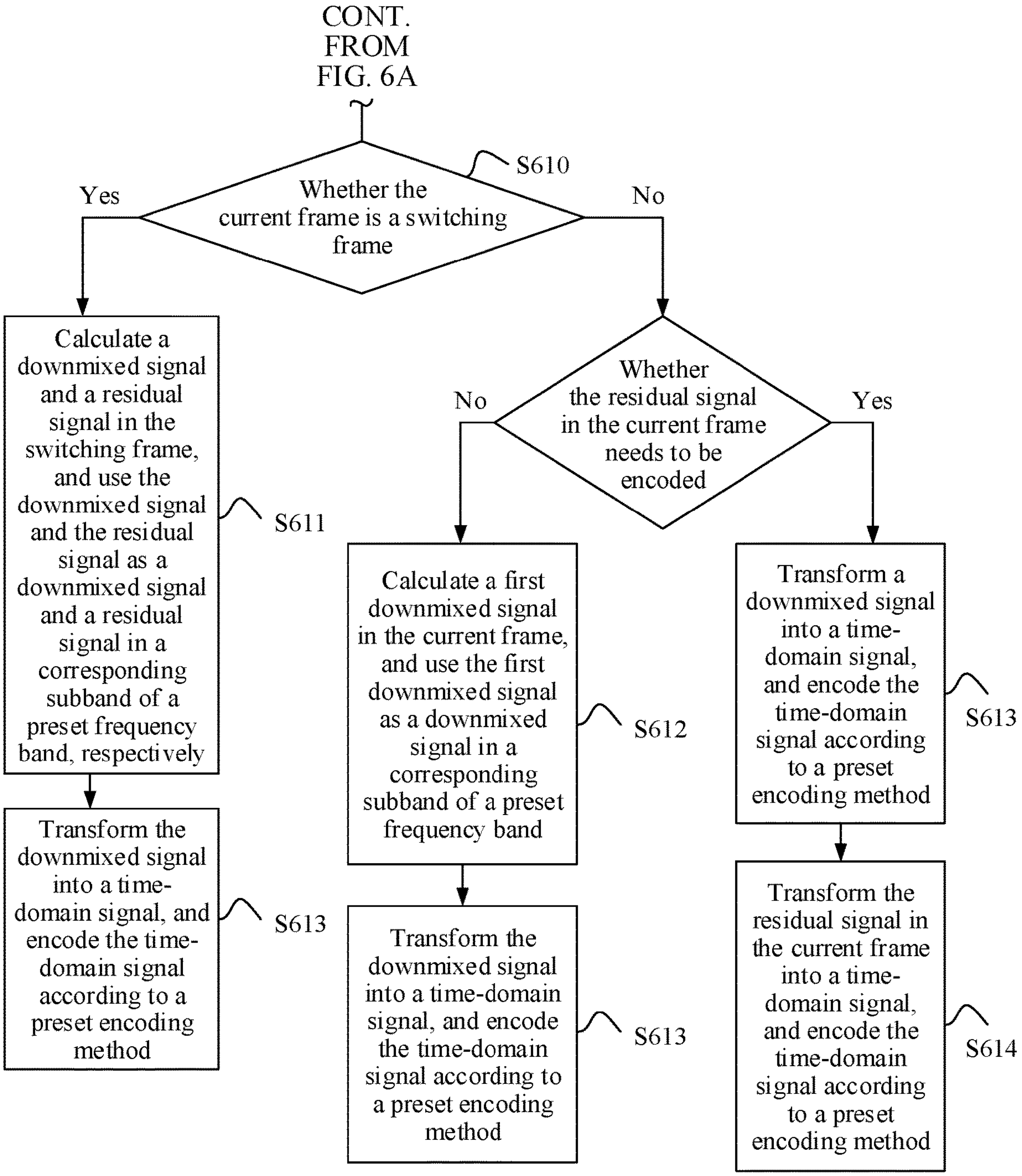

Specifically, FIG. 6A and FIG. 6B are a schematic flowchart of an audio signal encoding method according to this application. For ease of description, an example in which an audio encoder is an execution body is used for description in FIG. 6A and FIG. 6B. In this embodiment of this application, wideband stereo encoding performed at a coding rate of 26 kbps is used as an example for description.

It should be noted that the audio signal encoding method in this application is not limited to being implemented in wideband stereo encoding performed at a coding rate of 26 kbps, or may be applied to super wideband stereo encoding or encoding performed at another rate.

As shown in FIG. 6A and FIG. 6B, the audio signal encoding method includes the following steps.

S600. The audio encoder performs time-domain preprocessing on left channel and right channel time-domain signals of a stereo signal.

In this embodiment of this application, the "left channel and right channel time-domain signals" are a left channel time-domain signal and a right channel time-domain signal, and "preprocessed left channel and right channel time-domain signals" are a preprocessed left channel time-domain signal and a preprocessed right channel time-domain signal.

The stereo signal in this embodiment of this application may be an original stereo signal, may be a stereo signal constituted by two channels of signals included in a multi-channel signal, or may be a stereo signal constituted by two channels of signals jointly generated by a plurality of channels of signals included in a multi-channel signal.

Stereo encoding in this embodiment of this application may be performed by an independent stereo encoder, or may be performed by a core encoding part in a multi-channel encoder, and is intended to encode a stereo signal constituted by two channels of signals jointly generated by a plurality of channels of signals included in a multi-channel signal.

Generally, the audio encoder performs framing processing on the stereo signal, and performs encoding based on each frame of the stereo signal. If a sampling rate of the stereo signal is 16 kHz, each frame of the signal is 20 ms, and a frame length is denoted as N, N=320, that is, the frame length is equal to 320 sampling points. The frame length is usually a frame length of one channel of signal included in the stereo signal. Each stereo signal includes a left channel time-domain signal and a right channel time-domain signal. Correspondingly, a stereo signal in a current frame includes a left channel time-domain signal in the current frame and a right channel time-domain signal in the current frame.

For ease of description, the current frame is used as an example for description herein. In this embodiment of this application, the left channel time-domain signal in the current frame is denoted as $x_L(n)$, and the right channel time-domain signal in the current frame is denoted as $x_R(n)$, where n represents a sampling point sequence number, and n=0, 1, . . . , N−1.

Specifically, the audio encoder may perform high-pass filtering processing on both the left channel time-domain signal and the right channel time-domain signal in the current frame to obtain preprocessed left channel and right channel time-domain signals in the current frame. In this embodiment of this application, the preprocessed left channel time-domain signal in the current frame is denoted as $x_{LHP}(n)$, and the preprocessed right channel time-domain signal in the current frame is denoted as $x_{RHP}(n)$. Herein, high-pass filtering processing may be performed by an infinite impulse response (Infinite Impulse Response, IIR) filter whose cut-off frequency is 20 Hz, or may be performed by a filter of another type.

For example, a transfer function of a high-pass filter whose sampling rate is 16 kHz and cut-off frequency is 20 Hz may be expressed as follows:

$$H_{20\,Hz}(z) = \frac{b_0 + b_1 z^{-1} + b_2 z^{-2}}{1 + a_1 z^{-1} + a_2 z^{-2}}$$

In the transfer function, $b_0$=0.994461788958195, $b_1$=−1.988923577916390, $b_2$=0.994461788958195, $a_1$=1.988892905899653, $a_2$=−0.988954249933127, and z represents a transformation factor of Z-transform.

Correspondingly, the preprocessed left channel time-domain signal $x_{LHP}(n)$ in the current frame is as follows:

$$x_{LHP}(n)=b_0*x_L(n)+b_1*x_L(n-1)+b_2*x_L(n-2)-a_1*x_{LHP}(n-1)-a_2*x_{LHP}(n-2)$$

The preprocessed right channel time-domain signal $x_{R_{HP}}(n)$ in the current frame is as follows:

$$x_{RHP}(n)=b_0*x_R(n)+b_1*x_R(n-1)+b_2*x_R(n-2)-a_1*x_{RHP}(n-1)-a_2*x_{RHP}(n-2)$$

S601. The audio encoder performs time-domain analysis on the preprocessed left channel and right channel time-domain signals.

Optionally, that the audio encoder performs time-domain analysis on the preprocessed left channel and right channel time-domain signals may be: performing, by the audio encoder, transient detection on the preprocessed left channel and right channel time-domain signals.

The transient detection may be energy detection performed by the audio encoder on both the preprocessed left channel time-domain signal in the current frame and the preprocessed right channel time-domain signal in the current frame to detect whether an energy burst occurs in the current frame.

For example, the audio encoder determines that energy of the preprocessed left channel time-domain signal in the current frame is $E_{cur-L}$; and the audio encoder performs transient detection based on an absolute value of a difference between energy $E_{pre-L}$ of a preprocessed left channel time-domain signal in a previous frame and the energy $E_{cur\text{-}L}$ of the preprocessed left channel time-domain signal in the current frame, to obtain a transient detection result of the preprocessed left channel time-domain signal in the current frame.

Likewise, the audio encoder may perform transient detection on the preprocessed right channel time-domain signal in the current frame by using the same method.

It is easy to understand that, the time-domain analysis may alternatively be time-domain analysis in the prior art other than the transient detection, for example, preliminary determining of a time-domain inter-channel time difference parameter (ITD), delay alignment processing in time domain, and band spreading preprocessing.

S602. The audio encoder performs time-frequency transformation on the preprocessed left and right channel signals to obtain left channel and right channel frequency-domain signals.

Specifically, the audio encoder may perform discrete Fourier transform (DFT) on the preprocessed left channel time-domain signal to obtain the left channel frequency-domain signal, and perform discrete Fourier transform on the preprocessed right channel time-domain signal to obtain the right channel frequency-domain signal.

To overcome a problem of spectral aliasing, an overlap-add method is usually used for processing between two consecutive times of discrete Fourier transform. Based on an actual requirement, the audio encoder may further add zero to an input signal on which discrete Fourier transform is to be performed.

Optionally, the audio encoder may perform discrete Fourier transform for each frame once, or may divide each frame into P (P≥2) subframes, and perform discrete Fourier transform for each subframe once.

If the audio encoder performs discrete Fourier transform for each frame once, a transformed left channel frequency-domain signal may be denoted as L(k), where k=0, 1, . . . , a/2−1; and a transformed right channel frequency-domain signal may be denoted as R(k), where k=0, 1, . . . , a/2−1, k represents a frequency bin index value, and a represents a length of a part on which discrete Fourier transform is performed for each frame once.

If the audio encoder performs discrete Fourier transform for each subframe once, a transformed left channel frequency-domain signal in a subframe i may be denoted as $L_i(k)$, where k=0, 1, . . . , L/2−1; and a transformed right channel frequency-domain signal in the subframe i may be denoted as $R_i(k)$, where k=0, 1, . . . , L/2−1, k represents a frequency bin index value, L represents a length of a part on which discrete Fourier transform is performed for each subframe once, i represents a subframe index value, and i=0, 1, . . . , P−1.

For example, if each frame of a left channel signal or a right channel signal is 20 ms, a frame length N is 320, and the audio encoder divides each frame into two subframes, that is, P=2, each subframe of a signal is 10 ms, and a subframe length is 160. If a length L of a part on which discrete Fourier transform is performed for each subframe once is 400, a transformed left channel frequency-domain signal in the subframe i may be denoted as $L_i(k)$, where k=0, 1, . . . , 199; and a transformed right channel frequency-domain signal in the subframe i may be denoted as $R_i(k)$, where k=0, 1, . . . , 199, and a value of i is 0 or 1.

Optionally, the audio encoder may alternatively transform a time-domain signal into a frequency-domain signal by using time-frequency transformation technologies such as fast Fourier transform (FFT) and modified discrete cosine transform (MDCT). This is not specifically limited in this embodiment of this application.

S603. The audio encoder determines an ITD parameter, and encodes the ITD parameter.

Optionally, the audio encoder may determine the ITD parameter in frequency domain, may determine the ITD parameter in time domain, or may determine the ITD parameter in time-frequency domain. This is not specifically limited in this embodiment of this application.

In an example, the audio encoder extracts the ITD parameter in time domain by using a cross-correlation coefficient. Within a range $0 \le i \le T_{max}$), the audio encoder calculates $c_n(i)=i_{j=0}^{N-1-i} x_{RHP}(j)*x_{LHP}(j+i)$ and $c_p(i)=i_{j=0}^{N-1-i}* x_{LHP}(j)*x_{RHP}(j+i)$. If $\max(c_n(i))>\max(c_p(i))$, an ITD parameter value is an opposite number of an index value corresponding to $\max(c_n(i))$; or otherwise, an ITD parameter value is an index value corresponding to $\max(c_p(i))$. i represents an index value for calculating the cross-correlation coefficient, j represents an index value of a sampling point, $T_{max}$ is corresponding to a maximum ITD value at different sampling rates, and N represents a frame length.

In another example, the audio encoder determines the ITD parameter in frequency domain based on the left channel and right channel frequency-domain signals.

Optionally, the audio encoder calculates a frequency domain cross-correlation coefficient $XCORR_i(k)$ of the subframe is $XCORR_i(k)=L_i(k)*R_i^*(k)$, where $R_i^*(k)$ represents a conjugation of a right channel frequency-domain signal in the subframe i. Then, the audio encoder transforms the frequency domain cross-correlation coefficient $XCORR_i(k)$ into a time-domain coefficient $xcorr_i(n)$, where n=0, 1, . . . , L−1. Finally, the audio encoder searches for a maximum value of $xcorr_i(n)$ in a range of $L/2-T_{max} \le n \le L/2+T_{max}$, and obtains an ITD parameter value $T_i$ corresponding to the subframe i, that is, $T_i=\arg\max(xcorr_i(n))-L/2$.

Optionally, the audio encoder may further calculate an amplitude value mag(j) within a search range of $-T_{max} \le j \le T_{max}$ based on a left channel frequency-domain signal in the subframe i and the right channel frequency-domain signal in the subframe i, where $mag(j)=\Sigma_{i=0}^{1}\Sigma_{k=0}^{L/2-1} L_i(k)* R_i^*(k)*\exp((2\pi*k*j)/L)$, and an ITD parameter value $T_i$ is $T_i=\arg\max(mag(j))$, to be specific, the ITD parameter value $T_i$ is an index value corresponding to a maximum amplitude value.

Specifically, after determining the ITD parameter, the audio encoder encodes the ITD parameter, and writes an encoded ITD parameter into a stereo encoded bitstream. In this embodiment of this application, the audio encoder may encode the ITD parameter by using any existing quantization encoding technology. This is not specifically limited in this embodiment of this application.

S604. The audio encoder performs time-shift adjustment on the left channel and right channel frequency-domain signals based on the ITD parameter.

The audio encoder may perform time-shift adjustment on the left channel and right channel frequency-domain signals according to any existing technology. This is not specifically limited in this embodiment of this application.

Herein, an example in which each frame is divided into P subframes and P=2 is used for description. In this embodiment of this application, a left channel frequency-domain signal that is in the subframe i and that is obtained after time-shift adjustment may be denoted as $L_i'(k)$, where k=0, 1, . . . , L/2−1; and a right channel frequency-domain signal that is in the subframe i and that is obtained after time-shift adjustment may be denoted as $R_i'(k)$, where k=0, 1, . . . , L/2−1, k represents a frequency bin index value, i represents a subframe index value, and i=0, 1, . . . , P−1.

$$\begin{cases} L_i'(k) = L_i(k) * e^{-j2\pi\frac{T_i}{L}} \\ R_i'(k) = R_i(k) * e^{+j2\pi\frac{T_i}{L}} \end{cases}$$

$T_i$ represents an ITD parameter value corresponding to the subframe i, L represents a length of a part on which discrete Fourier transform is performed for each subframe once, $L_i(k)$ represents a left channel frequency-domain signal in the subframe i, and $R_i(k)$ represents a right channel frequency-domain signal in the subframe i, where i represents a subframe index value, and i=0, 1, . . . , P−1.

It can be understood that, if the audio encoder performs discrete Fourier transform for each frame once, the audio encoder also performs time-shift adjustment for each frame.

S605. The audio encoder calculates another frequency-domain stereo parameter based on left channel and right channel frequency-domain signals obtained after the time-shift adjustment, and encodes the another frequency-domain stereo parameter.

The another frequency-domain stereo parameter herein may include but is not limited to an IPD parameter, an ILD parameter, a subband side gain, and the like. After obtaining the another frequency-domain stereo parameter, the audio encoder needs to encode the another frequency-domain stereo parameter and write encoded another frequency-domain stereo parameter into the stereo encoded bitstream.

In this embodiment of this application, the audio encoder may encode the foregoing another frequency-domain stereo parameter by using any existing quantization encoding technology. This is not specifically limited in this embodiment of this application.

S606. The audio encoder determines whether each subband index satisfies a first preset condition.

In this embodiment of this application, the audio encoder performs subband division on a frequency-domain signal in each frame or a frequency-domain signal in each subframe. A frequency bin included in a subband b is k∈[band_limits(b), band_limits(b+1)−1], where band_limits(b) represents a minimum index value of the frequency bin included in the subband b. In this embodiment of this application, the frequency-domain signal in each subframe is divided into M (M≥2) subbands, and a specific frequency bin included in each subband may be determined based on band_limits(b).

The first preset condition may be that a subband index value is less than a maximum subband index value for residual coding decision, that is, b<res_flag_band_max, where res_flag_band_max represents the maximum subband index value for residual coding decision; may be that a subband index value is less than or equal to a maximum subband index value for residual coding decision, that is, b≤res_flag_band_max; may be that a subband index value is less than a maximum subband index value for residual coding decision and greater than a minimum subband index value for residual coding decision, that is, res_flag_band_min<b<res_flag_band_max, where res_flag_band_max represents the maximum subband index value for residual coding decision, and res_flag_band_min represents a minimum subband index value for residual coding decision; may be that a subband index value is less than or equal to a maximum subband index value for residual coding decision and greater than or equal to a minimum subband index value for residual coding decision, that is, res_flag_band_min≤b≤res_flag_band_max; may be that a subband index value is less than or equal to a maximum subband index value for residual coding decision and greater than a minimum subband index value for residual coding decision, that is, res_flag_band_min<b≤res_flag_band_max; or may be that a subband index value is less than a maximum subband index value for residual coding decision and greater than or equal to a minimum subband index value for residual coding decision, that is, res_flag_band_min≤b<res_flag_band_max. This is not specifically limited in this embodiment of this application.

The first preset condition may vary with different coding rates and/or different encoding bandwidths. For example, when bandwidth is wideband and a coding rate is 26 kbps, the first preset condition is that a subband index value is less than 5. When bandwidth is wideband and a coding rate is 44 kbps, the first preset condition is that a subband index value is less than 6. When bandwidth is wideband and a coding rate is 56 kbps, the first preset condition is that a subband index value is less than 7.

In this embodiment of this application, for example, the bandwidth is wideband and the coding rate is 26 kbps. Each frame is divided into P subframes, and P=2; and a frequency-domain signal in each subframe is divided into M subbands, and M=10. In this case, for each subframe, the audio encoder needs to determine whether each subband index satisfies the first preset condition. The first preset condition is that a subband index value is less than res_flag_band_max, where res_flag_band_max=5.

Specifically, if each subband index satisfies the first preset condition, the audio encoder calculates a second downmixed signal in the current frame and a residual signal in the current frame based on the left channel and right channel frequency-domain signals in the current frame that are obtained after the time-shift adjustment, that is, performs S607. If each subband index does not satisfy the first preset condition, the audio encoder calculates a second downmixed signal in the current frame based on the left channel and right channel frequency-domain signals in the current frame that are obtained after the time-shift adjustment, that is, performs S608.

S607. The audio encoder calculates the second downmixed signal and the residual signal in the current frame based on the left channel and right channel frequency-domain signals in the current frame that are obtained after the time-shift adjustment.

Herein, the audio encoder may calculate the second downmixed signal in the current frame according to the foregoing formula (1) or formula (2).

Optionally, in this embodiment of this application, the audio encoder calculates a residual signal $RES_{ib}'(k)$ in a subband b in the subframe i of the current frame according to the following formula (21):

$$RES_{ib}'(k)=RES_{ib}(k)-g\_ILD_i*DMX_{ib}(k) \quad (21)$$

In the foregoing formula (21), $RES_{ib}(k)=(L_{ib}''(k)-R_{ib}''(k))/2$. In addition, for $L_{ib}''(k)$, $R_{ib}''(k)$, $g\_ILD_i$, and $DMX_i(k)$, refer to the descriptions of the parameters in the foregoing formula (1), and details are not described herein again.

S608. The audio encoder calculates the second downmixed signal in the current frame based on the left channel and right channel frequency-domain signals in the current frame that are obtained after the time-shift adjustment.

Herein, the audio encoder may calculate the second downmixed signal in the current frame by using a method that is the same as that in S607, or may calculate the second downmixed signal in the current frame by using another downmixed signal calculation method in the prior art.

After performing S607 or S608, the audio encoder performs S609.

S609. The audio encoder determines a value of a residual coding flag of the current frame, and determines a value of a residual coding switching flag of the current frame.

That the audio encoder determines the value of the residual coding flag of the current frame is first described.

Optionally, the audio encoder may determine the value of the residual coding flag of the current frame based on an energy relationship between the second downmixed signal in the current frame and the residual signal in the current frame, or may determine the value of the residual coding flag of the current frame based on a parameter and/or another parameter used to represent an energy relationship between the second downmixed signal in the current frame and the residual signal in the current frame. This is not specifically limited in this embodiment of this application. For example, the audio encoder determines the value of the residual coding flag of the current frame based on at least one of parameters such as a voice/music classification result, a voice activation detection result, residual signal energy, or a correlation between a left channel frequency-domain signal and a right channel frequency-domain signal.

Herein, a description is provided by using an example in which the audio encoder determines the value of the residual coding flag of the current frame based on the parameter and/or another parameter used to represent the energy relationship between the second downmixed signal in the current frame and the residual signal in the current frame.

Optionally, if the parameter used to represent the energy relationship between the second downmixed signal in the current frame and the residual signal in the current frame is greater than a preset threshold, the audio encoder sets the value of the residual coding flag of the current frame to a value indicating that the residual signal in the current frame needs to be encoded. Otherwise, the audio encoder sets the value of the residual coding flag of the current frame to a value indicating that the residual signal does not need to be encoded.

That the audio encoder determines the value of the residual coding switching flag of the current frame is described herein.

Optionally, the audio encoder may determine the value of the residual coding switching flag of the current frame based on a relationship between the value of the residual coding flag of the current frame and a value of a residual coding flag of a previous frame.

In an implementation, the audio encoder may determine the value of the residual coding switching flag of the current frame, and update a modification flag value of the residual coding flag of the previous frame.

If the value of the residual coding flag of the current frame is not equal to the value of the residual coding flag of the previous frame, and a modification flag of the residual coding flag of the previous frame indicates that the residual coding flag of the previous frame is not modified for the second time, the residual coding switching flag of the current frame indicates that the current frame is a switching frame.

If the value of the residual coding flag of the current frame is not equal to the value of the residual coding flag of the previous frame, a modification flag of the residual coding flag of the previous frame indicates that the residual coding flag of the previous frame is not modified for the second time, and the residual coding flag of the current frame indicates that the residual signal does not need to be encoded, the audio encoder modifies the residual coding flag of the current frame for the second time to modify the residual coding flag of the current frame to a value indicating that the residual signal needs to be encoded, and sets the modification flag of the residual coding flag of the previous frame to a value indicating that the residual coding flag of the previous frame has been modified for the second time.

If the value of the residual coding flag of the current frame is equal to the value of the residual coding flag of the previous frame, or a modification flag of the residual coding flag of the previous frame indicates that the residual coding flag of the previous frame is modified for the second time, the residual coding switching flag of the current frame indicates that the current frame is not a switching frame, and the modification flag of the residual coding flag of the previous frame is set to a value indicating that the residual coding flag of the previous frame is not modified for the second time.

In another implementation, the audio encoder may alternatively determine the value of the residual coding switching flag of the current frame, and update a value of a residual coding switching flag of the previous frame.

The audio encoder initially sets the value of the residual coding switching flag of the current frame to a value indicating that the current frame is not a switching frame. If the value of the residual coding flag of the current frame is not equal to the value of the residual coding flag of the previous frame, and the value of the residual coding switching flag of the previous frame indicates that the previous frame is not a switching frame, the audio encoder modifies the value of the residual coding switching flag of the current frame to a value indicating that the current frame is a switching frame. If the value of the residual coding flag of the current frame is not equal to the value of the residual coding flag of the previous frame, the value of the residual coding switching flag of the previous frame indicates that the previous frame is not a switching frame, and the residual coding flag of the current frame indicates that the residual signal does not need to be encoded, the audio encoder modifies the residual coding flag of the current frame for the second time to modify the residual coding flag of the current frame to a value indicating that the residual signal needs to be encoded. After modifying the value of the residual coding switching flag of the current frame, the audio encoder updates the value of the residual coding switching flag of the previous frame based on the modified value of the residual coding switching flag of the current frame.

For example, if the value of the residual coding switching flag of the current frame is greater than 0, the residual coding switching flag of the current frame is used to indicate that the current frame is a switching frame. If the value of the residual coding switching flag of the current frame is equal to 0, the residual coding switching flag of the current frame is used to indicate that the current frame is not a switching frame.

S610. The audio encoder determines whether the value of the residual coding switching flag of the current frame indicates that the current frame is a switching frame.

If the value of the residual coding switching flag of the current frame indicates that the current frame is a switching frame, a downmixed signal and a residual signal in the switching frame are calculated, the downmixed signal in the switching frame is used as a downmixed signal in a corresponding subband of a preset frequency band, and the residual signal in the switching frame is used as a residual signal in the corresponding subband of the preset frequency band, that is, S611 is performed.

If the value of the residual coding switching flag of the current frame indicates that the current frame is not a switching frame, and the value of the residual coding flag of the current frame is used to indicate that the residual signal in the current frame does not need to be encoded, a first downmixed signal in the current frame is calculated, and the first downmixed signal in the current frame is used as a downmixed signal in a corresponding subband of a preset frequency band, that is, S612 is performed.

In this embodiment of this application, a minimum subband index value of the preset frequency band is represented by res_cod_band_min (or may be represented by Th1), and a maximum subband index value of the preset frequency band is represented by res_cod_band_max (or may be represented by Th2). Correspondingly, a subband index b of the preset frequency band may satisfy res_cod_band_min<b<res_cod_band_max, or may satisfy res_cod_band_min≤b≤res_cod_band_max, or may satisfy res_cod_band_min≤b<res_cod_band_max, or may satisfy res_cod_band_min<b≤res_cod_band_max.

Herein, a range of the preset frequency band is the same as a subband range that satisfies the first preset condition and that is set when the audio encoder determines whether each subband index satisfies the first preset condition, or may be different from a subband range that satisfies the first preset condition and that is set when the audio encoder determines whether each subband index satisfies the first preset condition. For example, if the subband range that satisfies the first preset condition and that is set when the audio encoder determines whether each subband index satisfies the first preset condition is b<5, the preset frequency band may include all subbands whose subband indexes are less than 5, may include all subbands whose subband indexes are greater than 0 and less than 5, or may include all subbands whose subband indexes are greater than 1 and less than 7.

S611. The audio encoder calculates the downmixed signal and the residual signal in the switching frame, and uses the downmixed signal and the residual signal as the downmixed signal and the residual signal in the corresponding subband of the preset frequency band, respectively.

For example, the preset frequency band is a subband whose subband index is greater than or equal to 0 and less than 5. If the value of the residual coding switching flag of the current frame is greater than 0, the audio encoder calculates the downmixed signal and the residual signal in the switching frame in a range of subbands whose indexes are greater than or equal to 0 and less than 5, and uses the calculated downmixed signal and residual signal as the downmixed signal and the residual signal in the corresponding subband of the preset frequency band, respectively.

In an example, the audio encoder calculates, according to the following formula (22), a downmixed signal $\overline{DMX}_{ib}(k)$ in the subband b in the subframe i of the current frame when the current frame is a switching frame:

$$\overline{DMX}_{ib}(k)=DMX_{ib}(k)+0.5*DMX\_comp_{ib}(k) \quad (22)$$

In the foregoing formula (22), $DMX\_comp_{ib}(k)$ represents a compensated downmixed signal in the subband b in the subframe i of the current frame, and $DMX_{ib}(k)$ represents a second downmixed signal in the subband b in the subframe i of the current frame, and $\overline{DMX}_{ib}(k)$ represents the downmixed signal in the subband b in the subframe i of the current frame when the current frame is a switching frame, where k∈[band_limits(b), band_limits(b+1)−1].

In an example, the audio encoder calculates, according to the following formula (23), a residual signal $\overline{RES}_{ib}(k)$ in the subband b in the subframe i of the current frame when the current frame is a switching frame:

$$\overline{RES}_{ib}(k)=0.5*RES_{ib}'(k) \quad (23)$$

In the foregoing formula (23), $RES_{ib}'(k)$ represents a residual signal in the subband b in the subframe i of the current frame, and $\overline{RES}_{ib}(k)$ represents the residual signal in the subband b in the subframe i of the current frame when the current frame is a switching frame.

S612. If the value of the residual coding switching flag of the current frame indicates that the current frame is not a switching frame, and the value of the residual coding flag of the current frame indicates that the residual signal in the current frame does not need to be encoded, the audio encoder calculates the first downmixed signal in the current frame, and uses the first downmixed signal as the downmixed signal in the corresponding subband of the preset frequency band.

S612 is the same as S402, and details are not described herein again.

After S611 or S612 is performed, the audio encoder continues to perform S613.

S613. The audio encoder transforms the downmixed signal in the current frame into a time-domain signal, and encodes the time-domain signal according to a preset encoding method.

If the value of the residual coding flag of the current frame indicates that the residual signal in the current frame does not need to be encoded, a downmixed signal in the current frame in the corresponding subband of the preset frequency band is the first downmixed signal in the current frame, and a downmixed signal in the current frame in a subband other than the corresponding subband of the preset frequency band is a second downmixed signal in the current frame in the subband other than the corresponding subband.

If the value of the residual coding flag of the current frame indicates that the residual signal in the current frame needs to be encoded, the downmixed signal in the current frame is the second downmixed signal in the current frame.

The audio encoder transforms the downmixed signal in the current frame into a time-domain signal, and encodes the time-domain signal according to the preset encoding method.

In this embodiment of this application, because the audio encoder performs framing processing for each frame and performs subband division processing for each subframe, the audio encoder needs to combine downmixed signals in all subbands in the subframe i of the current frame to constitute a downmixed signal in the subframe i, and transforms the downmixed signal in the subframe i into a time-domain signal through inverse DFT transform, and performs overlap-add processing between subframes to obtain a time-domain downmixed signal in the current frame.

The audio encoder may encode the time-domain downmixed signal in the current frame according to the prior art, to obtain an encoded bitstream of the downmixed signal, and further write the encoded bitstream of the downmixed signal into the stereo encoded bitstream.

S614. If the value of the residual coding flag of the current frame indicates that the residual signal in the current frame needs to be encoded, the audio encoder transforms the residual signal in the current frame into a time-domain signal, and encodes the time-domain signal according to a preset encoding method.

In this embodiment of this application, because the audio encoder performs framing processing for each frame and performs subband division processing for each subframe, the audio encoder needs to combine residual signals in all subbands in the subframe i of the current frame to constitute a residual signal in the subframe i, and transforms the residual signal in the subframe i into a time-domain signal through inverse DFT transform, and performs overlap-add processing between subframes to obtain a time-domain residual signal in the current frame.

The audio encoder may encode the time-domain residual signal in the current frame according to the prior art, to obtain an encoded bitstream of the residual signal, and further write the encoded bitstream of the residual signal into the stereo encoded bitstream.

In conclusion, in the audio signal encoding method in this application, when the current frame is not a switching frame and the residual signal in the current frame does not need to be encoded, when the current frame is not a switching frame and the residual signal in the current frame needs to be encoded, and when the current frame is a switching frame, the audio encoder calculates the downmixed signal in the current frame by using different methods. In different coding modes, the audio encoder calculates the first downmixed signal in the current frame and the second downmixed signal in the current frame by using different methods. This resolves a problem that there is a discontinuous spatial sense and poor sound image stability of a decoded stereo signal due to switching back and forth in the preset frequency band between encoding a residual signal and skipping encoding the residual signal, thereby effectively improving aural quality.

In addition, with reference to the foregoing description, it can be learned that when the previous frame is not a switching frame and a residual signal in the previous frame does not need to be encoded, a computer in this embodiment of this application may calculate the first downmixed signal in the current frame according to the procedure including S401', S402*a*, S402*b*, and S402*c* (that is, the procedure shown in FIG. 5B). The audio signal encoding method in this application is described herein in this case.

Figure 7A:
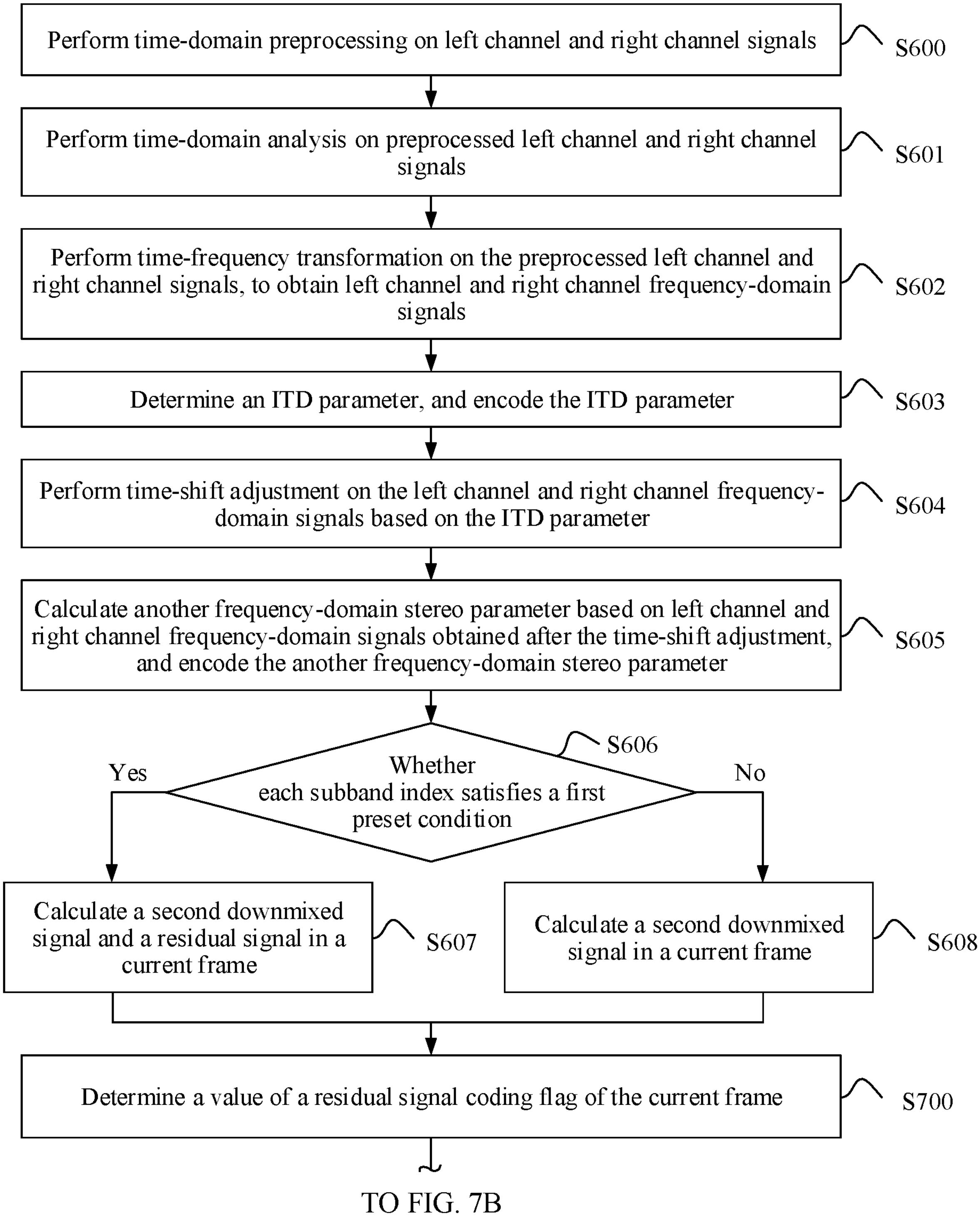
FIG. 7A and FIG. 7B are a schematic flowchart 2 of an audio signal encoding method according to an embodiment of this application.
Figure 7B:
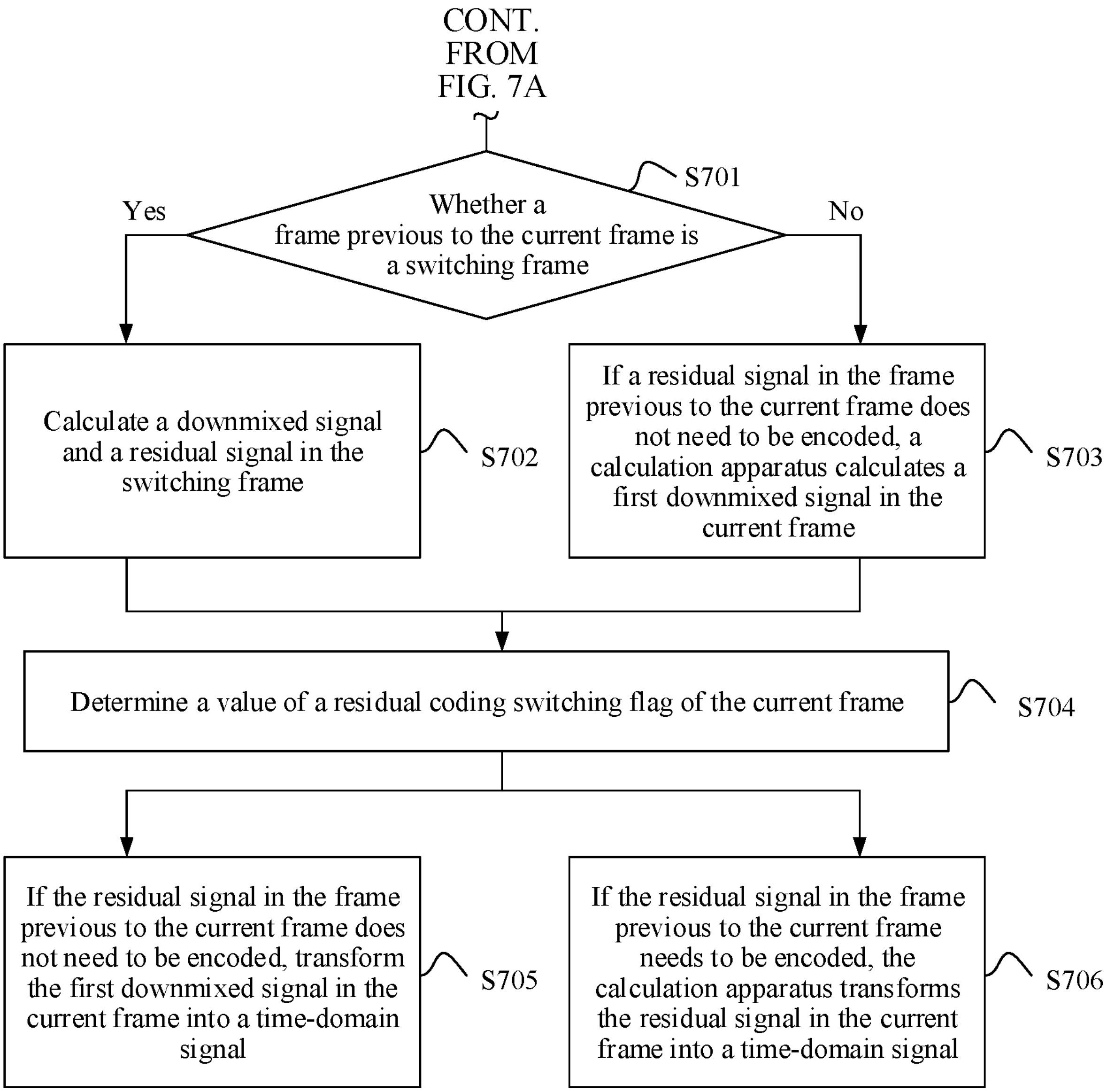

With reference to FIG. 6A and FIG. 6B, as shown in FIG. 7A and FIG. 7B, an audio signal encoding method in this application may include the following steps:

S600 to S608, and S700 is performed after S608.

S700. The audio encoder determines a value of a residual coding flag of the current frame.

For S700, refer to the description of S609, and details are not described herein again.

S701. The audio encoder determines whether a value of a residual coding switching flag of a previous frame indicates that the previous frame is a switching frame.

S701 is similar to S610. A difference between S701 and S610 lies in that: In S610, the audio encoder performs determining for the current frame, while in S701, the audio encoder performs determining for the previous frame.

S702. If the value of the residual coding switching flag of the previous frame indicates that the previous frame is a switching frame, the audio encoder calculates a downmixed signal and a residual signal of the switching frame, and uses the downmixed signal and the residual signal as a downmixed signal and a residual signal in a corresponding subband of a preset frequency band, respectively.

For S702, refer to the description of S611, and details are not described herein again.

S703. If the value of the residual coding switching flag of the previous frame indicates that the previous frame is not a switching frame, and a value of a residual coding flag of the previous frame indicates that a residual signal in the previous frame does not need to be encoded, the audio encoder calculates a first downmixed signal in the current frame, and uses the first downmixed signal as a downmixed signal in a corresponding subband of a preset frequency band.

For S703, refer to the description of S612, and details are not described herein again.

S704. The audio encoder determines a value of a residual coding switching flag of the current frame.

For S704, refer to the description of S609, and details are not described herein again.

S705. The audio encoder transforms the downmixed signal in the current frame into a time-domain signal, and encodes the time-domain signal according to a preset encoding method.

For S705, refer to the description of S613, and details are not described herein again.

S706. If the value of the residual coding flag of the previous frame indicates that the residual signal in the previous frame needs to be encoded, the audio encoder transforms the residual signal in the current frame into a time-domain signal, and encodes the time-domain signal according to a preset encoding method.

For S706, refer to the description of S614, and details are not described herein again.

Figure 8A:
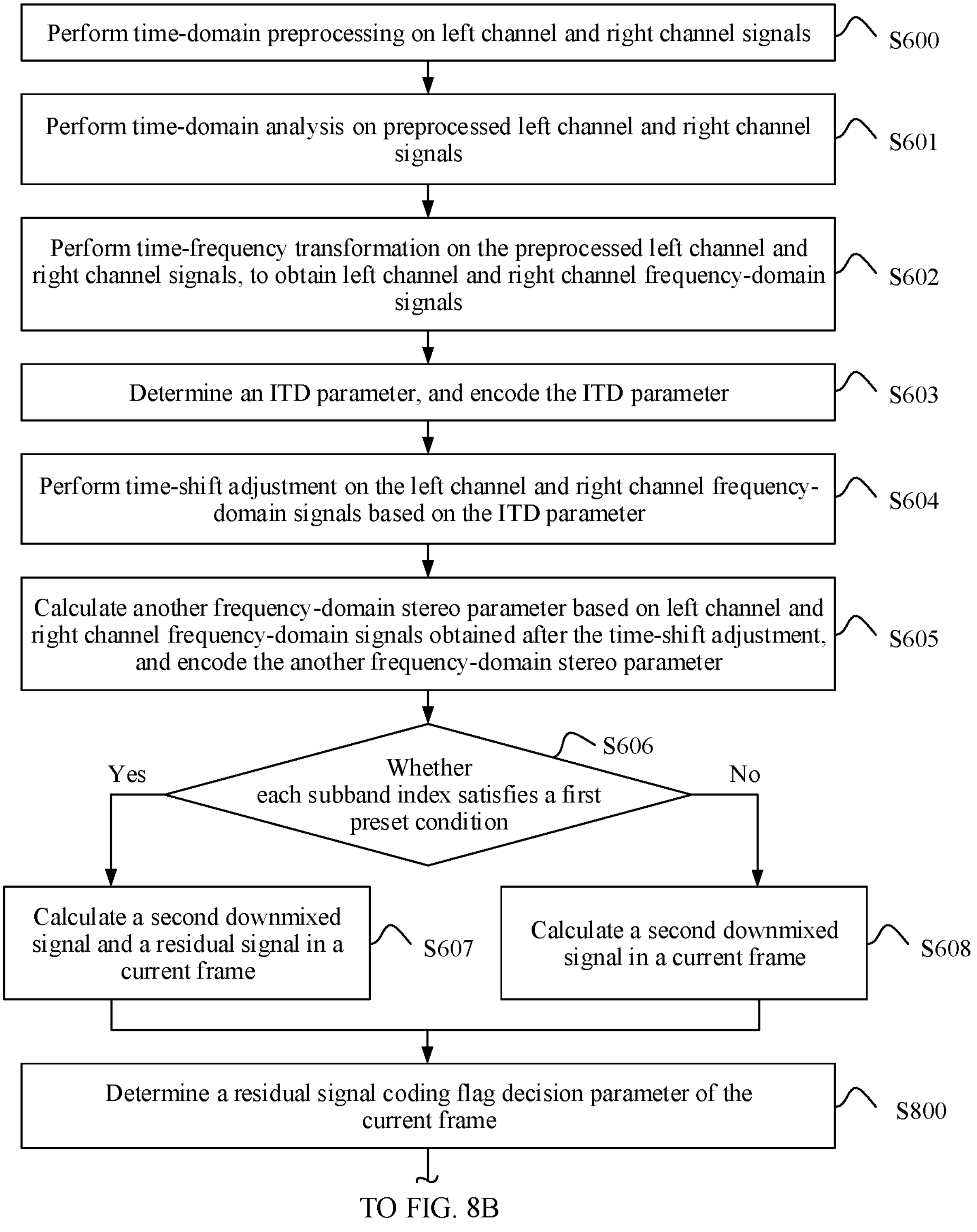
FIG. 8A and FIG. 8B are a schematic flowchart 3 of an audio signal encoding method according to an embodiment of this application.
Figure 8B:
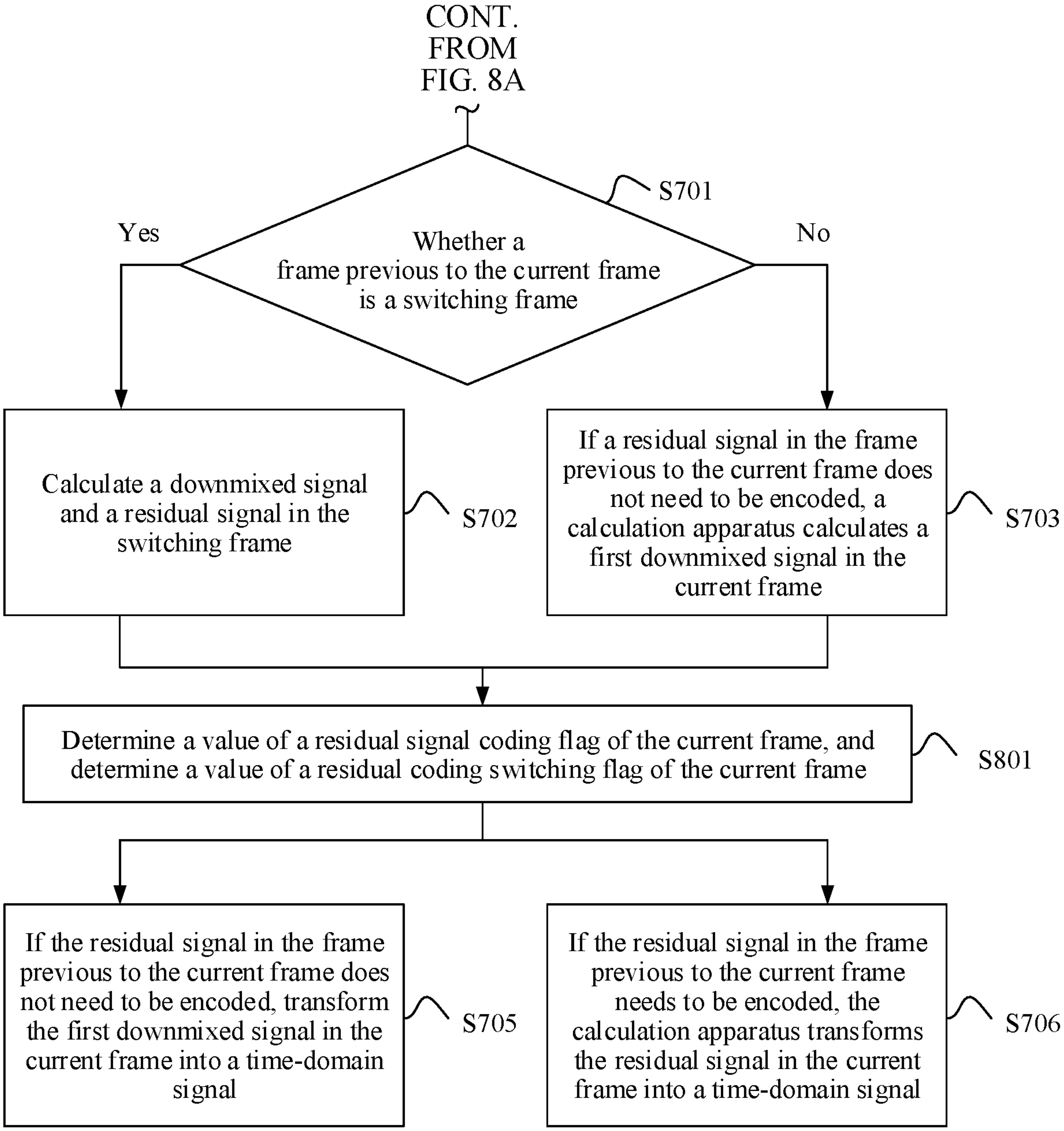

In another example, with reference to FIG. 7A and FIG. 7B, as shown in FIG. 8A and FIG. 8B, S700 in FIG. 7A may be replaced with S800, and S704 in FIG. 7B may be replaced with S801.

S800. The audio encoder determines a residual coding flag decision parameter of the current frame.

S801. The audio encoder determines a value of a residual coding flag of the current frame based on the residual coding flag decision parameter of the current frame, and determines a value of a residual coding switching flag of the current frame.

Figure 9A:
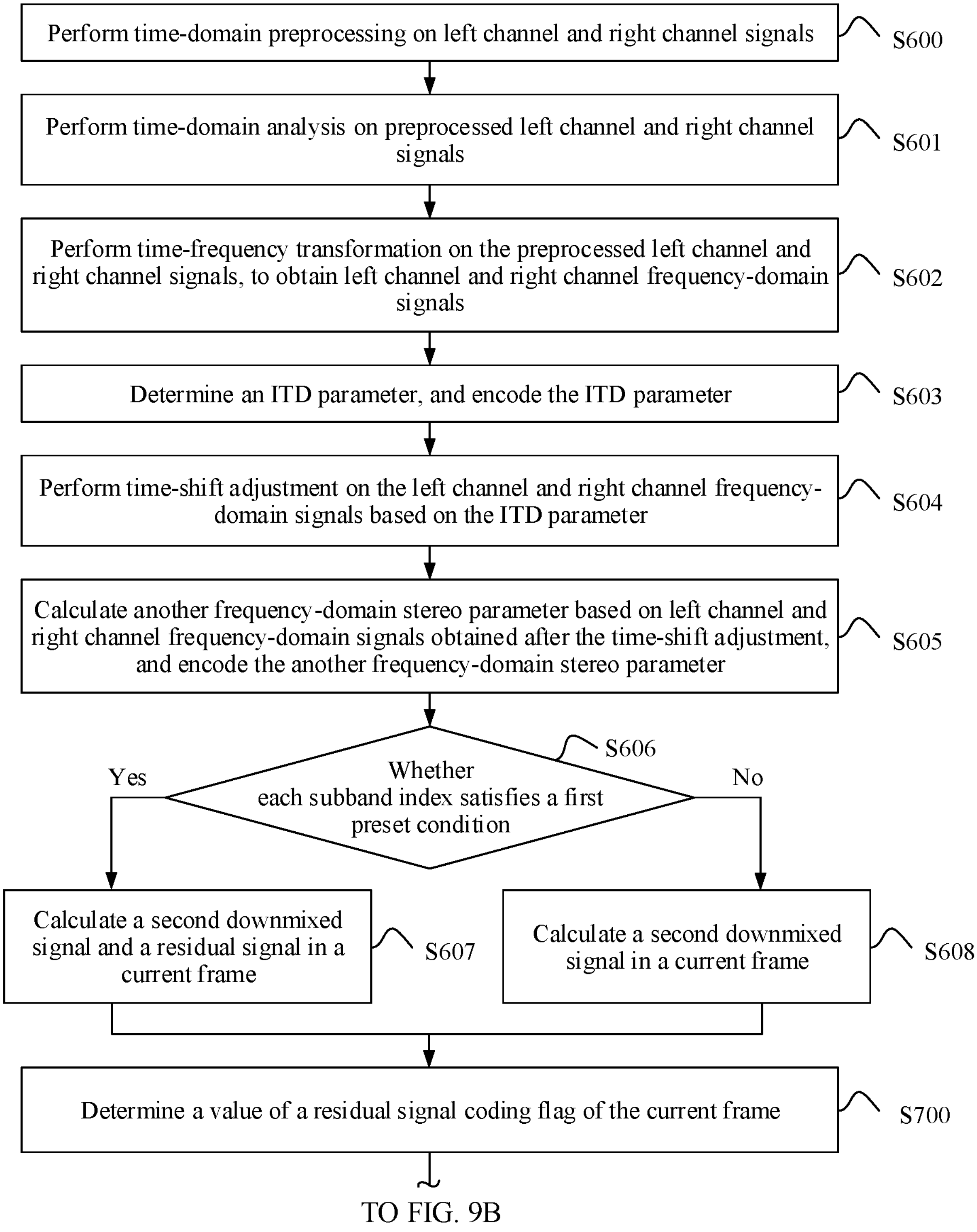
FIG. 9A and FIG. 9B are a schematic flowchart 4 of an audio signal encoding method according to an embodiment of this application.
Figure 9B:
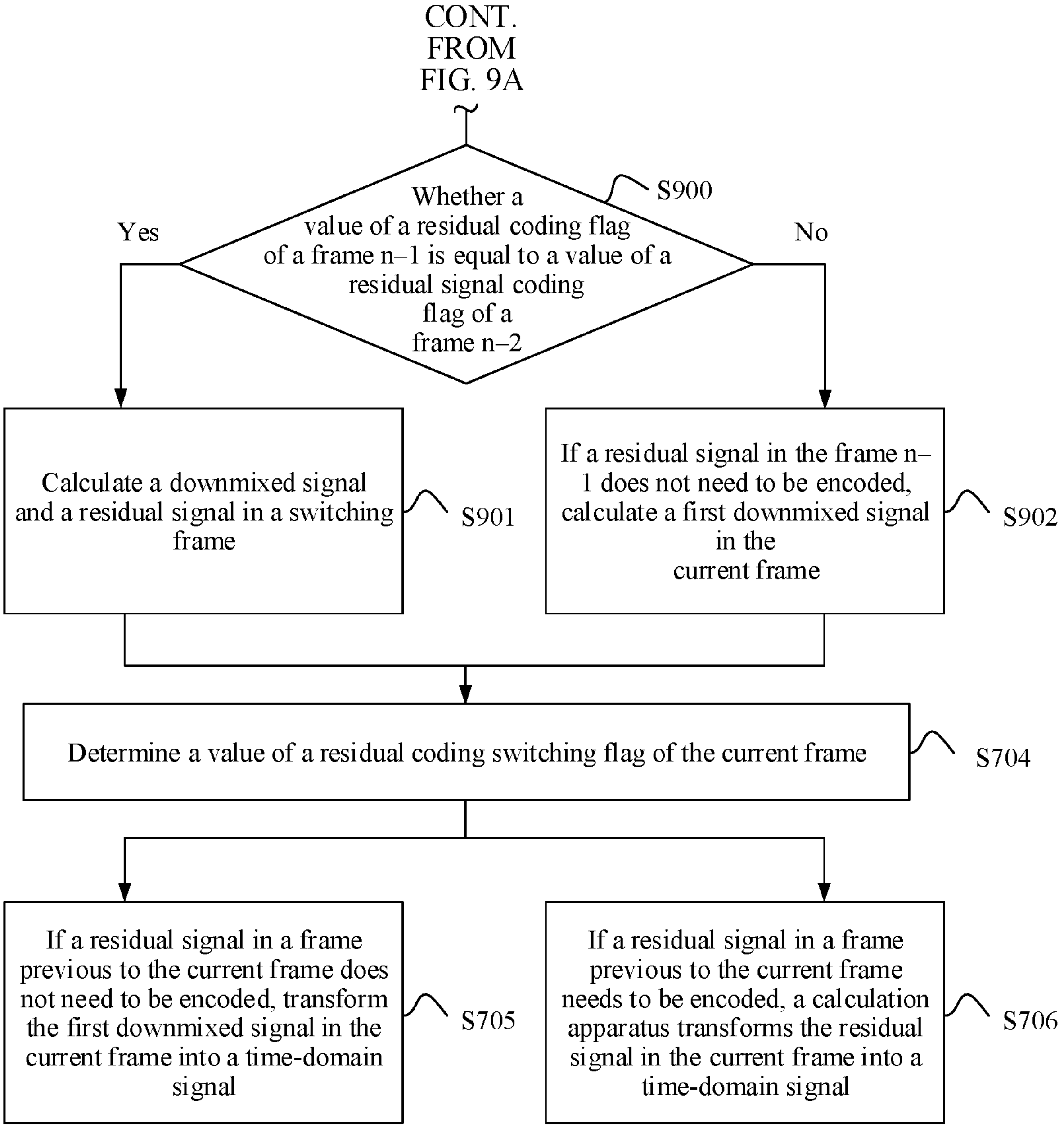

In another example, with reference to FIG. 7A and FIG. 7B, as shown in FIG. 9A and FIG. 9B, S701 in FIG. 7B may be replaced with S900, S702 in FIG. 7B may be replaced with S901, and S703 in FIG. 7B may be replaced with S902.

S900. The audio encoder determines whether a value of a residual coding flag of a previous frame of the current frame (for example, a frame n) is not equal to a value of a residual coding flag of a frame n−2.

S901. If a value of a residual coding flag of a frame n−1 is not equal to the value of the residual coding flag value of the frame n−2, the audio encoder calculates a downmixed signal and a residual signal in the switching frame, and uses the downmixed signal and the residual signal as a downmixed signal and a residual signal in a corresponding subband of a preset frequency band, respectively.

S902. If a value of a residual coding flag of a frame n−1 is equal to the value of the residual coding flag of the frame n−2, and a residual signal in the frame n−1 does not need to be encoded, the audio encoder calculates a first downmixed signal in the current frame, and uses the first downmixed signal as a downmixed signal in a corresponding subband of a preset frequency band.

Figure 10A:
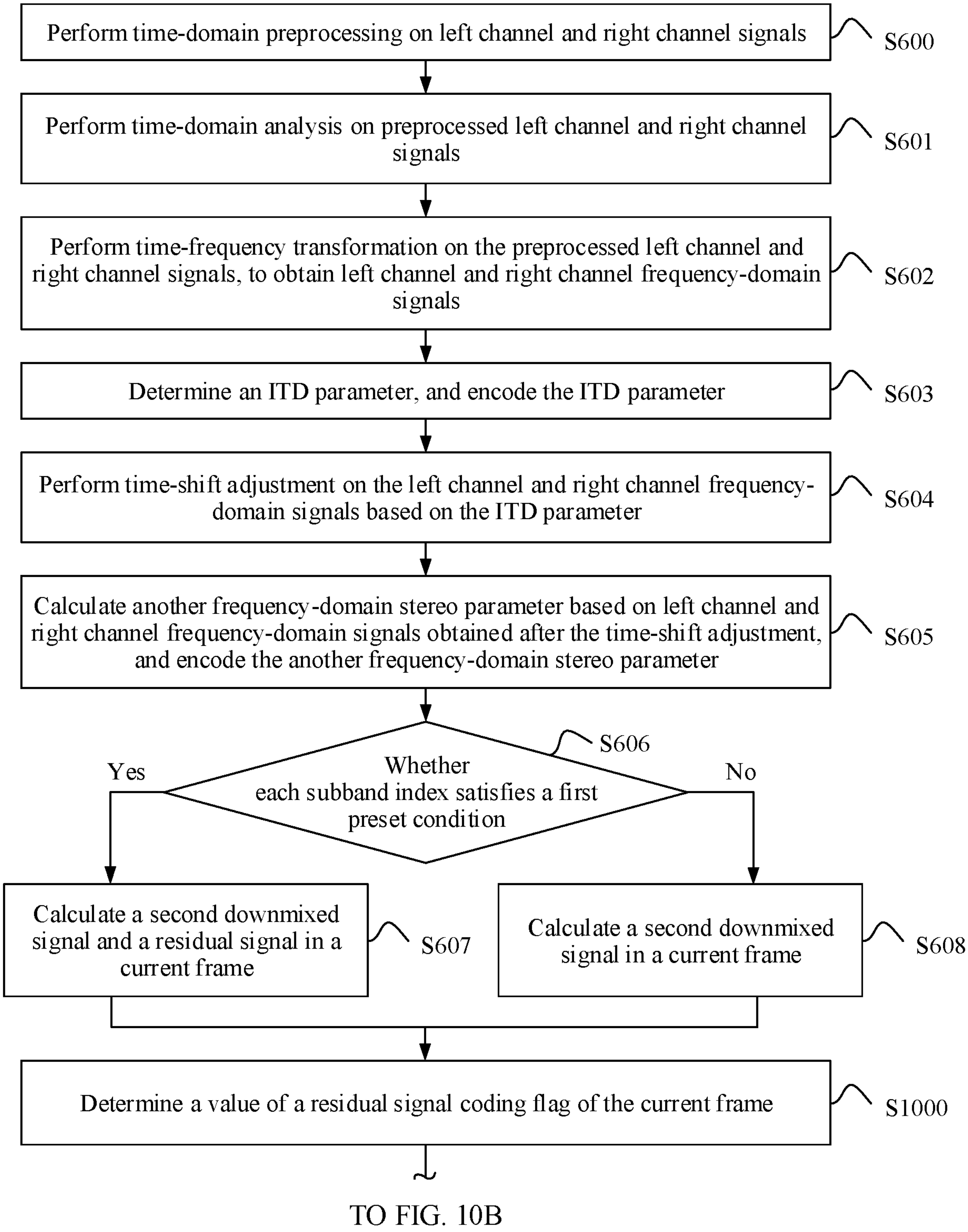
FIG. 10A and FIG. 10B are a schematic flowchart 5 of an audio signal encoding method according to an embodiment of this application.
Figure 10B:
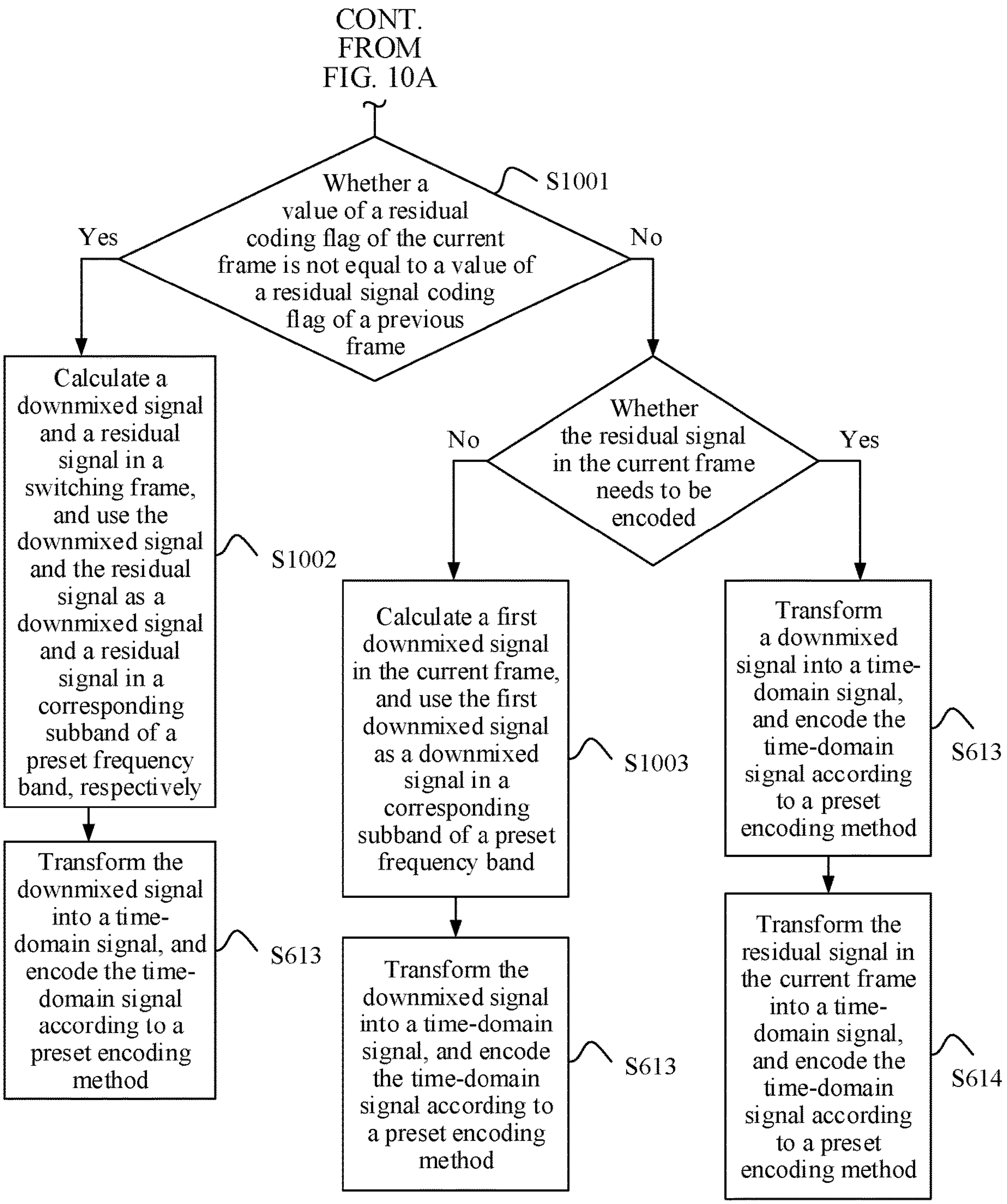

In another example, with reference to FIG. 6A and FIG. 6B, as shown in FIG. 10A and FIG. 10B, S609 in FIG. 6A may be replaced with S1000, S610 in FIG. 6B may be replaced with S1001, S611 in FIG. 6B may be replaced with S1002, and S612 in FIG. 6B may be replaced with S1003.

S1000. The audio encoder determines a value of a residual coding flag of the current frame.

S1001. The audio encoder determines whether the value of the residual coding flag of the current frame is not equal to a value of a residual coding flag of a previous frame.

S1002. If the value of the residual coding flag of the current frame is not equal to the value of the residual coding flag of the previous frame, the audio encoder calculates a downmixed signal and a residual signal in the switching frame, and uses the downmixed signal and the residual signal as a downmixed signal and a residual signal in a corresponding subband of a preset frequency band, respectively.

S1003. If the value of the residual coding flag of the current frame is equal to the value of the residual coding flag of the previous frame, and a residual signal in the current frame does not need to be encoded, the audio encoder calculates a first downmixed signal in the current frame, and uses the first downmixed signal as a downmixed signal in a corresponding subband of a preset frequency band.

In conclusion, in this embodiment of this application, the audio encoder can adaptively choose whether to encode a residual signal in the corresponding subband of the preset frequency band, to reduce high frequency distortion of a decoded stereo signal as much as possible while improving a spatial sense and sound image stability of the decoded stereo signal, thereby improving overall encoding quality. In addition, in different cases: when a residual signal needs to be encoded and when a residual signal does not need to be encoded, the audio encoder calculates a downmixed signal by using different methods, to resolve a problem that the spatial sense and sound image stability of the decoded stereo signal are discontinuous, thereby effectively improving aural quality.

An embodiment of this application provides a downmixed signal calculation apparatus. The downmixed signal calculation apparatus may be an audio encoder. Specifically, the downmixed signal calculation apparatus is configured to perform the steps performed by the audio encoder in the foregoing downmixed signal calculation methods. The downmixed signal calculation apparatus provided in this embodiment of this application may include modules corresponding to the corresponding steps.

In this embodiment of this application, the downmixed signal calculation apparatus may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. In this embodiment of this application, division into modules is exemplary, and is merely logical function division. In actual implementation, another division manner may be used.

Figure 11:
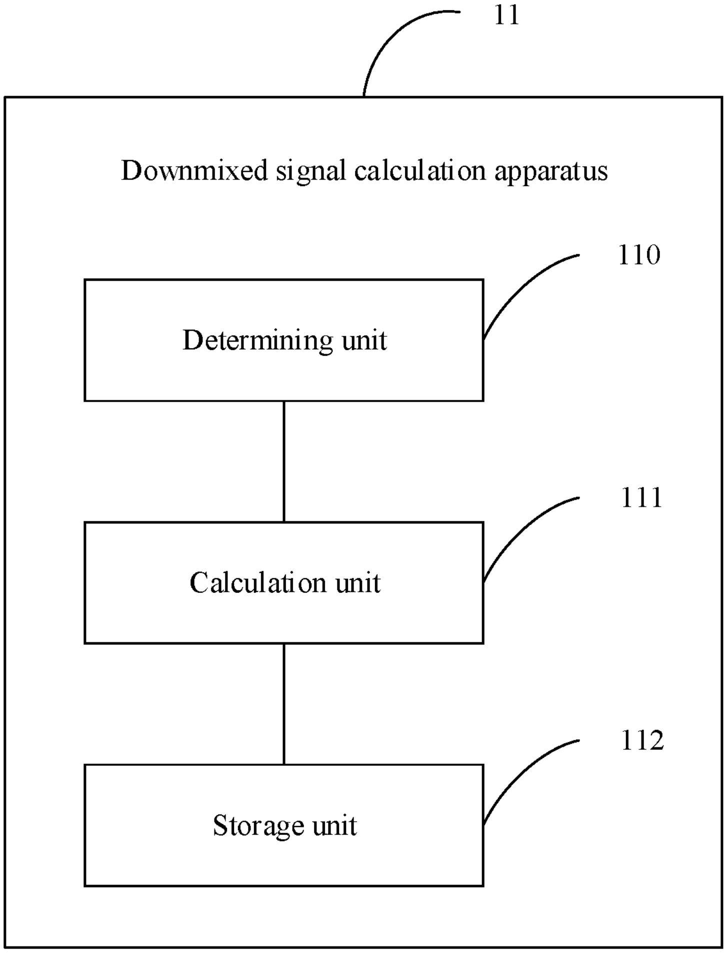
FIG. 11 is a schematic structural diagram 1 of a downmixed signal calculation apparatus according to an embodiment of this application.

When each functional module is obtained through division based on each corresponding function, FIG. 11 is a possible schematic structural diagram of the downmixed signal calculation apparatus in the foregoing embodiment. As shown in FIG. 11, a downmixed signal calculation apparatus 11 includes a determining unit 110 and a calculation unit 111.

The determining unit 110 is configured to support the downmixed signal calculation apparatus in performing S401, S401', and the like in the foregoing embodiment, and/or is used in another process of the technology described in this specification.

The calculation unit 111 is configured to support the downmixed signal calculation apparatus in performing S402, S501, and the like in the foregoing embodiments, and/or is used in another process of the technology described in this specification.

All related content of the steps in the foregoing method embodiments may be cited in function descriptions of corresponding functional modules. Details are not described herein again.

Certainly, the downmixed signal calculation apparatus provided in this embodiment of this application includes but is not limited to the foregoing modules. For example, as shown in FIG. 11, the downmixed signal calculation apparatus 11 may further include a storage unit 112. The storage unit 112 may be configured to store program code and data of the downmixed signal calculation apparatus.

Figure 12:
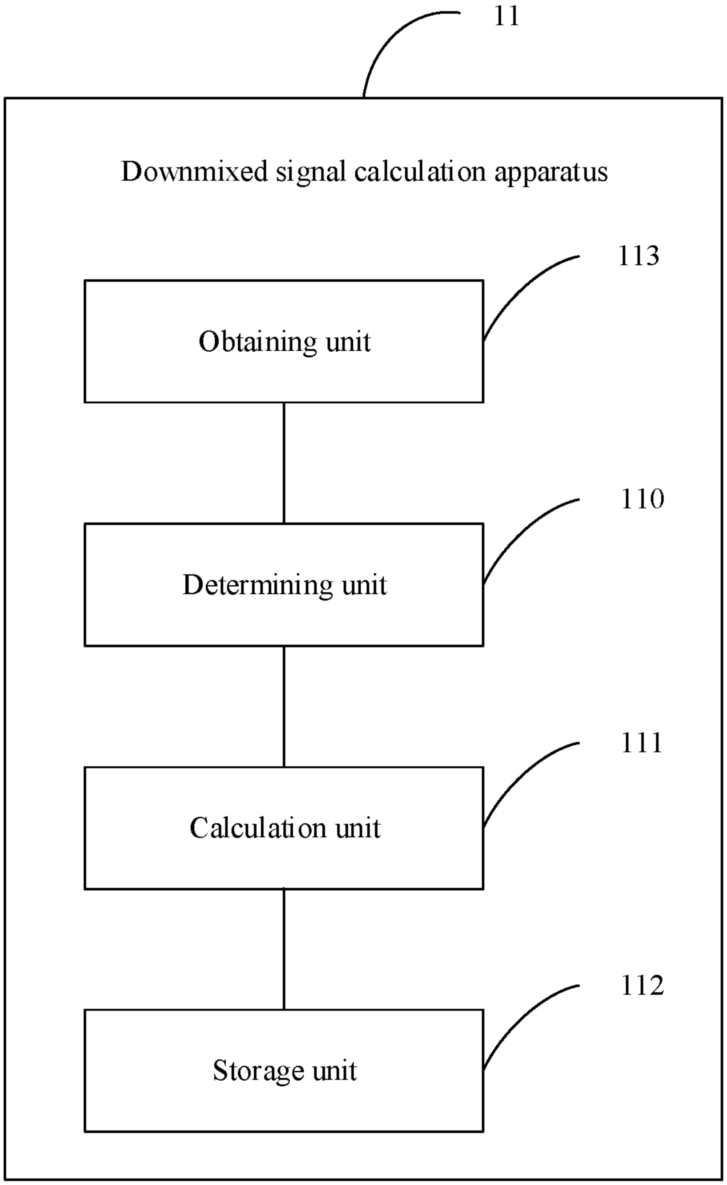
FIG. 12 is a schematic structural diagram 2 of a downmixed signal calculation apparatus according to an embodiment of this application.

Further, with reference to FIG. 11, as shown in FIG. 12, the downmixed signal calculation apparatus 11 may further include an obtaining unit 113. The obtaining unit 113 is configured to support the downmixed signal calculation apparatus in performing S500 and the like in the foregoing embodiment, and/or is used in another process of the technology described in this specification.

Figure 13:
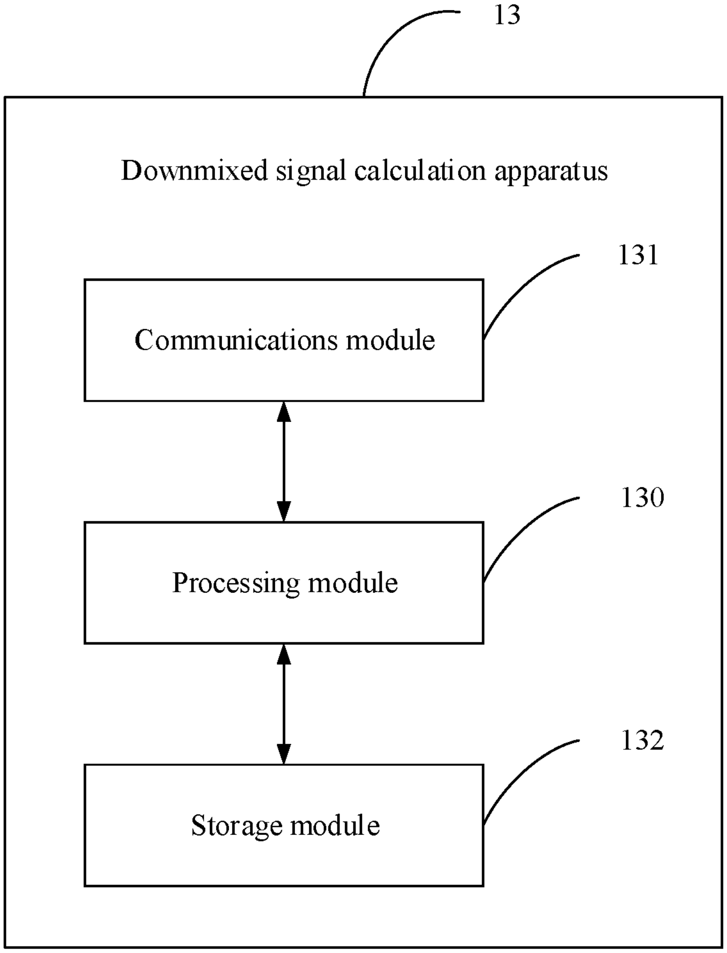
FIG. 13 is a schematic structural diagram 3 of a downmixed signal calculation apparatus according to an embodiment of this application.

When an integrated unit is used, FIG. 13 is a schematic structural diagram of the downmixed signal calculation apparatus in the embodiments of this application. In FIG. 13, a downmixed signal calculation apparatus 13 includes a processing module 130 and a communications module 131.

The processing module 130 is configured to control and manage an action of the downmixed signal calculation apparatus, for example, perform the steps performed by the determining unit 110, the calculation unit 111, and the obtaining unit 113, and/or perform another process of the technology described in this specification.

The communications module 131 is configured to support interaction between the downmixed signal calculation apparatus and another device.

As shown in FIG. 13, the downmixed signal calculation apparatus may further include a storage module 132. The storage module 132 is configured to store program code and data of the downmixed signal calculation apparatus, for example, store content stored in the foregoing storage unit 112.

The processing module 130 may be a processor or a controller, for example, may be a central processing unit (CPU), a general-purpose processor, a digital signal processor (DSP), an ASIC, an FPGA or another programmable logic device, a transistor logic device, a hardware component, or any combination thereof. The processor may implement or execute various example logical blocks, modules, and circuits described with reference to content disclosed in this application. The processor may alternatively be a combination of processors implementing a computing function, for example, a combination of one or more microprocessors, or a combination of a DSP and a microprocessor. The communications module 131 may be a transceiver, an RF circuit, a communications interface, or the like. The storage module 132 may be a memory.

All related content of the scenarios in the foregoing method embodiments may be cited in function descriptions of corresponding functional modules. Details are not described herein again.

Both the downmixed signal calculation apparatus 11 and a downmixed signal calculation apparatus 12 may perform the downmixed signal calculation method shown in FIG. 4, FIG. 5A, FIG. 5B, or FIG. 5C, and the downmixed signal calculation apparatus 11 and the downmixed signal calculation apparatus 12 each may be specifically an audio encoding apparatus or another device having an audio encoding function.

This application further provides a terminal. The terminal includes one or more processors, a memory, and a communications interface. The memory and the communications interface are coupled to one or more processors. The memory is configured to store computer program code. The computer program code includes an instruction. When the one or more processors execute the instruction, the terminal performs the downmixed signal calculation method in the embodiments of this application.

The terminal herein may be a smartphone, a portable computer, or another device that can process or play audio.

This application further provides an audio encoder, including a non-volatile storage medium and a central processing unit. The non-volatile storage medium stores an executable program. The central processing unit is connected to the non-volatile storage medium and executes the executable program to perform the downmixed signal calculation method in the embodiments of this application. In addition, the audio encoder may further perform the audio signal encoding method in the embodiments of this application.

This application further provides an encoder. The encoder includes the downmixed signal calculation apparatus (the downmixed signal calculation apparatus 11 or the downmixed signal calculation apparatus 12) in the embodiments of this application and an encoding module. The encoding module is configured to encode a first downmixed signal of a current frame, where the first downmixed signal of the current frame is obtained by the downmixed signal calculation apparatus.

Another embodiment of this application further provides a computer-readable storage medium. The computer-readable storage medium includes one or more pieces of program code. The one or more programs include an instruction, and when a processor in a terminal executes the program code, the terminal performs the downmixed signal calculation method shown in FIG. 4, FIG. 5A, FIG. 5B, or FIG. 5C.

In another embodiment of this application, a computer program product is further provided. The computer program product includes a computer-executable instruction, and the computer-executable instruction is stored in a computer-readable storage medium. At least one processor of a terminal may read the computer-executable instruction from the computer-readable storage medium, and the at least one processor executes the computer-executable instruction, so that the terminal performs the steps performed by the audio encoder in the downmixed signal calculation method shown in FIG. 4, FIG. 5A, FIG. 5B, or FIG. 5C.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated.

The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Drive (SSD)), or the like.

The foregoing descriptions about implementations allow a person skilled in the art to understand that, for the purpose of convenient and brief description, division into the foregoing functional modules is used as an example for illustration. In actual application, the foregoing functions can be allocated to different modules and implemented based on a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely exemplary. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in the embodiments of this application essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A downmixed signal calculation method, comprising:

determining that a first condition or a second condition is true, wherein determining that the first condition is true comprises determining that a previous frame of a current frame of a stereo audio signal is not a switching frame based on a switching flag of the previous frame and determining that a residual signal in the previous frame does not need to be encoded based on a coding flag of the previous frame, and determining that the second condition is true comprises determining that the current frame is not a switching frame based on a switching flag of the current frame and a residual signal in the current frame does not need to be encoded based on a coding flag of the current frame;

in response to the determining that the first condition or the second condition is true, calculating a first downmixed signal in the current frame, wherein the calculating comprises:

obtaining a second downmixed signal in the current frame;

obtaining a downmix compensation factor of the current frame, wherein the obtaining the downmix compensation factor of the current frame comprises:

calculating a downmix compensation factor in a subframe of the current frame based on a first flag, wherein the first flag indicates whether a stereo parameter other than an inter-channel time difference parameter needs to be encoded in the current frame, the current frame comprises P subframes, and the downmix compensation factor of the current frame comprises the downmix compensation factor of the subframe i of the current frame, wherein both P and i are integers, $P \geq 2$, and $i \in [0, P-1]$; wherein a second frequency-domain signal in the subframe i of the current frame is a left channel frequency-domain signal in the subframe i of the current frame, and the calculating the downmix compensation factor of the subframe i of the current frame comprises:

calculating the downmix compensation factor of the subframe i of the current frame based on the left channel frequency-domain signal in the subframe i of the current frame and a right channel frequency-domain signal in the subframe i of the current frame, wherein a downmix compensation factor $\alpha_i(b)$ in a subband b in the subframe i of the current frame is calculated according to the following formula:

$$\alpha_i(b)=\sqrt{E\_L_i(b)}+\sqrt{E\_R_i(b)}-\sqrt{E\_LR_i(b)}/2\sqrt{E\_L_i(b)}$$

$$E\_L_i(b)=\sum_{k=band\_limits(b)}^{k=band\_limits(b+1)-1} L_{ib}''(k)^2,$$

$$E\_R_i(b)=\sum_{k=band\_limits(b)}^{k=band\_limits(b+1)-1} R_{ib}''(k)^2,$$

and $$E\_LR_i(b)=\sum_{k=band\_limits(b)}^{k=band\_limits(b+1)-1} [L_{ib}''(k)^2+R_{ib}''(k)]^2;$$ or $$E\_L_i(b)=\sum_{k=band\_limits(b)}^{k=band\_limits(b+1)-1} L_{ib}'(k)^2,$$

$$E\_R_i(b)=\sum_{k=band\_limits(b)}^{k=band\_limits(b+1)-1} R_{ib}'(k)^2,$$ and $$E\_LR_i(b)=\sum_{k=band\_limits(b)}^{k=band\_limits(b+1)-1} [L_{ib}'(k)+R_{ib}'(k)]^2;$$ wherein $E\_L_i(b)$ represents an energy sum of a left channel frequency-domain signal in the subband b in the subframe i of the current frame; $E\_R_i(b)$ represents an energy sum of a right channel frequency-domain signal in the subband b in the subframe i of the current frame; $E\_LR_i(b)$ represents an energy sum of the energy of the left channel frequency-domain signal and the energy of the right channel frequency-domain signal in the subband b in the subframe of the current frame; band_limits(b) represents a minimum frequency bin index value of the subband b in the subframe i of the current frame; band_limits(b+1) represents a minimum frequency bin index value of a subband b+1 in the subframe i of the current frame; $L_{ib}''(k)$ represents a left channel frequency-domain signal that is in the subband b in the subframe i of the current frame and that is obtained after adjustment based on a stereo parameter; $R_{ib}''(k)$ represents a right channel frequency-domain signal that is in the subband b in the subframe i of the current frame and that is obtained after adjustment based on the stereo parameter; $L_{ib}'(k)$ represents a left channel frequency-domain signal that is in the subband b in the subframe i of the current frame and that is obtained after time-shift adjustment: $R_{ib}'(k)$ represents a right channel frequency-domain signal that is in the subband b in the subframe i of the current frame and that is obtained after time-shift adjustment and k represents a frequency bin index value, wherein each subframe of the current frame comprises M subbands, the downmix compensation factor of the subframe i of the current frame comprises the downmix compensation factor of the subband b in the subframe i of the current frame, b is an integer, $b \in [0, M-1]$, and $M \geq 2$; and the calculating a compensated downmixed signal in a subframe i of the current frame comprises:

calculating a compensated downmixed signal in the subband b in the subframe i of the current frame according to the following formula:

$$DMX\_comp_{ib}(k)=\alpha_i(b)*L_{ib}''(k),$$ wherein $DMX\_comp_{ib}(ik)$ represents the compensated downmixed signal in the subband b in the subframe i of the current frame, k represents a frequency bin index value, and $k \in [band\_limits(b), band\_limits(b+1)-1]$; and correcting the second downmixed signal in the current frame based on the downmix compensation factor of the current frame, to obtain the first downmixed signal in the current frame; and determining the first downmixed signal in the current frame as a downmixed signal in the preset frequency band of the current frame.

2. The downmixed signal calculation method according to claim 1, wherein the correcting the second downmixed signal in the current frame based on the downmix compensation factor of the current frame, to obtain the first downmixed signal in the current frame comprises:

calculating a compensated downmixed signal in the current frame based on a first frequency-domain signal in the current frame and the downmix compensation factor of the current frame, wherein the first frequency-domain signal is a left channel frequency-domain signal in the current frame or a right channel frequency-domain signal in the current frame; and calculating the first downmixed signal in the current frame based on the second downmixed signal in the current frame and the compensated downmixed signal in the current frame; or calculating a compensated downmixed signal in a subframe i of the current frame based on a second frequency-domain signal in the subframe i of the current frame and a downmix compensation factor of the subframe i of the current frame, wherein the second frequency-domain signal is a left channel frequency-domain signal in the subframe i of the current frame or a right channel frequency-domain signal in the subframe i of the current frame; and calculating a first downmixed signal in the subframe i of the current frame based on a second downmixed signal in the subframe i of the current frame and the compensated downmixed signal in the subframe i of the current frame, wherein the current frame comprises P subframes, and the first downmixed signal in the current frame comprises the first downmixed signal in the subframe i of the current frame, wherein both P and i are integers, P≥2, and i∈[0, P−1].

3. The downmixed signal calculation method according to claim 2, wherein the calculating the compensated downmixed signal in the current frame comprises: determining a product of the first frequency-domain signal in the current frame and the downmix compensation factor of the current frame as the compensated downmixed signal in the current frame; and the calculating the first downmixed signal in the current frame comprises: determining a sum of the second downmixed signal in the current frame and the compensated downmixed signal in the current frame as the first downmixed signal in the current frame; or the calculating the compensated downmixed signal in a subframe i of the current frame comprises: determining a product of the second frequency-domain signal in the subframe i of the current frame and the downmix compensation factor of the subframe i of the current frame as the compensated downmixed signal in the subframe i of the current frame; and the calculating the first downmixed signal in the subframe i of the current frame comprises: determining a sum of the second downmixed signal in the subframe i of the current frame and the compensated downmixed signal in the subframe i of the current frame as the first downmixed signal in the subframe i of the current frame.

4. The downmixed signal calculation method according to claim 1, wherein Th1≤b≤Th2, Th1<b≤Th2, Th1≤b<Th2, or Th1<b<Th2, wherein 0≤Th1≤Th2≤M−1, Th1 represents a minimum subband index value of the preset frequency band, and Th2 represents a maximum subband index value of the preset frequency band.

5. A downmixed signal calculation apparatus comprising:

a memory for storing computer-executable instructions; and at least one processor operatively coupled to the memory, the at least one processor being configured to execute the computer-executable instructions to:

determine that a first condition or a second condition is true, wherein determine that the first condition is true comprises determine that a previous frame of a current frame of a stereo audio signal is not a switching frame based on a switching flag of the previous frame and determining that a residual signal in the previous frame does not need to be encoded based on a coding flag of the previous frame, and determine that the second condition is true comprises determine that the current frame is not a switching frame based on a switching flag of the current frame and a residual signal in the current frame does not need to be encoded based on a coding flag of the current frame;

in response to the determining that one of the first condition or the second condition is true, calculate a first downmixed signal in the current frame, wherein the at least one processor is configured to execute the computer-executable instructions to:

obtain a second downmixed signal in the current frame;

obtain a downmix compensation factor of the current frame, wherein the obtaining the downmix compensation factor of the current frame comprises:

calculating a downmix compensation factor in a subframe i of the current frame based on a first flag, wherein the first flag indicates whether a stereo parameter other than an inter-channel time difference parameter needs to be encoded in the current frame, the current frame comprises P subframes, and the downmix compensation factor of the current frame comprises the downmix compensation factor of the subframe i of the current frame, wherein both P and i are integers, P≥2, and i∈[0, P−1]; wherein a second frequency-domain signal in the subframe i of the current frame is a left channel frequency-domain signal in the subframe i of the current frame, and the calculating the downmix compensation factor of the subframe i of the current frame comprises:

calculating the downmix compensation factor of the subframe i of the current frame based on the left channel frequency-domain signal in the subframe i of the current frame and a right channel frequency-domain signal in the subframe i of the current frame, wherein a downmix compensation factor $\alpha_i(b)$ in a subband b in the subframe i of the current frame is calculated according to the following formula:

$$\alpha_i(b)=\sqrt{E\_L_i(b)}+\sqrt{E\_R_i(b)}-\sqrt{E\_LR_i(b)}/2\ \sqrt{E\_L_i(b)}$$

$$E\_L_i(b)=\Sigma_{k=band\_limits(b)}^{k=band\_limits(b+1)-1}L_{ib}''(k)^2,$$

$$E\_R_i(b)=\Sigma_{k=band\_limits(b)}^{k=band\_limits(b+1)-1}R_{ib}''(k)^2,$$

and $$E\_LR_i(b)=\Sigma_{k=band\_limits(b)}^{k=band\_limits(b+1)-1}[L_{ib}''(k)^2+R_{ib}''(k)]^2;$$ or $$E\_L_i(b)=\Sigma_{k=band\_limits(b)}^{k=band\_limits(b+1)-1}L_{ib}'(k)^2,$$

$$E\_R_i(b)=\Sigma_{k=band\_limits(b)}^{k=band\_limits(b+1)-1}R_{ib}'(k)^2,$$ and $$E\_LR_i(b)=\Sigma_{k=band\_limits(b)}^{k=band\_limits(b+1)-1}[L_{ib}'(k)+R_{ib}'(k)]^2;$$ wherein $E\_Li_{(b)}$ represents an energy sum of a left channel frequency-domain signal in the subband b in the subframe i of the current frame; $E\_R_i(b)$ represents an enemy sum of a right channel frequency-domain sural in the subband b in the subframe i of the current frame; $E\_LR_i(b)$ represents an energy sum of the energy of the left channel frequency-domain signal and the energy of the right channel frequency-domain signal in the subband b in the subframe i of the current frame; band_limits(b) represents a minimum frequency bin index value of the subband b in the subframe i of the current frame; band_limits(b+1) represents a minimum frequency bin index value of a subband b+1 in the subframe i of the current frame;

$L_{ib}''(k)$ represents a left channel frequency-domain signal that is in the subband b in the subframe i of the current frame and that is obtained after adjustment based on a stereo parameter: $R_{ib}''(k)$ represents a right channel frequency-domain signal that is in the subband b in the subframe i of the current frame and that is obtained after adjustment based on the stereo parameter; $L_{ib}'(k)$ represents a left channel frequency-domain signal that is in the subband b in the subframe i of the current frame and that is obtained after time-shift adjustment; $R_{ib}'(k)$ represents a right channel frequency-domain signal that is in the subband b in the subframe i of the current frame and that is obtained after time-shift adjustment; and k represents a frequency bin index value, wherein each subframe of the current frame comprises M subbands, the downmix compensation factor of the subframe i of the current frame comprises the downmix compensation factor of the subband b in the subframe i of the current frame, b is an integer, b ∈[0, M−1], and M≥2; and the calculating a compensated downmixed signal in a subframe i of the current frame comprises:

calculating a compensated downmixed signal in the subband b in the subframe i of the current frame according to the following formula:

$$DMX\_comp_{ib}(k)=\alpha_i(b)*L_{ib}''(k),$$ wherein $DMX\_comp_{ib}(k)$ represents the compensated downmixed signal in the subband b in the subframe i of the current frame, k represents a frequency bin index value, and k∈[band_limits(b), band_limits (b+1)−1]; and correct the second downmixed signal in the current frame based on the downmix compensation factor of the current frame, to obtain the first downmixed signal in the current frame; and determine the first downmixed signal in the current frame as a downmixed signal in a preset frequency band of the current frame.

6. The downmixed signal calculation apparatus according to claim 5, wherein the at least one processor is further configured to execute the computer-executable instructions to:

calculate a compensated downmixed signal in the current frame based on a first frequency-domain signal in the current frame and the downmix compensation factor of the current frame, wherein the first frequency-domain signal is a left channel frequency-domain signal in the current frame or a right channel frequency-domain signal in the current frame; and calculate the first downmixed signal in the current frame based on the second downmixed signal in the current frame and the compensated downmixed signal in the current frame; or calculate a compensated downmixed signal in a subframe i of the current frame based on a second frequency-domain signal in the subframe i of the current frame and a downmix compensation factor of the subframe i of the current frame, wherein the second frequency-domain signal is a left channel frequency-domain signal in the subframe i of the current frame or a right channel frequency-domain signal in the subframe i of the current frame; and calculate a first downmixed signal in the subframe i of the current frame based on a second downmixed signal in the subframe i of the current frame and the compensated downmixed signal in the subframe i of the current frame, wherein the current frame comprises P subframes, and the first downmixed signal in the current frame comprises the first downmixed signal in the subframe i of the current frame, wherein both P and i are integers, P≥2, and i∈[0, P−1].

7. The downmixed signal calculation apparatus according to claim 6, wherein the at least one processor is further configured to execute the computer-executable instructions to:

determine a product of the first frequency-domain signal in the current frame and the downmix compensation factor of the current frame as the compensated downmixed signal in the current frame; and determine a sum of the second downmixed signal in the current frame and the compensated downmixed signal in the current frame as the first downmixed signal in the current frame; or determine a product of the second frequency-domain signal in the subframe i of the current frame and the downmix compensation factor of the subframe i of the current frame as the compensated downmixed signal in the subframe i of the current frame; and determine a sum of the second downmixed signal in the subframe i of the current frame and the compensated downmixed signal in the subframe i of the current frame as the first downmixed signal in the subframe i of the current frame.

8. The downmixed signal calculation apparatus according to claim 5, wherein Th1≤b≤Th2, Th1<b≤Th2, Th1≤b<Th2, or Th1<b<Th2, wherein 0≤Th1≤Th2≤M−1, Th1 represents a minimum subband index value of the preset frequency band, and Th2 represents a maximum subband index value of the preset frequency band.

9. One or more non-transitory computer-readable media storing computer instructions, that when executed by one or more processors, cause a computing device to perform operations comprising:

determining that a first condition or a second condition is true, wherein determining that the first condition is true comprises determining that a previous frame of a current frame of a stereo audio signal is not a switching frame based on a switching flag of the previous frame and determining that a residual signal in the previous frame does not need to be encoded based on a coding flag of the previous frame, and determining that the second condition is true comprises determining that the current frame is not a switching frame based on a switching flag of the current frame and a residual signal in the current frame does not need to be encoded based on a coding flag of the current frame;

in response to the determining that the first condition or the second condition is true, calculating a first downmixed signal in the current frame, wherein the calculating comprises:

obtaining a second downmixed signal in the current frame;

obtaining a downmix compensation factor of the current frame, wherein the obtaining the downmix compensation factor of the current frame comprises:

calculating a downmix compensation factor in a subframe i of the current frame based on a first flag, wherein the first flag indicates whether a stereo parameter other than an inter-channel time difference parameter needs to be encoded in the current frame, the current frame comprises P subframes, and the downmix compensation factor of the current frame comprises the downmix compensation factor of the subframe i of the current frame, wherein both P and i are integers, P≥2, and i∈[0, P−1]; wherein a second frequency-domain signal in the subframe i of the current frame is a left channel frequency-domain signal in the subframe i of the current frame, and the calculating the downmix compensation factor of the subframe i of the current frame comprises:

calculating the downmix compensation factor of the subframe i of the current frame based on the left channel frequency-domain signal in the subframe i of the current frame and a right channel frequency-domain signal in the subframe i of the current frame, wherein a downmix compensation factor $\alpha_i(b)$ in a subband b in the subframe i of the current frame is calculated according to the following formula:

$$\alpha_i(b)=\sqrt{E\_L_i(b)}+\sqrt{E\_R_i(b)}-\sqrt{E\_LR_i(b)}/2\sqrt{E\_L_i(b)}$$

$$E\_L_i(b)=\Sigma_{k=band\_limits(b)}^{k=band\_limits(b+1)-1}L_{ib}''(k)^2,$$

$$E\_R_i(b)=\Sigma_{k=band\_limits(b)}^{k=band\_limits(b+1)-1}R_{ib}''(k)^2,$$ and $$E\_LR_i(b)=\Sigma_{k=band\_limits(b)}^{k=band\_limits(b+1)-1}[L_{ib}''(k)^2+R_{ib}''(k)]^2;$$ or $$E\_L_i(b)=\Sigma_{k=band\_limits(b)}^{k=band\_limits(b+1)-1}L_{ib}'(k)^2,$$

$$E\_R_i(b)=\Sigma_{k=band\_limits(b)}^{k=band\_limits(b+1)-1}R_{ib}'(k)^2,$$ and $$E\_LR_i(b)=\Sigma_{k=band\_limits(b)}^{k=band\_limits(b+1)-1}[L_{ib}'(k)+R_{ib}'(k)]^2;$$ wherein $E\_L_i(b)$ represents an energy sum of a left channel frequency-domain signal in the subband b in the subframe i of the current frame; $E\_R_i(b)$ represents an energy sum of a right channel frequency-domain signal in the subband b in the subframe i of the current frame;

$E\_LR_i(b)$ represents an energy sum of the energy of the left channel frequency-domain signal and the energy of the right channel frequency-domain signal in the subband b in the subframe i of the current frame; band_limits(b) represents a minimum frequency bin index value of the subband b in the subframe i of the current frame; band_limits(b+1) represents a minimum frequency bin index value of a subband b+1 in the subframe i of the current frame; $L_{ib}''(k)$ represents a left channel frequency-domain signal that is in the subband b in the subframe i of the current frame and that is obtained after adjustment based on a stereo parameter; $R_{ib}''(k)$ represents a right channel frequency-domain signal that is in the subband b in the subframe i of the current frame and that is obtained after adjustment based on the stereo parameter; $L_{ib}'(k)$ represents a left channel frequency-domain signal that is in the subband b in the subframe i of the current frame and that is obtained after time-shift adjustment; $R_{ib}'(k)$ represents a right channel frequency-domain signal that is in the subband b in the subframe i of the current frame and that is obtained after time-shift adjustment; and k represents a frequency bin index value, wherein each subframe of the current frame comprises M subbands, the downmix compensation factor of the subframe i of the current frame comprises the downmix compensation factor of the subband b in the subframe i of the current frame, b is an integer, b∈[0, M−1], and M≥2; and the calculating a compensated downmixed signal in a subframe i of the current frame comprises:

calculating a compensated downmixed signal in the subband b in the subframe i of the current frame according to the following formula:

$$DMX\_comp_{ib}(k)=\alpha_i(b)*L_{ib}''(k),$$ wherein $DMX\_comp_{ib}(k)$ represents the compensated downmixed signal in the subband b in the subframe i of the current frame, k represents a frequency bin index value, and k ∈[band_limits(b), band_limits(b+1)−1]; and correcting the second downmixed signal in the current frame based on the downmix compensation factor of the current frame, to obtain the first downmixed signal in the current frame; and determining the first downmixed signal in the current frame as a downmixed signal in the preset frequency band of the current frame.

10. The one or more non-transitory computer-readable media according to claim 9, wherein the correcting the second downmixed signal in the current frame based on the downmix compensation factor of the current frame, to obtain the first downmixed signal in the current frame comprises:

calculating a compensated downmixed signal in the current frame based on a first frequency-domain signal in the current frame and the downmix compensation factor of the current frame, wherein the first frequency-domain signal is a left channel frequency-domain signal in the current frame or a right channel frequency-domain signal in the current frame; and calculating the first downmixed signal in the current frame based on the second downmixed signal in the current frame and the compensated downmixed signal in the current frame; or calculating a compensated downmixed signal in a subframe i of the current frame based on a second frequency-domain signal in the subframe i of the current frame and a downmix compensation factor of the subframe i of the current frame, wherein the second frequency-domain signal is a left channel frequency-domain signal in the subframe i of the current frame or a right channel frequency-domain signal in the subframe i of the current frame; and calculating a first downmixed signal in the subframe i of the current frame based on a second downmixed signal in the subframe i of the current frame and the compensated downmixed signal in the subframe i of the current frame, wherein the current frame comprises P subframes, and the first downmixed signal in the current frame comprises the first downmixed signal in the subframe i of the current frame, wherein both P and i are integers, P≥2, and i∈[0, P−1].

11. The one or more non-transitory computer-readable r edia according to claim 10, wherein the calculating the compensated downmixed signal in the current frame comprises: determining a product of the first frequency-domain signal in the current frame and the downmix compensation factor of the current frame as the compensated downmixed signal in the current frame; and the calculating the first downmixed signal in the current frame comprises: determining a sum of the second downmixed signal in the current frame and the compensated downmixed signal in the current frame as the first downmixed signal in the current frame; or the calculating the compensated downmixed signal in a subframe i of the current frame comprises: determining a product of the second frequency-domain signal in the subframe i of the current frame and the downmix compensation factor of the subframe i of the current frame as the compensated downmixed signal in the subframe i of the current frame; and the calculating the first downmixed signal in the subframe i of the current frame comprises: determining a sum of the second downmixed signal in the subframe i of the current frame and the compensated downmixed signal in the subframe i of the current frame as the first downmixed signal in the subframe i of the current frame.

12. The one or more non-transitory computer-readable media according to claim 9, wherein $Th1 \leq b \leq Th2$, $Th1 < b \leq Th2$, $Th1 \leq b < Th2$, or $Th1 < b < Th2$, wherein $0 \leq Th1 \leq Th2 \leq M-1$, Th1 represents a minimum subband index value of the preset frequency band, and Th2 represents a maximum subband index value of the preset frequency band.

* * * * *